US010946855B2

(12) United States Patent
Osella et al.

(10) Patent No.: US 10,946,855 B2
(45) Date of Patent: Mar. 16, 2021

(54) METHOD FOR REDUCING NOISE IN A DRIVELINE OF A MOTOR VEHICLE

(71) Applicant: C.R.F. Societa Consortile per Azioni, Orbassano (IT)

(72) Inventors: Giancarlo Osella, Orbassano (IT); Francesco Cimmino, Orbassano (IT); Enrico Galvagno, Turin (IT); Constantinos Vafidis, Orbassano (IT); Mauro Velardocchia, Turin (IT); Alessandro Vigliani, Turin (IT); Antonio Tota, Turin (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 343 days.

(21) Appl. No.: 15/736,829

(22) PCT Filed: Jun. 22, 2016

(86) PCT No.: PCT/IB2016/053701
§ 371 (c)(1),
(2) Date: Dec. 15, 2017

(87) PCT Pub. No.: WO2016/207806
PCT Pub. Date: Dec. 29, 2016

(65) Prior Publication Data
US 2018/0362018 A1 Dec. 20, 2018

(30) Foreign Application Priority Data
Jun. 26, 2015 (IT) .......................... 102015000028344

(51) Int. Cl.
*B60W 20/17* (2016.01)
*B60W 10/06* (2006.01)
(Continued)

(52) U.S. Cl.
CPC ............ *B60W 20/17* (2016.01); *B60W 10/02* (2013.01); *B60W 10/06* (2013.01); *B60W 10/08* (2013.01);
(Continued)

(58) Field of Classification Search
CPC ...... B60W 20/17; B60W 10/02; B60W 10/06; B60W 10/08; B60W 10/113;
(Continued)

(56) References Cited

U.S. PATENT DOCUMENTS

2002/0049120 A1\* 4/2002 Lindstrom ............... B60K 6/48
477/115
2005/0261109 A1\* 11/2005 Winkel ................... B60T 10/00
477/92

(Continued)

OTHER PUBLICATIONS

International Search Report dated Sep. 7, 2016, for International Application No. PCT/IB2016/053701, 4 pages.

*Primary Examiner* — Anne Marie Antonucci
*Assistant Examiner* — Andrew J Cromer
(74) *Attorney, Agent, or Firm* — RMCK Law Group, PLC

(57) ABSTRACT

Described herein is a method for reducing noise in a driveline of a motor vehicle, the method including detecting a condition initiating a noise event of the driveline by using one or more sensors on board the vehicle; and controlling, as a function of the detected condition and of a signal of said one or more sensors, an actuation of one or more actuators that govern corresponding devices that can be connected to the driveline and configured for generating a torsional pre-load condition in the driveline itself.

4 Claims, 48 Drawing Sheets

(51) Int. Cl.
*B60W 10/113* (2012.01)
*B60W 10/184* (2012.01)
*B60W 30/20* (2006.01)
*B60W 10/02* (2006.01)
*B60W 10/08* (2006.01)
*F16H 61/688* (2006.01)

(52) U.S. Cl.
CPC ........ *B60W 10/113* (2013.01); *B60W 10/184* (2013.01); *B60W 30/20* (2013.01); *B60W 2420/42* (2013.01); *B60W 2510/083* (2013.01); *B60W 2510/105* (2013.01); *B60W 2520/40* (2013.01); *B60W 2552/35* (2020.02); *B60W 2554/00* (2020.02); *B60W 2710/021* (2013.01); *B60W 2710/0666* (2013.01); *B60W 2710/083* (2013.01); *F16H 61/688* (2013.01)

(58) Field of Classification Search
CPC .............. B60W 10/184; Y10T 477/688; F16D 2500/50293; F02B 75/06
See application file for complete search history.

(56) References Cited

U.S. PATENT DOCUMENTS

| | | | |
|---|---|---|---|
| 2010/0023218 A1 | 1/2010 | Hayakawa et al. | |
| 2011/0060478 A1* | 3/2011 | Nickolaou | G01S 17/023 |
| | | | 701/1 |
| 2012/0265427 A1* | 10/2012 | Petridis | B60W 10/02 |
| | | | 701/113 |
| 2013/0073134 A1 | 3/2013 | Yokouchi et al. | |

* cited by examiner

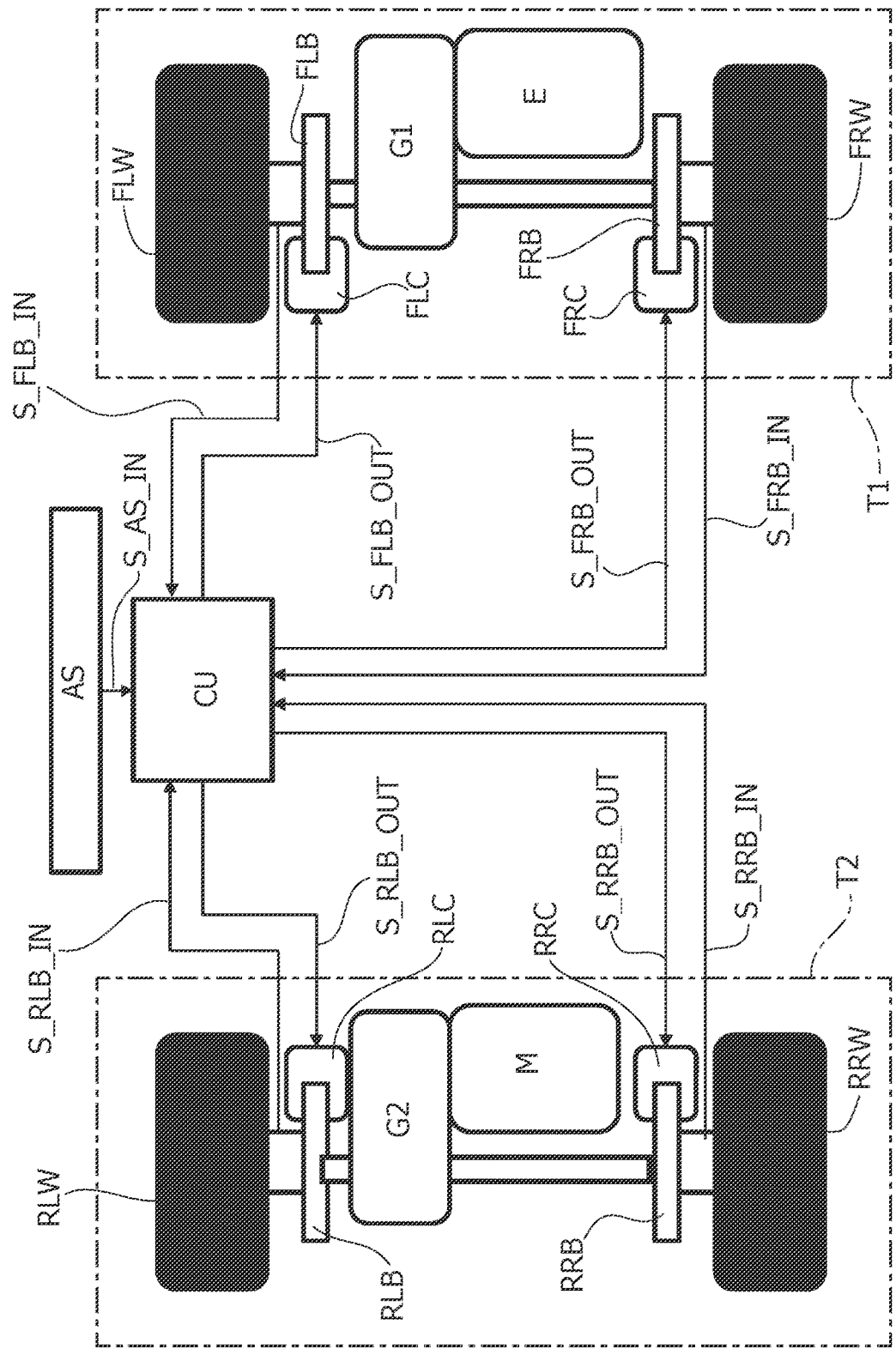

FIG. 24
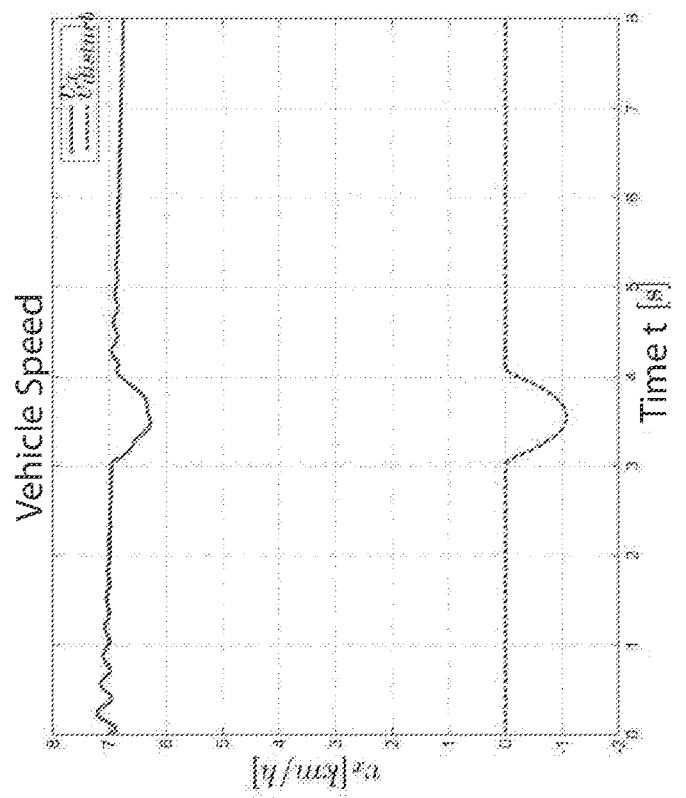
B
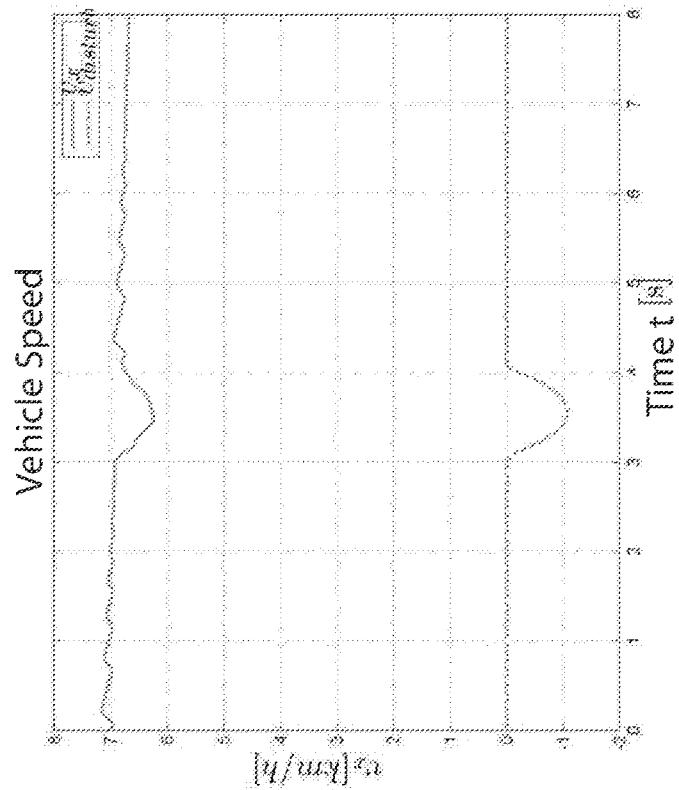
A

FIG. 29
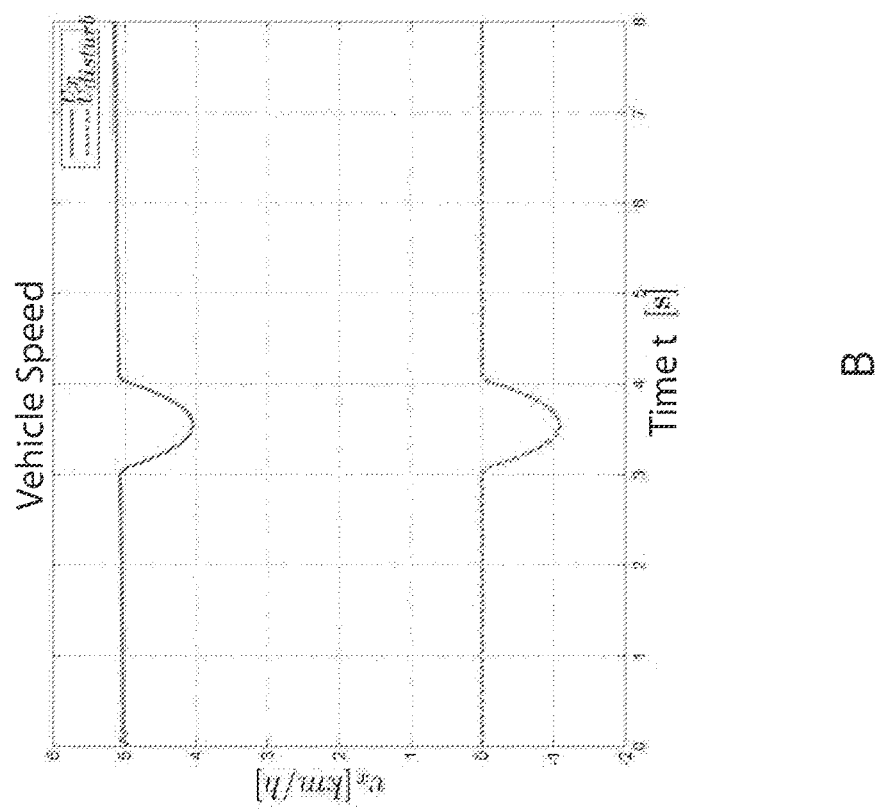
B
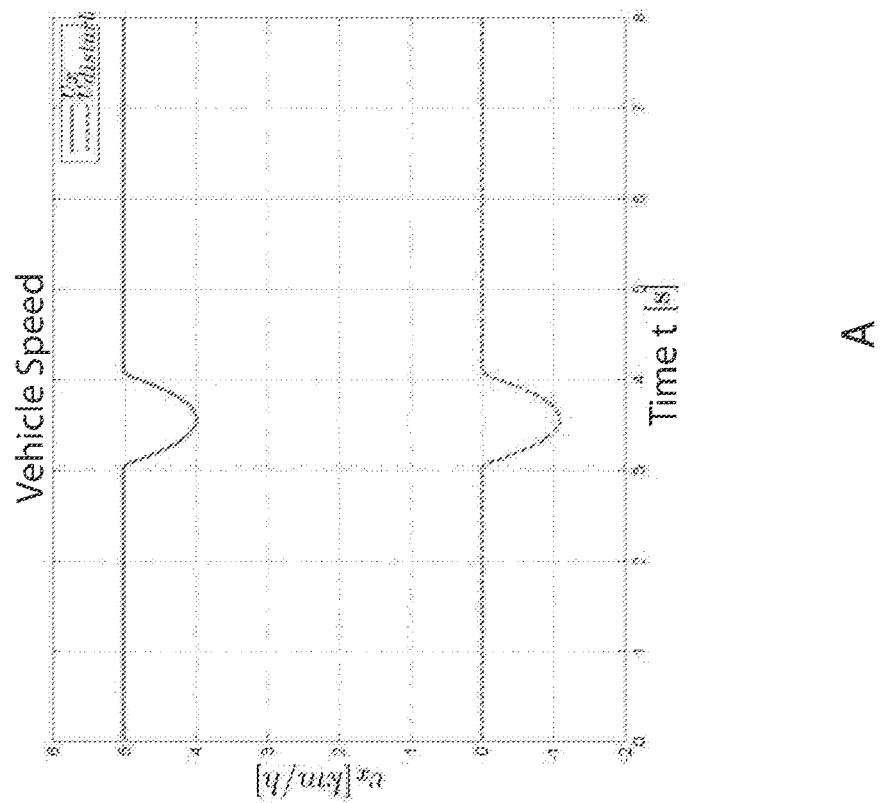
A

FIG. 35
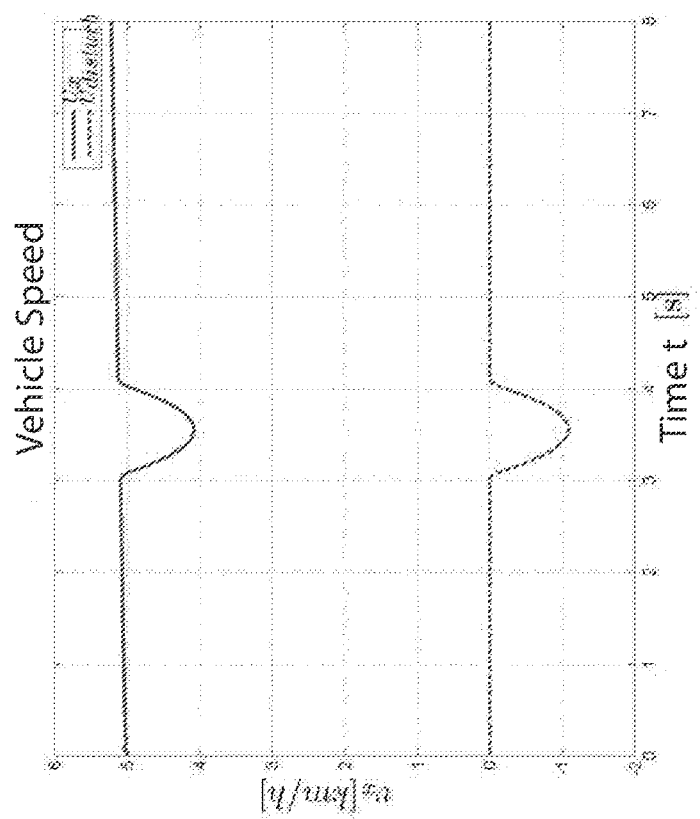
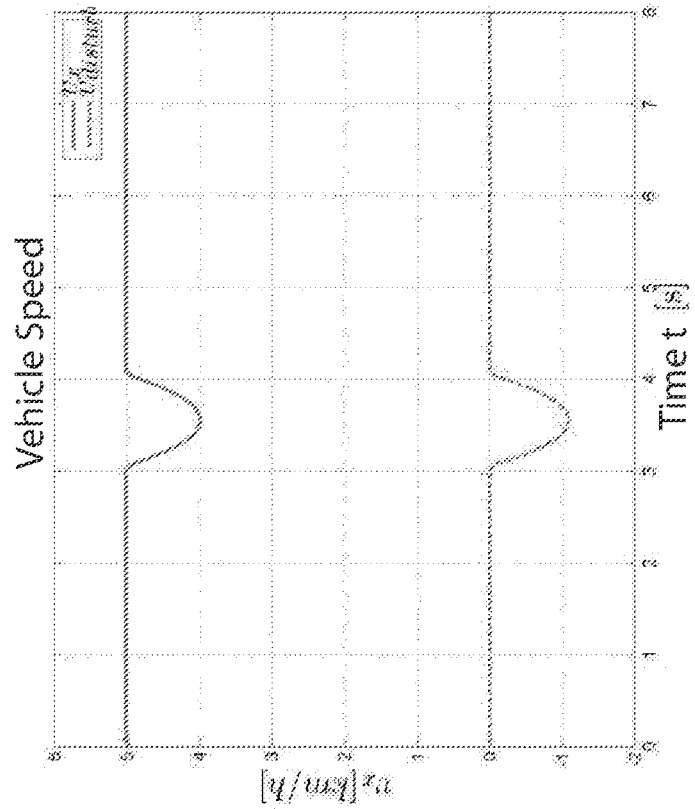

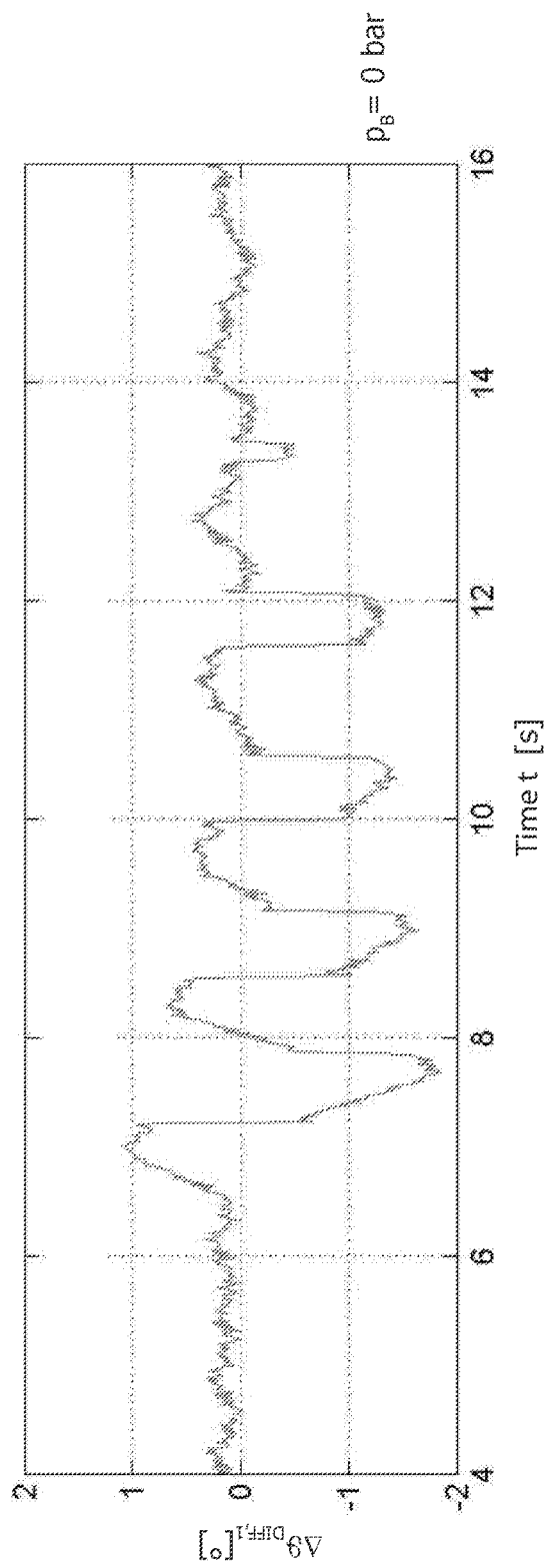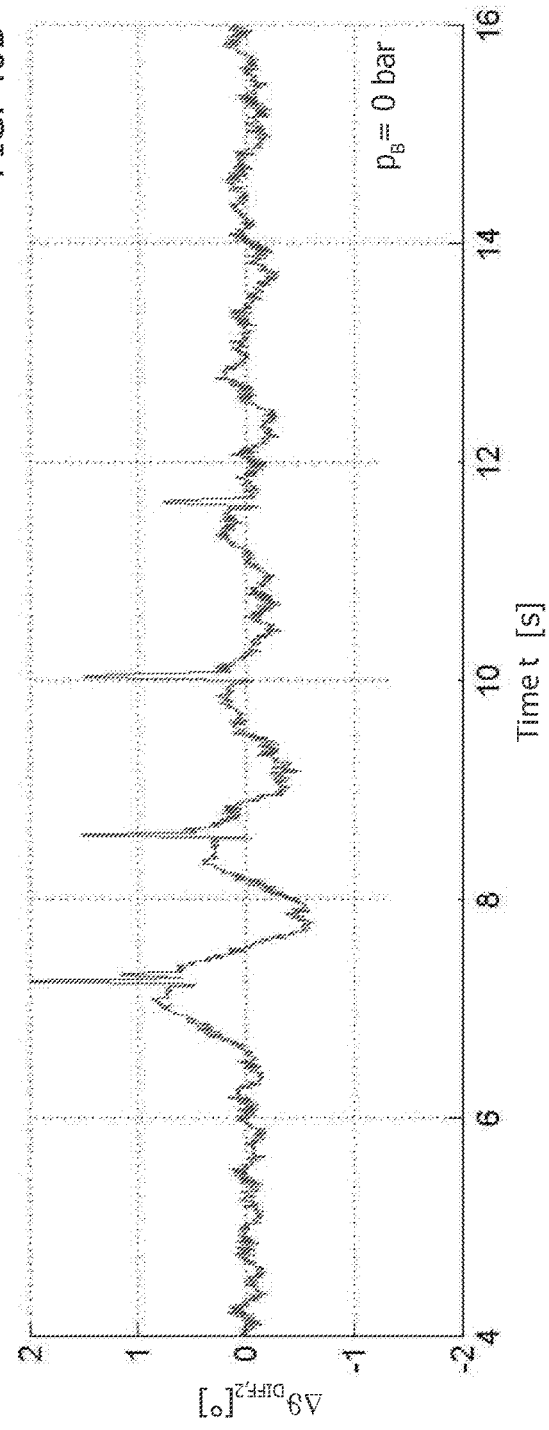

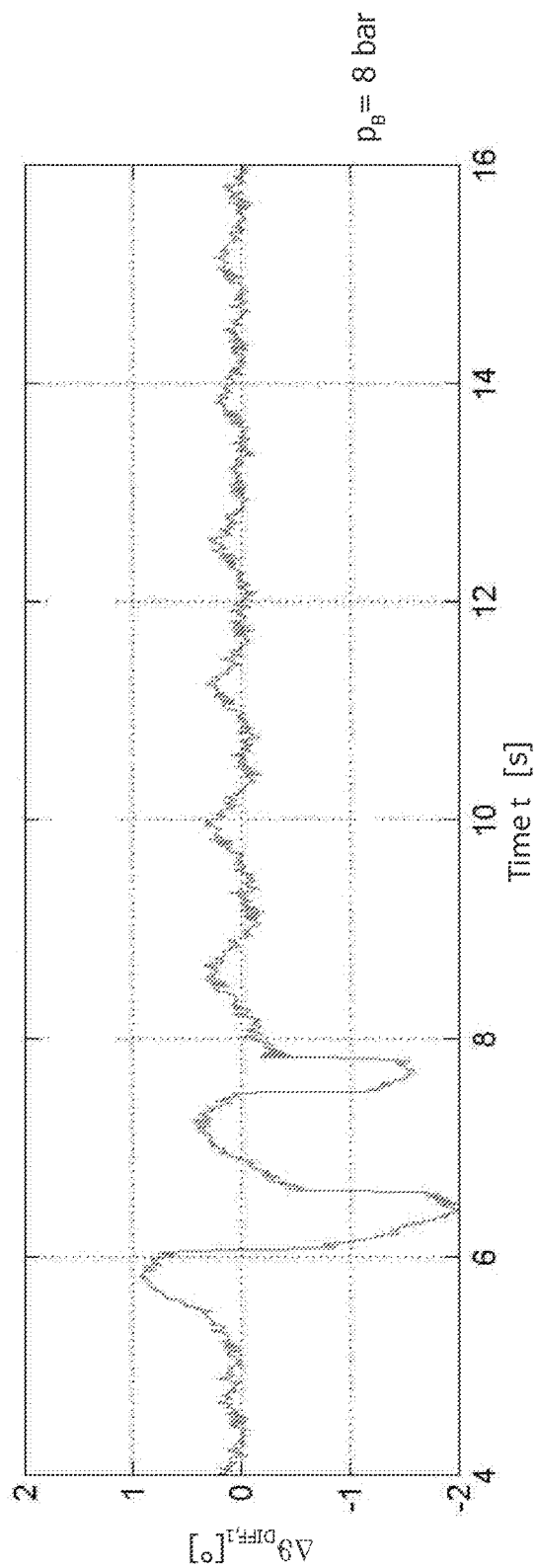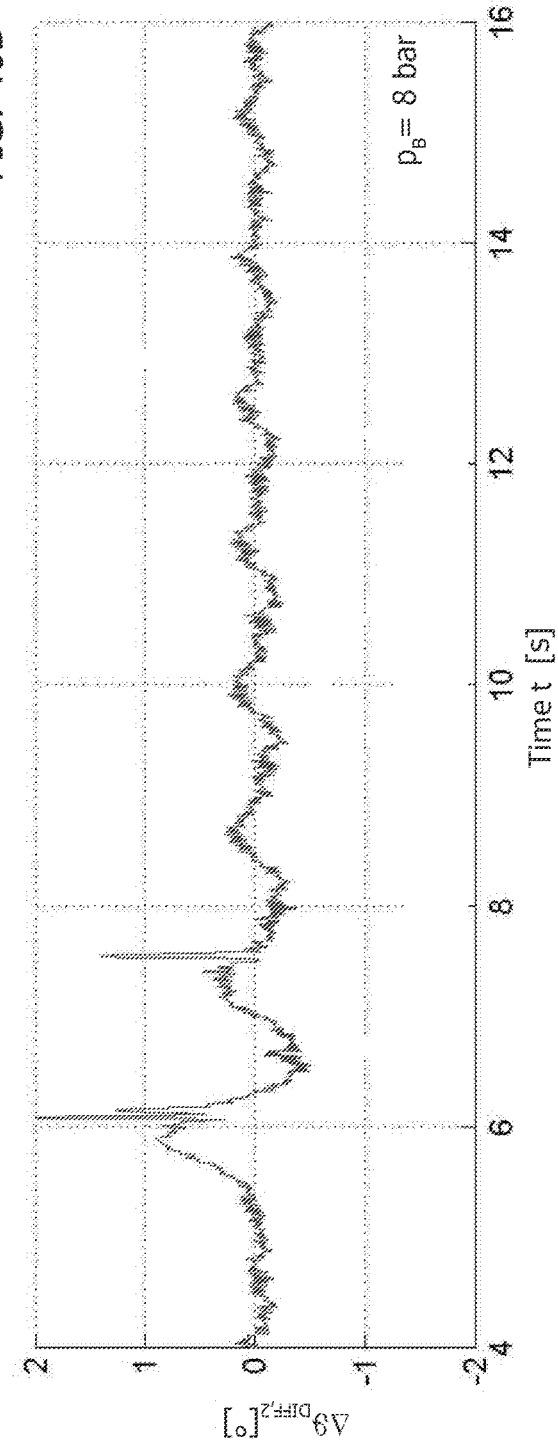

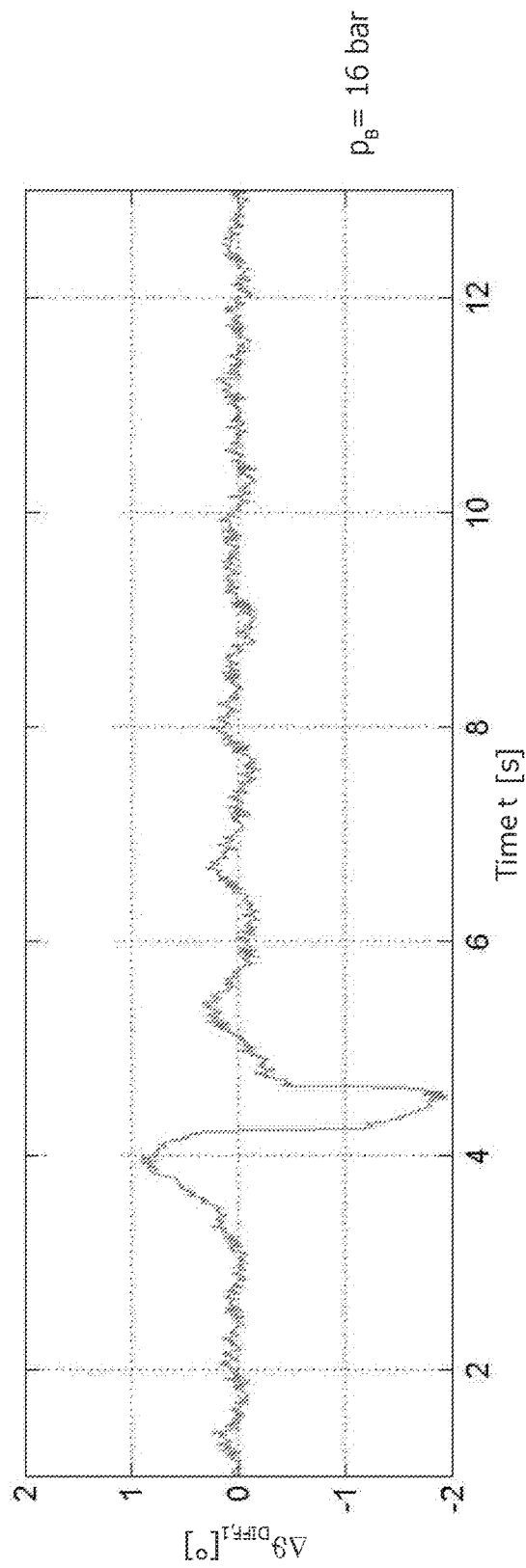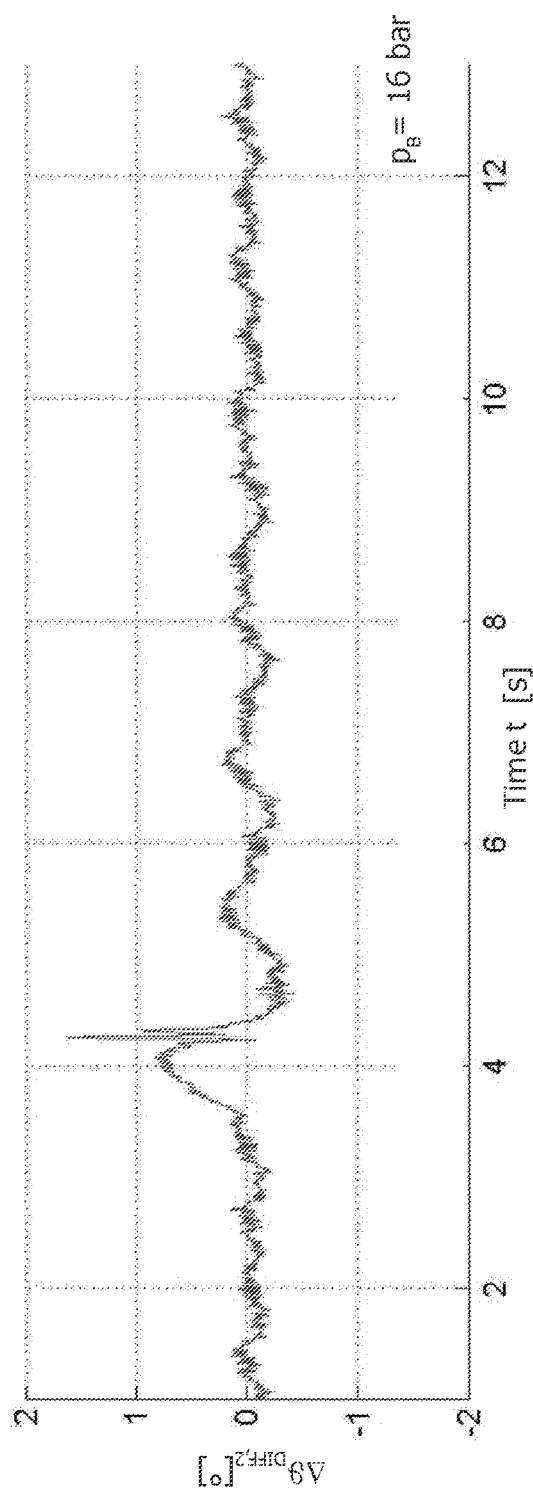

METHOD FOR REDUCING NOISE IN A DRIVELINE OF A MOTOR VEHICLE

CROSS-REFERENCE TO RELATED APPLICATIONS

This application is a 371 U.S. National Stage of International Application No. PCT/IB2016/053701, filed Jun. 22, 2016, which claims priority to Italian Application No. 102015000028344 filed on Jun. 26, 2015. The disclosure of each of the above applications is incorporated herein by reference in its entirety.

FIELD OF THE INVENTION

The present invention relates to a method for reducing noise in a driveline of a motor vehicle, upon occurrence of perturbing phenomena when the vehicle is travelling at constant speed, for example, external perturbing phenomena, such as the ones that occur when the vehicle is driving over a hump at extremely low speed (with the driveline in creeping conditions), or else when the vehicle is travelling at low speed on uneven road surfaces, or else again internal perturbing phenomena, such as manoeuvres of sudden release of the vehicle accelerator (the so-called tip-out manoeuvres).

PRIOR ART

With reference in particular to the case of a vehicle driving over a hump at low speed, the manoeuvres involved are at times carried out under slight power, namely, with a gear engaged and with the engine that delivers a rather contained torque sufficient to enable advance of the vehicle at constant speed.

During the above manoeuvres, as a result of the low load acting on the driveline, there may be onset of noise coming from the driveline itself due to the coupling clearances between the mobile parts thereof, for example, the meshing clearance of the gears.

This occurs because under low loads the driveline presents a low torsional preload (in the linear elastic regime, the strain of the transmission system is proportional to the load applied), thus rendering the driveline particularly sensitive to perturbing phenomena when the vehicle is travelling that occur during the aforesaid manoeuvres.

The low damping is mainly due to the fact that the driveline is not as a whole subject to a sufficient torsional preload. By this is meant a condition such that the active surfaces of the components of the driveline, namely, the surfaces on which there are exchanged the forces that result in transmission of motion from the wheels to the engine, are not subject to further actions superimposed on the forces exchanged for transmission of motion; these further actions would be such as to tighten coupling between the active surfaces. This tightening action, if present, would guarantee a greater stability of the contact between the active surfaces also upon occurrence of perturbing phenomena when the vehicle is travelling.

For a better understanding of the problem, consider the operating conditions of a driveline of a motor vehicle upon occurrence of a manoeuvre in a condition of overrun: the active surfaces on which the transmission of forces is obtained include the release sides of the gears and all those surfaces—located wherever in the driveline there exists a play—that are brought into contact when the power flow proceeds from the wheels of the vehicle to the engine.

The forces exchanged, which all derive directly or indirectly from the dynamic condition of the vehicle, tighten and stabilise coupling between the active surfaces. However, it will be appreciated that the intrinsic weakness in regard to perturbing phenomena when the vehicle is travelling lies precisely in the fact that the perturbation affects the very source of stability of the coupling.

In the presence of disturbance coming from the road (irregularities of the road surface, humps, etc.) or else from the engine or from the driveline (e.g., sudden variations of engine torque and clutches) instantaneously the operating conditions of the driveline may depart in a more or less marked way from the conditions typical of a manoeuvre on overrun. This is equivalent to a reduction of intensity of the forces exchanged between the active surfaces up to detachment of the surfaces themselves when the force exchanged goes to zero (and subsequently changes sign), which opens the way, for example, to angular deviations of a more or less marked degree with respect to the position corresponding to a manoeuvre on overrun.

In this connection, it should be noted that the problem is particularly felt in all latest-design and/or high-efficiency drivelines, which are characterized by extremely contained mechanical losses. Mechanical drivelines that are less efficient and/or of less recent design present greater mechanical losses and are consequently characterized by a higher stabilising effect of the mechanical configuration of the system; the presence of friction torques inside the driveline of a non-negligible degree ensure a condition of contact between the rotating parts even in the absence of (or under low) mechanical power transmitted through the gearbox.

Latest-design drivelines hence pay for their high efficiency with a very low value of internal damping on account of the extremely low friction existing between the mobile parts, and with a consequent extremely high sensitivity to disturbance.

In the field of drivelines for motor vehicles, the ones that certainly are least affected by problems of noise during low-speed manoeuvres are automatic drivelines with torque converter, which exerts a filtering action in regard to perturbing phenomena of this type. However, these drivelines are generally less efficient from the energy standpoint and present a dynamic behaviour that barely fits in the requirements of performance and dynamics required on an ever-increasing range of vehicles present on the market.

In view of these requirements, there are generally preferred, for example, automatic drivelines without torque converter, i.e., ones provided with an electronically controlled single-clutch or dual-clutch unit. However, it should be borne in mind that, even though dual-clutch drivelines present good characteristics in terms of performance and of dynamics when the vehicle is travelling, they suffer in an amplified way from the problems highlighted above in so far as there necessarily coexist an active branch of the driveline (associated to the currently closed clutch) and a non-active branch of the driveline (associated to the currently open clutch).

Consequently, in addition to the meshing clearance that characterizes the active branch of the driveline there is also the meshing clearance in the branch of the currently non-active branch of the driveline, which is moreover substantially free from torsional actions on the engine side that would enable limitation of the angular oscillations of the gears.

OBJECT OF THE INVENTION

The object of the present invention is to solve the technical problems mentioned previously. In particular, the object of the invention is to reduce noise in a driveline for motor vehicles, which is mainly due to recovery of backlash in the driveline, upon occurrence of conditions that trigger noise phenomena, at the same time enabling safeguarding of the performance and/or dynamic targets envisaged for the driveline.

SUMMARY OF THE INVENTION

The object of the invention is achieved by a method for reducing noise in the driveline of a motor vehicle that has the features forming the subject of the ensuing claims, which form an integral part of the technical disclosure provided herein in relation to the invention.

In particular, the object of the invention is achieved by a method for reducing noise in a driveline of a motor vehicle, the method comprising the steps of:
- detecting a condition initiating a noise event of the driveline by means of one or more sensors on board the vehicle,
- controlling, as a function of the detected condition and of a signal of said one or more sensors, an actuation of one or more actuators that govern corresponding devices that can be connected to the driveline and configured for generating a torsional pre-load condition in the driveline itself.

BRIEF DESCRIPTION OF THE DRAWINGS

The present invention will now be described with reference to the annexed plates of drawings, which are provided purely by way of non-limiting example and in which:

FIGS. 1A-1E are principle schematic views of possible motor-vehicle schemes on which the method according to the invention can be implemented;

FIGS. 23 to 27 are equivalent to FIGS. 8 to 13 and refer to the same type of intervention, but regard the manoeuvre of FIGS. 18 to 22;

FIGS. 28 to 33 are equivalent to FIGS. 2 to 7 and refer to the same type of intervention, but regard yet a different manoeuvre of the vehicle;

FIGS. 34 to 39 are equivalent to FIGS. 28 to 33 and regard the same manoeuvre, but refer to yet a further intervention according to the method of the invention;

DETAILED DESCRIPTION

FIGS. 1A-1E illustrate various schemes of motor vehicles on which a method according to the invention can be implemented. In each scheme, for the purposes of the present description, what is to be understood as defining the driveline of the motor vehicle is enclosed in a box delimited by a dashed and dotted line associated to the reference T.

The references adopted in FIGS. 1A-1E are the same and correspond to the following parts of the vehicle:
- FLW: front left wheel;
- FLB: front left brake (here, by way of example, a disk brake);
- FLC: callipers of the front left brake;
- FRW: front right wheel;
- FRB: front right brake (here, by way of example, a disk brake);
- FRC: callipers of the front right brake;
- RLW: rear left wheel;
- RLB: rear left brake (here, by way of example, a disk brake);
- RLC: callipers of the rear left brake;
- RRW: rear right wheel;
- RRB: rear right brake (here, by way of example, a disk brake)
- RRC: callipers of the rear right brake;
- AS: acceleration sensor;
- CU: electronic control unit;
- G: ensemble including gearbox and differential/differentials (possibly without gearbox in the case electric drive);
- E: engine; and
- M: electric motor.

At times, some of the references referred to above may be followed by the numbers 1 or 2 when more than one similar unit are present or, in other situations, as distinguishing reference (e.g., front/rear).

Figure 1A:
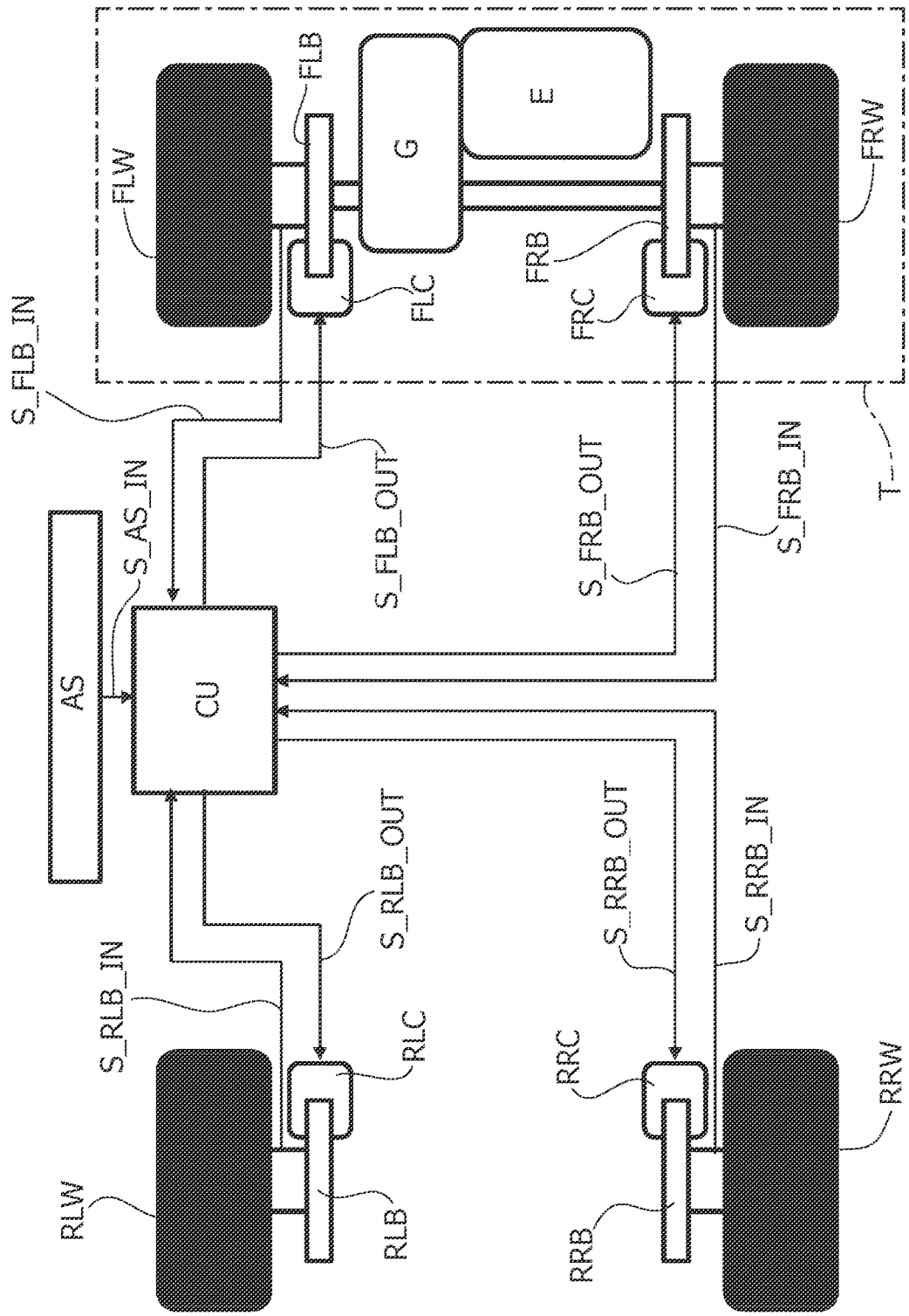

FIG. 1A represents a scheme of vehicle with front transverse engine and front-wheel drive.

FIG. 1B represents a scheme of hybrid vehicle in which there is envisaged thermal drive on the front axle (front transverse thermal engine E coupled to front gearbox-differential ensemble G1) and electric drive on the rear axle (rear electric motor M coupled to a gearbox and/or differential G2).

Figure 1C:
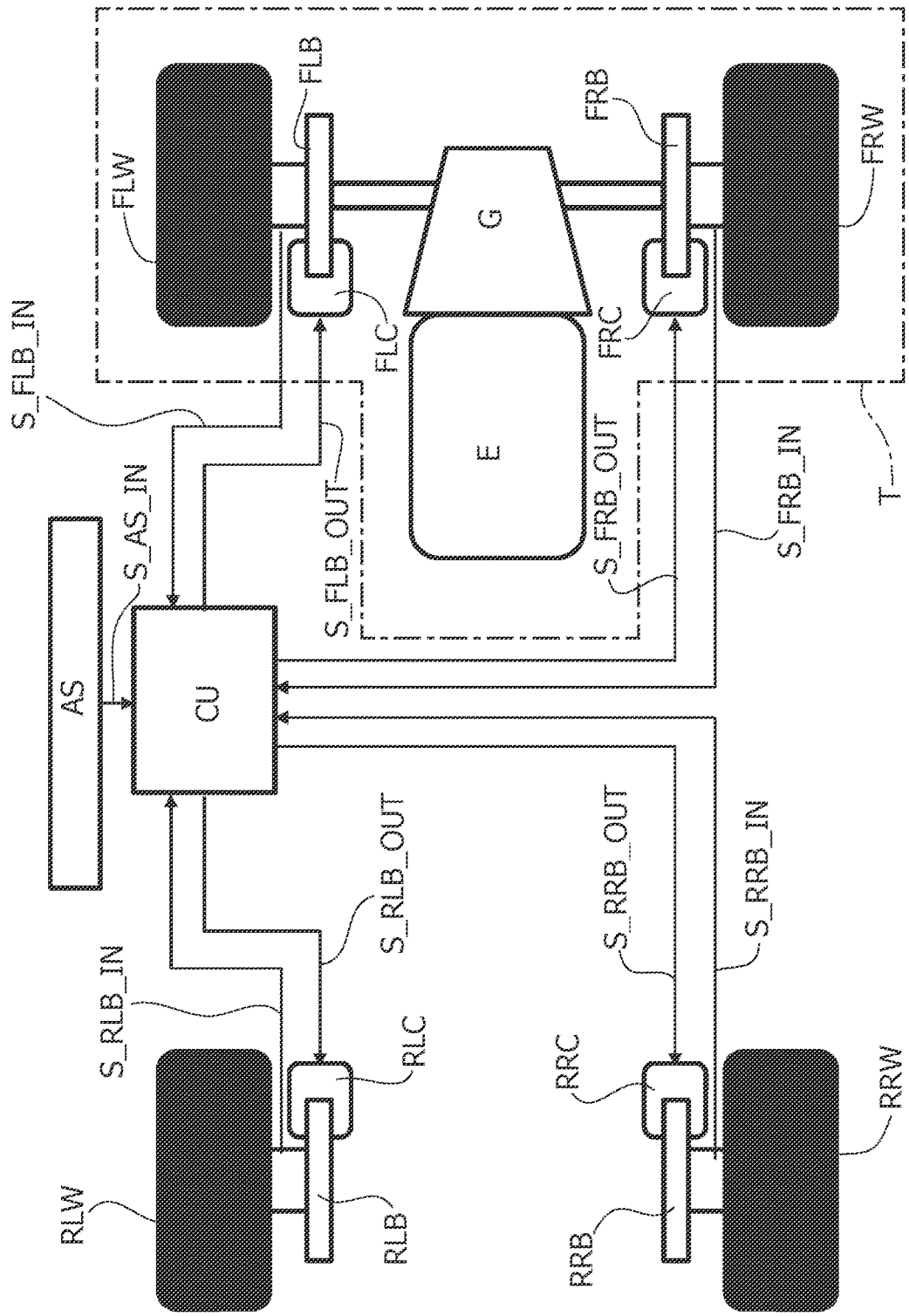

FIG. 1C represents a scheme of vehicle with front-wheel drive and front longitudinal engine.

Figure 1D:
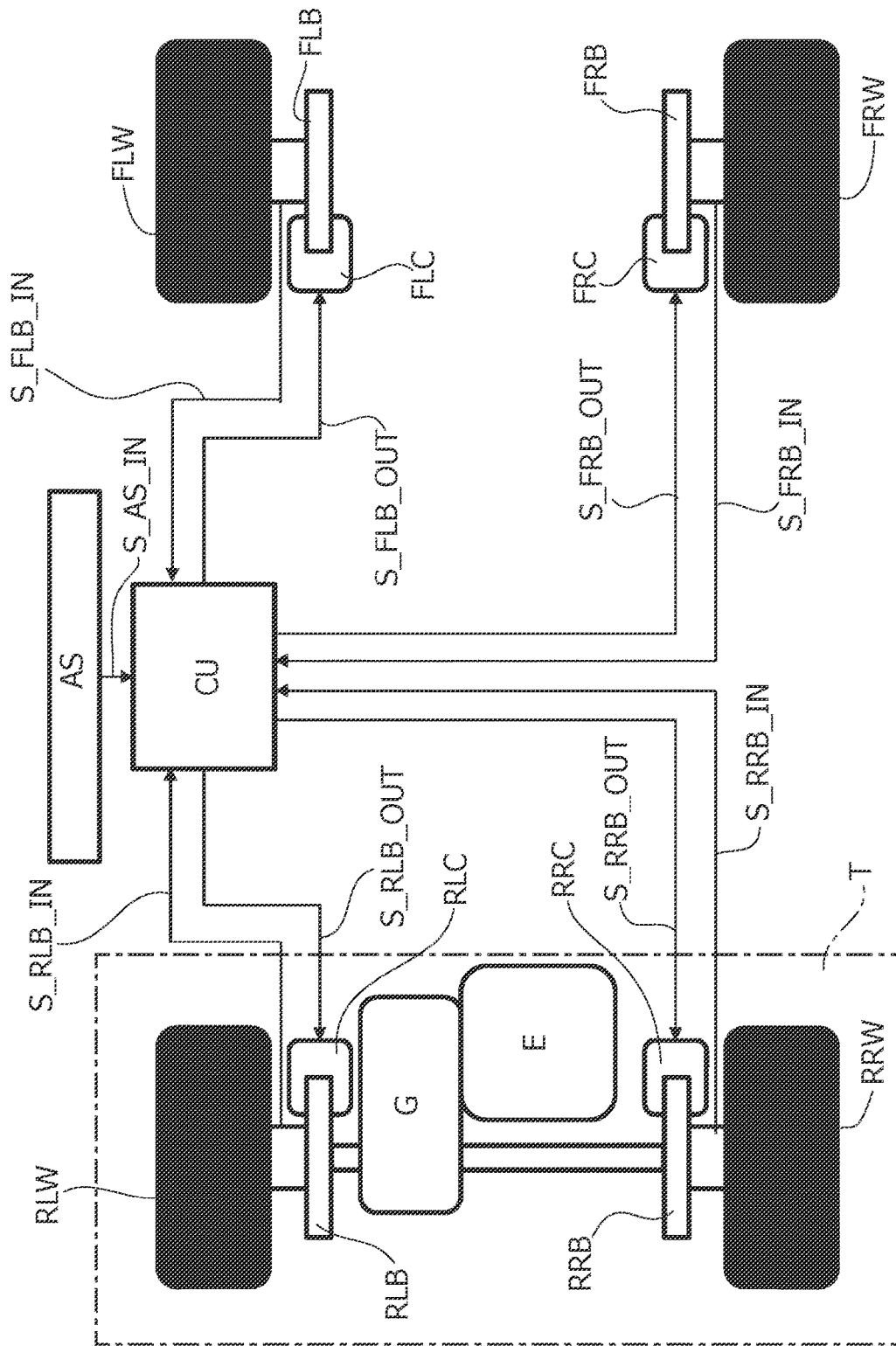

FIG. 1D represents a scheme of vehicle with rear-wheel drive and rear transverse engine.

Figure 1E:
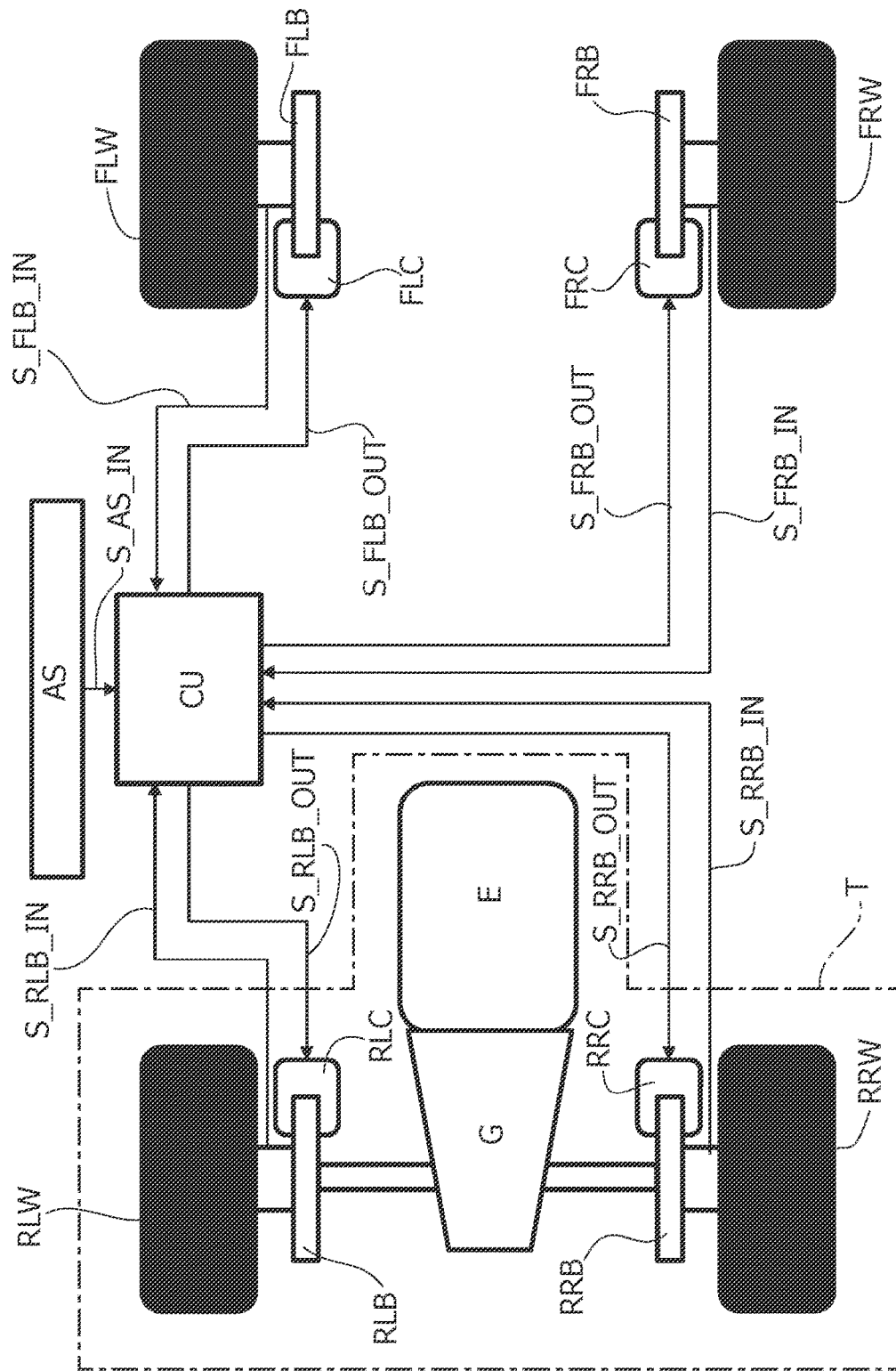

Finally, FIG. 1E represents a scheme of vehicle with rear-wheel drive and central longitudinal engine.

The description of the subsequent FIGS. 2 to 39 will take into consideration three different manoeuvres at low speed of a motor vehicle that take place in conditions favourable to onset of noise phenomena in the driveline.

Furthermore, there has been taken as reference, by way of example in order to illustrate implementation of the method according to the invention, a front-engine and front-wheel-drive motor vehicle, with transverse engine and also transverse gearbox, where the gearbox is a six-gear dual-clutch gearbox, in itself known.

The plots of FIGS. 2 to 39 that will be described are the result of a numeric simulation by means of a mathematical model, with multiple degrees of freedom, of the vehicle and of the dual-clutch gearbox, validated experimentally with extensive tests.

The three manoeuvres considered (all potentially exposed to the risk of onset of noise phenomena in the driveline) include, by way of example for the present description:

i) a manoeuvre of sudden release of the accelerator pedal after a short period under power (the so-called tip-out manoeuvre); the manoeuvre is executed with the first gear engaged and with the second gear pre-selected and corresponds to a circumstance that may occur, for example, immediately after the vehicle starts moving again when it is travelling in a queue, followed by a subsequent stop on account of slowing-down of the queue; furthermore, the manoeuvre in question is carried out with the clutch associated to the odd gears (hereinafter also referred to for short as clutch K1) engaged, and with the clutch associated to the even gears (hereinafter also referred to for short as clutch K2) disengaged; in the ensuing description, the branch of the driveline pertaining to the engaged gear will be referred to as "active branch" or "engaged branch" of the driveline, whereas the branch of the driveline pertaining to the pre-selected gear will be referred to as "non-active branch" or "pre-selected branch" of the driveline;

ii) a manoeuvre of driving over a hump at low speed, by way of example 7 km/h, once again executed with the first gear engaged (clutch K1 engaged) and second gear pre-selected (clutch K2 not engaged); and iii) a manoeuvre of driving over a hump at low speed, by way of example 5 km/h, with the driveline in conditions of so-called creeping, i.e., with the clutch associated to the active branch of the driveline not completely engaged; this means that the clutch that is associated to the odd gears is partially engaged in conditions of slipping to guarantee motion of the vehicle at a low speed (in the case under examination a constant speed of 5 km/h), rendering the speed of rotation of the engine independent of that of the primary shaft of the gearbox that comes under the clutch K1, and thus preventing the speed of the internal-combustion engine from dropping below the minimum speed of regular operation; in this way, the dynamics of what is located downstream of the clutches is decoupled from the dynamics of what is located upstream (engine inertia, and inertias, elastic characteristic, and hysteresis of the dual-mass flywheel), and the input of the transmission system is a constant torque developed by the clutch that manages the engaged branch.

The manoeuvres i), ii), and iii) may, alternatively, be classified in the framework of respective "kinds" of manoeuvres, namely:

i) manoeuvres at medium vehicle speed (principally under power) and such as to correspond to an engine speed of rotation higher than a critical running regime (which is located around idling), generally carried out in the first gear; there is envisaged a brief phase of acceleration with an engine speed of rotation of up to approximately 3500 r.p.m.; the clutch of the active branch (K1) is engaged;

ii) manoeuvres at low vehicle speed but higher than the speed that corresponds to the minimum speed of rotation that enables running of the engine of the vehicle;

iii) manoeuvres at low vehicle speed lower than the speed that corresponds to the minimum speed of rotation that enables running of the engine of the vehicle; to prevent the engine turning off, the latter works primarily with an (imposed) target speed of rotation, and the torque delivered to the driveline is regulated by modulation of the clutch of the active branch (K1), which is driven into partial opening (creeping manoeuvre); the dynamics of the vehicle is substantially determined by the clutch.

As preliminary note, in a dual-clutch gearbox, even though strictly speaking it is just the active branch of the driveline that is connected to the potential sources of disturbance (the terrain in the case of driving over a hump or of creeping, and the engine in the case of tip-out manoeuvres), in practice the disturbance is transmitted on both of the branches of the gearbox on account of the meshing of both of the branches with the differential crown wheel through the respective output pinions on the secondary shafts, and on account of transmission of the perturbation from the active branch to the non-active branch as a result of propagation of the disturbance through the gearcase.

The active branch is in general less sensitive to noise phenomena due to perturbations of the dynamics of the vehicle because the transmission of power through it in any case induces a condition of torsional preload that opposes in a natural way onset of noise phenomena resulting from impact due to recovery of backlash.

The non-active branch, instead, is more exposed to onset of noise phenomena since it is substantially without torsional preload, and—as has been said—is affected by the vibrations excited by the instantaneous angular acceleration of the differential, which is hence the point of contact between the two branches—the active one and the non-active one—of the driveline upon occurrence of the perturbation.

The events that generate noise in the driveline in general encounter favourable conditions in the low torque delivered by the engine during low-speed manoeuvres, or else in the instantaneous reduction of the torque delivered by the engine itself (change in sign of the torque transmitted). In other words, the condition potentially favourable for onset of vibrations and noise is created whenever the driveline operates with low values of torque; i.e., it is in conditions of low torsional preload, which is, in fact, applied "across" the driveline by the gears and by the engine.

Once again by way of general consideration, the main constraint of the control strategy that characterises the method according to the invention is to maintain the dynamic condition of the vehicle unaltered: intervention of the system that implements the method must be transparent to the occupants of the vehicle, who must not perceive any appreciable variations of dynamics with respect to the one set by the driver by acting on the accelerator and brake pedals. To do this, the method envisages:

a first step of detection of a condition that initiates a phenomenon of noise in the driveline by means of one or more sensors on board the motor vehicle, where the detection is executed in a proactive way by exploiting signals and/or sensors and/or methodologies that differ according to the manoeuvre that the vehicle is carrying out; and a second step of controlling, as a function of the detected condition and of a signal of said one or more sensors, an actuation of one or more actuators that govern corresponding devices of the motor vehicle that can be connected to the driveline and configured for generating a torsional pre-load condition in the driveline itself.

Detection of a condition that triggers a phenomenon of noise always takes place in a proactive way, meaning thereby the following methodologies, which apply according to the perturbing phenomenon itself.

In particular, as will be seen in what follows, detection of a condition that triggers a phenomenon of noise in the driveline of the motor vehicle includes detecting at least one of the following:

- a concentrated unevenness of the terrain, in particular a hump, a pot-hole, or a depression;
- a sudden variation of the torque transmitted by the driveline, for example, as a consequence of passage from a running condition under power to a condition of overrun;
- a value of torque delivered by the engine of the motor vehicle lower than a threshold value; and
- a value of torque delivered by the gearbox of the motor vehicle to the differential lower than a threshold value.

In the case of disturbance that is due, for example, to unevenness of the terrain (manoeuvres ii and iii), the phenomenon is detected before the drive axle (or axles) interact with the irregularity by means of an optical system including a stereoscopic camera configured for detecting irregularities of the terrain (i.e., capable of mapping the terrain with a resolution that enables irregularities such as pot-holes or dips in the road to be detected) in operating communication with the control unit CU. Alternatively, it is possible to use a three-dimensional laser-scanning system.

In this way, once the conformation of the terrain has been detected and the dynamic parameters of the vehicle (amongst which the speed) are likewise available, the unit CU can pre-arrange beforehand the intervention by implementing the method according to the invention, i.e., by controlling one or more of the aforesaid actuators.

It should moreover be noted that, in the case of a rear-wheel-drive vehicle, recognition of a condition that may potentially trigger disturbance and a consequent proactive intervention of the system may also be achieved by using normal sensors on board the vehicle without resorting to systems for mapping the terrain. In particular, it is possible to use a position transducer associated to the front suspensions, the accelerometer, and the datum of speed of the vehicle (which can be obtained in any known way) to recognise—on the basis of the behaviour of the front axle (which is idle)—the presence of a condition that potentially triggers a phenomenon of noise in the vehicle, and then to transfer the information to the unit CU so that it will activate the actuators that enable implementation of the method according to the invention. In this sense, a correct estimate of the speed of the vehicle is important in order to impose the time of reaction of the system.

In the case of disturbance following, for example, upon brief pick-up manoeuvres with sudden variations of sign of the engine torque (manoeuvre i), it is possible to detect in a proactive way the occurrence of a perturbing phenomenon simply by exploiting the algorithms for management of the dual-clutch gearbox already implemented on board the vehicle in so far as pre-selection of the gears is in part based upon prediction of the behaviour of the driver. In combination, it is possible to use the signals of one or more sensors of dynamic parameters of the vehicle, such as an acceleration sensor AS commonly installed on board the vehicle, and/or the phonic wheels of the anti-blocking system ABS of the vehicle brakes. For this purpose, each sensor is configured for sending a corresponding signal to the electronic control unit CU; namely:

- a signal S_AS_IN for the acceleration sensor;
- a signal S_FLB_IN for the phonic wheel associated to the front left brake FLB,
- a signal S_FRB_IN for the phonic wheel associated to the front right brake FRB,
- a signal S_RLB_IN for the phonic wheel associated to the rear left brake RLB, and
- a signal S_RRB_IN for the phonic wheel associated to the rear right brake RRB.

For all the other cases, i.e., manoeuvres that may potentially trigger phenomena of noise in the driveline on account of the low value of torque delivered by the engine during the manoeuvre, it is, instead, possible to implement a standard intervention by providing an algorithm in the engine control unit that activates the actuators that govern the brakes on the drive axle and/or the actuator that governs the clutch (K2) associated to the non-active branch of the driveline whenever the torque delivered by the engine is below a threshold value that is deemed as being a safety value in regard to onset of noise phenomena.

In fact, as already noted, the condition that sets the driveline of the vehicle to onset of noise phenomena is—in general for all manoeuvres—that of a low torque at input to the two branches of the driveline.

Of course, the algorithm will have to be calibrated in such a way as to guarantee an intervention that is as transparent as possible in regard to the user and as light as possible in terms of impact on fuel consumption, in so far as, with braking torques that are excessively high (in the case of intervention of the brake) or with torques transmitted by the clutch of the non-active branch that are excessively high, it is possible to arrive, not only at an excessive overheating of the clutch, but also rapidly at an intolerable increase in the fuel consumption at low speeds.

Within the latter general cases, it is possible to define a further subcase that consists in a strategy of minimization of the noise due to play within the differential.

In particular, it is possible to envisage a control strategy where a command is issued for intervention of the actuators that govern the brakes on the drive axle in the case where the torque transmitted from the gearbox to the differential is below a threshold value, for example, as a consequence of an intervention of reduction of torque on the clutch K1. In particular, in the case where the following condition arises $$T_{K1} \cdot \tau_{K1} + T_{K2} \cdot \tau_{K2} < T_{DIFF,min}$$

where $T_{K1}$ is the torque transmitted by the clutch K1 (active branch, odd gears);

$T_{K2}$ is the torque transmitted by the clutch K2 (non-active branch, even gears);

$\tau_{K1}$ and $\tau_{K2}$ are the overall transmission ratios, which are, respectively, the product of the transmission ratio of the gear speed and the ratio on the differential (differential crown wheel—output pinion of active branch), and the product of the transmission ratio of the pre-engaged gear and the ratio on the differential (differential crown wheel—output pinion of non-active branch); and $T_{DIFF,min}$ is a (minimum) threshold value of the torque applied to the differential crown wheel, which must be calibrated as a function of the degree of immunity to disturbance required by the specific application, then the aforesaid control strategy may envisage application of a braking torque $T_B$ defined as follows $$T_B = \max(0, T_{DIFF,min} - (T_{K1} \cdot \tau_{K1} + T_{K2} \cdot \tau_{K2}))$$

where the function "max" saturates to zero the minimum value of torque required of the brake. Intervention of the brake is automatically disabled at the moment when the torque transmitted to the differential is sufficiently high and hence the differential itself is adequately pre-loaded.

At the same time, the actuator of the clutch K1 is driven so as to increase the torque transmitted thereby via a value defined as $$\Delta T_{K1} = T_B/(\tau_i \tau_{K1}) - (T_{K2} \cdot \tau_{K2})/\tau_{K1}$$

in order to maintain the dynamics of motion of the vehicle unaltered, i.e., to render intervention transparent to the occupants of the vehicle.

The unit CU is configured for sending, once the occurrence of circumstances that trigger noise phenomena in the driveline has been detected, independent command signals that drive in an equally independent way the actuators that govern corresponding devices of the vehicle, which can be connected to the driveline and are configured for setting up a condition of torsional preload of the driveline itself.

Whatever the strategy selected for suppression of the noise due to backlash in the driveline, the actuators that can be driven by the unit CU include three categories of actuators, namely:

a. clutch actuators, i.e., the actuator of the first clutch K1 associated to the odd gears, and the actuator of the second clutch K2 associated to the even gears;

b. brake actuators, i.e., the actuators (callipers) FLC, FRC, RLC, RRC of the brakes FLB, FRB, RLB, RRB; and c. one or more actuators designed to regulate the torque output of the internal-combustion engine of the vehicle; this category of actuators develops an action that balances the dissipative contribution introduced by the first category and/or second category of actuators, guaranteeing proper dynamic behaviour of the vehicle, in particular minimizing or eliminating the variations of the dynamic behaviour induced by the action of the actuators of categories a. and b.

The control unit CU is in particular configured for driving three different types of intervention, of which the third is always present to compensate the effects of the first and second interventions, which can instead be implemented individually or in combination. In particular, these interventions include:

a first intervention consisting in sending a signal to the actuator that governs the clutch associated to the non-active branch of the driveline, and that results in an action of slight closing of the clutch itself, preferably without varying the position of the clutch associated to the active branch of the driveline;

a second intervention consisting in sending one or more signals to the actuators that govern the brakes, and in particular in sending one and the same signal to both of the actuators that govern the brakes on the axle connected to the driveline (drive axle) in order to prevent perturbation of the lateral dynamics of the vehicle; and a third intervention consisting in the request for an additional torque output to the engine of the vehicle for compensating for the variations of torque induced by the first intervention and/or second intervention.

As has been mentioned, the first and second interventions both constitute dissipative contributions that require a re-introduction of mechanical power into the system to guarantee the same dynamic conditions of the vehicle, i.e., to create a condition equivalent to the situation of absence of activation of the control strategy.

The first intervention, given that its action develops on a branch of the driveline that is in any case characterized by having a gear pre-selected, generates a state of torsional preload of the non-active branch of the driveline in so far as it introduces an alternative path for the flow of power (whatever the direction: from the wheels to the engine and vice versa).

The second intervention, which is independent of whether the driver activates or not the brake, is by definition antagonistic to the motion at constant speed of the vehicle in so far as it tends to bring the vehicle to a stop. By combining the effect of the first two interventions (either alternatively or in combination) with the third intervention, i.e., reintegrating via the engine the energy dissipated in the brakes and in the clutch associated to the non-active branch, there is determined an increase of the torsional preload already present in the driveline as a result of the flow of power from the engine to the wheels, necessary for maintaining the dynamic condition of the vehicle.

In particular, actuation can be obtained by means issuing the following signals:

a signal S_FLB_OUT for the actuator of the front left brake FLB (for example, a calliper FLC);

a signal S_FRB_OUT for the actuator of the front right brake FRB (for example, a calliper FRC);

a signal S_RLB_OUT for the actuator of the rear left brake RLB (for example, a calliper RLC);

a signal S_RRB_OUT for the actuator of the rear right brake RRB (for example, a calliper RRC);

a signal for the actuator that governs the clutch associated to the odd gears;

a signal for the actuator that governs the clutch associated to the even gears; and a signal for the electronic control unit that governs the engine, in particular a torque-regulation signal.

In the plots of the subsequent figures there are each time introduced quantities of a kinematic nature, which consist in a difference of angular position and are all associated to a notation of the type "$\Delta\theta$". These quantities are in general referred to meshing between gears or else to couplings between toothings of the synchronizers of the engaged gear and of the pre-selected gear.

In the first case (meshing between gears), the difference is defined between the angular position of the drive gear and the angular position of the driven gear, added to the axis of the drive gear. This is, in particular, a difference between the angular position of the drive gear (on the primary shaft, $\theta_{i,P}$) and the angular position of the driven gear (on the secondary shaft, $\theta_{i,S}$) referred to the primary shaft via the corresponding transmission ratio $\tau$, as represented in the following formula:

$$\Delta\theta_i = \theta_{i,P} - \tau_i \theta_{i,S}$$

(this leads to identifying, with positive values, a condition of resting on the pull side and, with negative values, a condition of resting on the release side)

Where $$\tau_i = z_S/z_P$$

$z_S$ being the number of teeth of the driven gear (secondary shaft);

$z_P$ being the number of teeth of the drive gear (primary shaft); and the index "i" indicating gear of the corresponding gear speed.

On the axis of the ordinates, the value "0" corresponds to a position of centre of play, where there exists the same amount of backlash to be recovered both to reach the condition of resting on the pull side and to reach the condition of resting on the release side, which is the play between the tooth of one gear and the two subsequent teeth of the meshing gear on both sides of the tooth (pull and release sides). The positive values indicate angular deviations that lead to coupling between the pull sides, whereas the negative values indicate angular deviations that lead to coupling between the release sides.

In the second case (synchronizers), the difference $\Delta\theta_{SIN\_i}$ is defined between the angular position of the engaged or pre-selected driven (idle) gear and the corresponding output pinion, as expressed by the following formula:

$$\Delta\theta_{SIN\_i} = \theta_{condotta\_i} - \theta_{pin,n}$$

where:

$\theta_{condotta\_i}$ is the angular position of the driven gear synchronised on the secondary shaft (where active or non-active according to the gear speed considered);

$\theta_{pin,n}$ is the angular position of the output pinion of the corresponding secondary shaft;

i is an index associated to the gear speed, in roman numerals; and n is an index associated to the output pinion that comes under the gear speed considered.

With reference to FIGS. 2 to 7, there now follows a description of a tip-out manoeuvre according to what is indicated in point i) above, and consequent corrective intervention according to the method of the invention.

Figure 2:
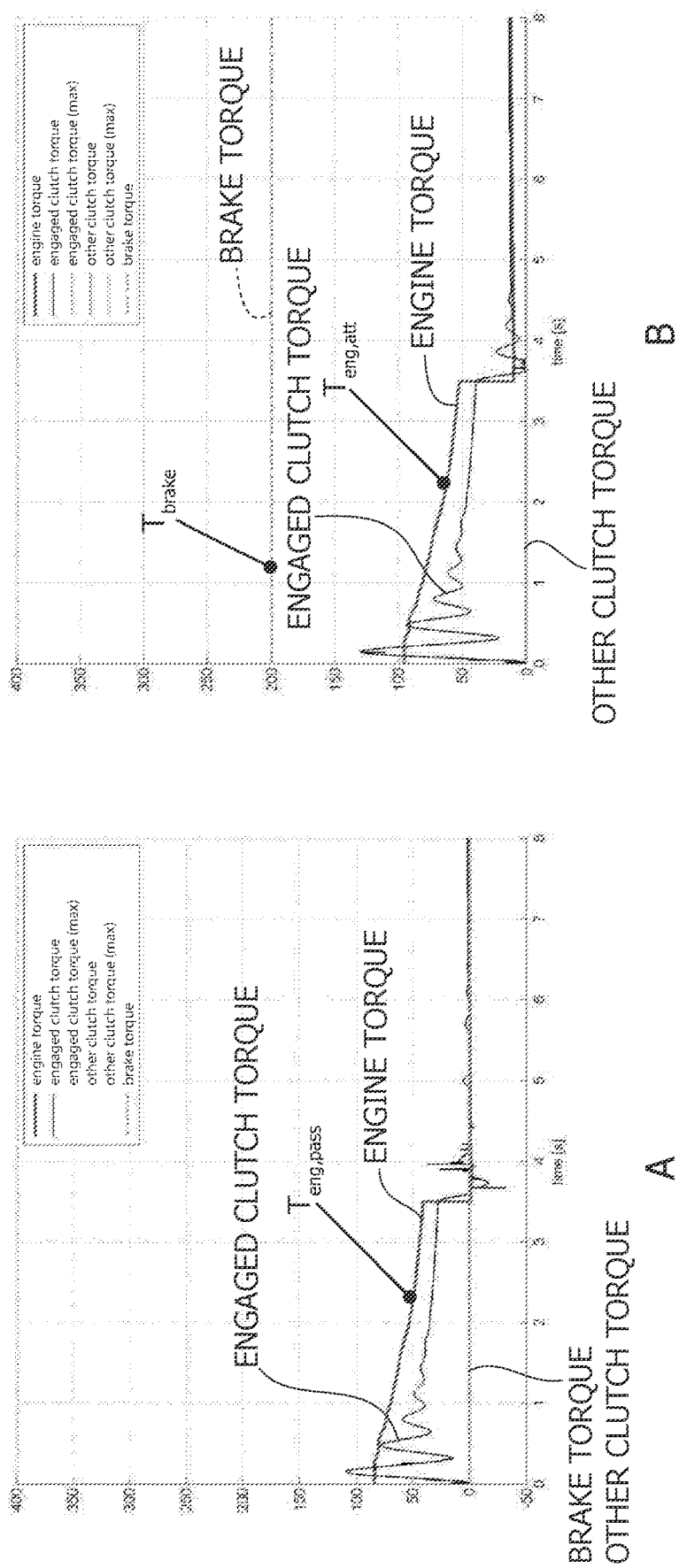
FIGS. 2 to 7 show comparative plots of dynamic and/or kinematic parameters of the driveline of a motor vehicle and all include a first set of plots associated to the letter A that refer to a condition of passive manoeuvre, i.e., in the absence of implementation of the method according to the invention, and a second set of plots associated to the letter B that refer to a condition of manoeuvre assisted via intervention according to the method of the invention.
Figure 3:
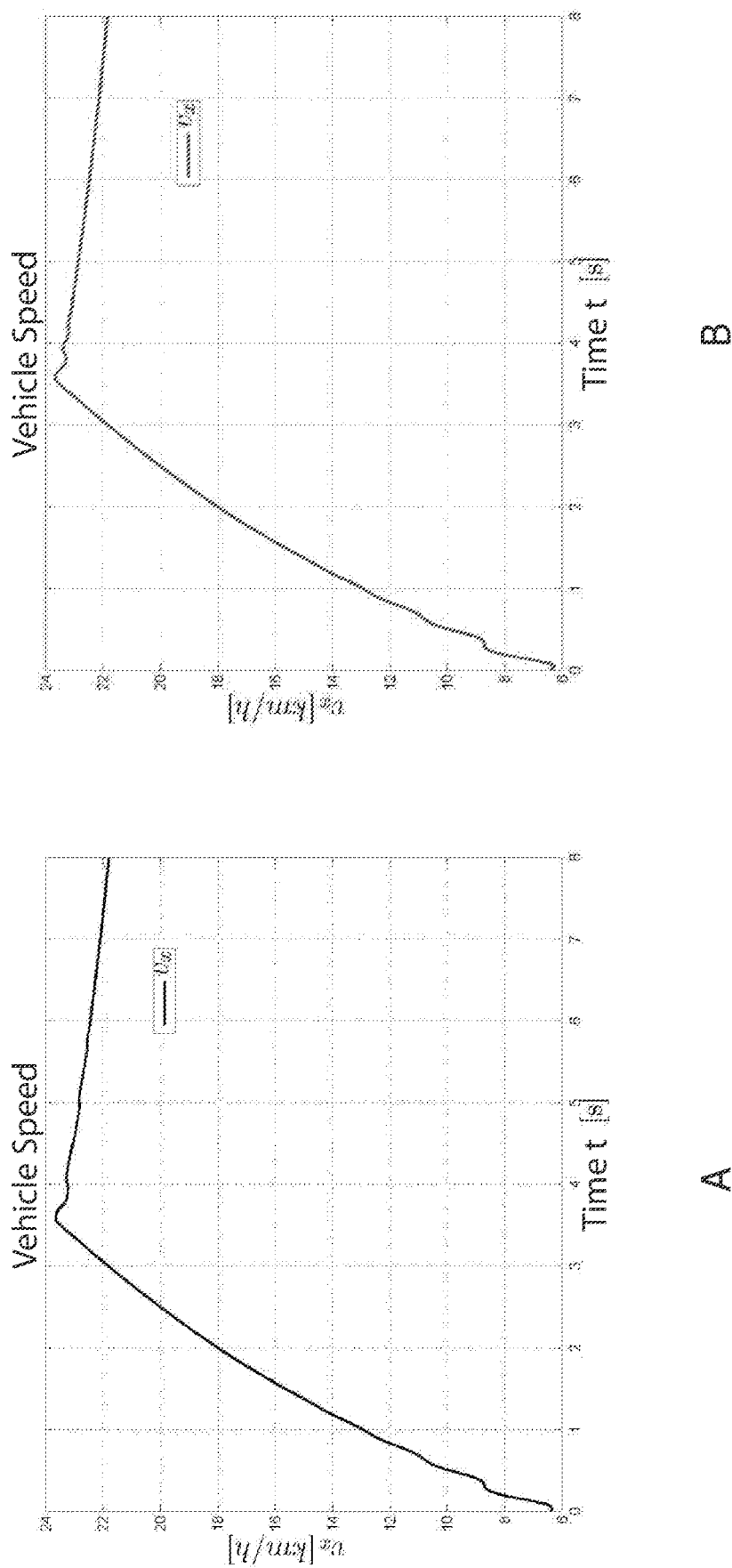

The intervention carried out by the system that implements the method according to the invention involves just the brakes on the drive axle With reference to FIG. 2, illustrated therein is a time plot of some characteristic torques of the dynamics of the vehicle; namely (see also the references adopted in the figure):

"engine torque", i.e., the torque delivered by the internal-combustion engine of the vehicle;

"engaged clutch torque", i.e., the torque transmitted by the clutch associated to the active branch of the driveline;

"engaged clutch torque (max)", i.e., the maximum value of torque that the clutch associated to the active branch of the driveline can transmit without slipping;

"other clutch torque", i.e., the torque transmitted by the clutch associated to the non-active branch of the driveline;

"other clutch torque (max)", i.e., the maximum torque that can be transmitted by the clutch associated to the non-active branch of the driveline in conditions of adherence, proportional to the modulatable axial force that presses the clutch disk into contact with the active surfaces of friction; given that the clutch is in slipping conditions, owing to the particular kinematic condition imposed by the two different transmission ratios on the two branches, the transmissible torque coincides with the torque effectively transmitted; and "brake torque", i.e., the braking torque exerted by the brakes on the drive axle.

FIG. 2A regards a passive maneuver, i.e., a condition where the tip-out maneuver occurs without activation of the method according to the invention.

It may thus be noted how the engine torque, here designated by the reference $T_{eng,pass}$ undergoes, around the instant t=3.5 s, a sharp reduction practically down to zero.

The maneuver consists, in fact, in a standing start of the vehicle with the first gear engaged and the second gear pre-selected, followed by a sudden release of the accelerator at the instant t=3.5 s.

Following upon tip-out, the torque transmitted by the clutch engaged undergoes a series of oscillations of a non-negligible amount (in the case in point with amplitude of up to 50 Nm) around the zero value at the instants immediately after the maneuver, and then settles on the zero value. These oscillations are due to the sudden reduction in the value of torsional preload on the active branch of the driveline following upon reduction of the value of torque delivered by the internal-combustion engine and clashing between the toothings of the rotating components of the driveline.

In the case of FIG. 2B, the same maneuver is repeated by activating the brakes on the drive axle, as witnessed by the "brake torque" curve that presents a constant ordinate equal to 200 Nm throughout the maneuver considered.

To be able to guarantee the same dynamic conditions for the vehicle as compared to the case of passive maneuver, it is necessary for the internal-combustion engine to deliver an increment of torque $\Delta T_{eng}$, which can be expressed as $$\Delta T_{eng} = T_{brake}/(\tau_T \eta_T)$$

whence $$T_{eng,act} = T_{eng,pass} + \Delta T_{eng}$$

where $T_{eng,act}$ is the torque delivered by the engine in the case of "active" maneuver, i.e., where implementation of the method according to the invention intervenes;

$T_{brake}$ is the torque exerted by the brakes on the drive axle;

$\tau_T$ is the global transmission ratio of the driveline of the vehicle; and $\eta_T$ is the global efficiency of the driveline of the vehicle.

In this way, as emerges from the plot of FIG. 2, the torque delivered by the engine is higher than in the case of passive maneuver and in particular is increased by the amount $\Delta T_{eng}$. From this it should be noted that, by virtue of the contribution of the brakes on the drive axle, the torque delivered by the internal-combustion engine never reaches the zero value: in this sense, the intervention of the brakes creates a so-called torque offset for the engine of the vehicle, which torsionally pre-loads the driveline.

The effect on the torque transmitted by the engaged clutch is immediately visible in FIG. 2B: the oscillations around the static value of the torque delivered by the engine are of shorter duration and smaller amplitude.

As evidence of the fact that the constraint of the control strategy according to the invention is respected, i.e., that the dynamics of the vehicle is kept as unaltered as possible, reference may be made to the plots of FIGS. 3A and 3B. It will be noted, in particular, that notwithstanding intervention of the brakes on the drive axle, the longitudinal-speed profile of the vehicle identified by the reference vx has not undergone significant variations with respect to the case of the passive maneuver.

Figure 4:
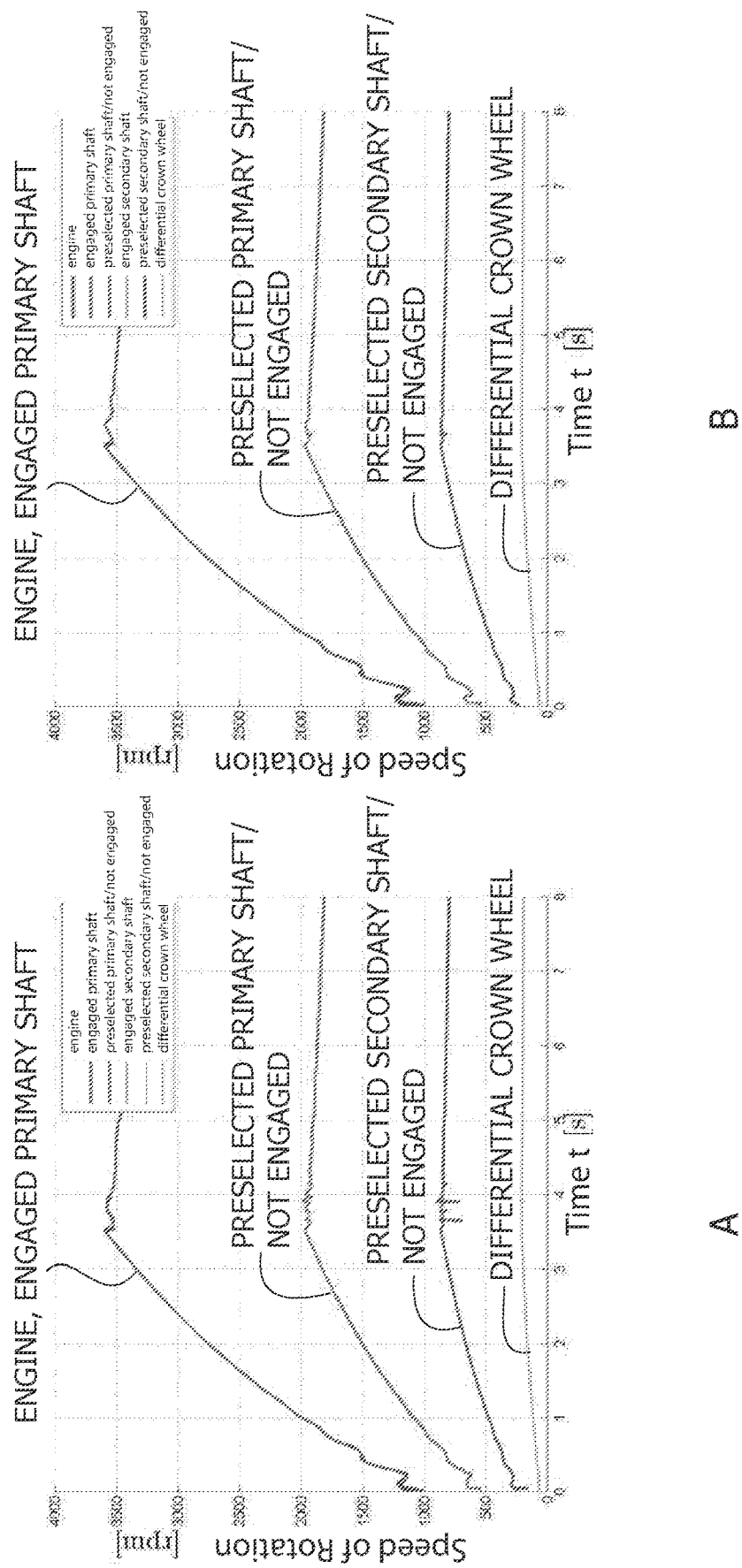

With reference to FIG. 4, illustrated therein is the time plot of the angular velocities of some rotating members of the driveline, namely:

"engine", i.e., the angular velocity of the engine crankshaft;

"engaged primary shaft", i.e., the angular velocity of the primary shaft in the active branch of the gearbox;

"preselected primary shaft/not engaged", i.e., the angular velocity of the primary shaft associated to the non-active branch of the driveline;

"engaged secondary shaft", i.e., the angular velocity of the secondary shaft in the active branch of the gearbox;

"preselected secondary shaft/not engaged", i.e., the angular velocity of the secondary in the non-active branch of the gearbox; and "differential crown wheel", i.e., the angular velocity of the differential crown wheel.

In the plots the curves for the engine and the primary shaft engaged are obviously practically the same on account of the same speed of rotation guaranteed by engagement of the clutch K1

What may be noted from a comparison between FIGS. 4A and 4B is a significant reduction of the perturbations of angular velocity of the shafts associated to the non-active branch of the driveline with activation of the brakes on the drive axle. It should be noted, in particular, how the oscillations around the instant t=3.5 s are of an amount decidedly more modest than those of the plot of FIG. 4A.

Figure 5:
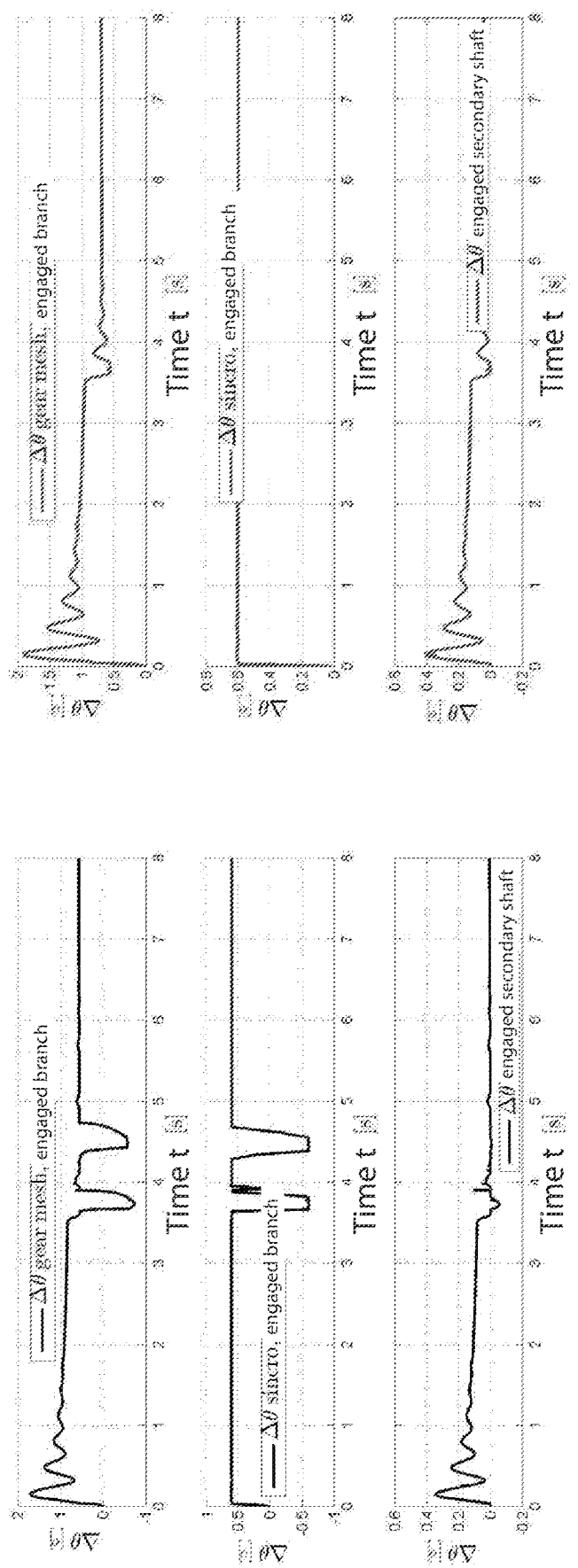
Figure 6:
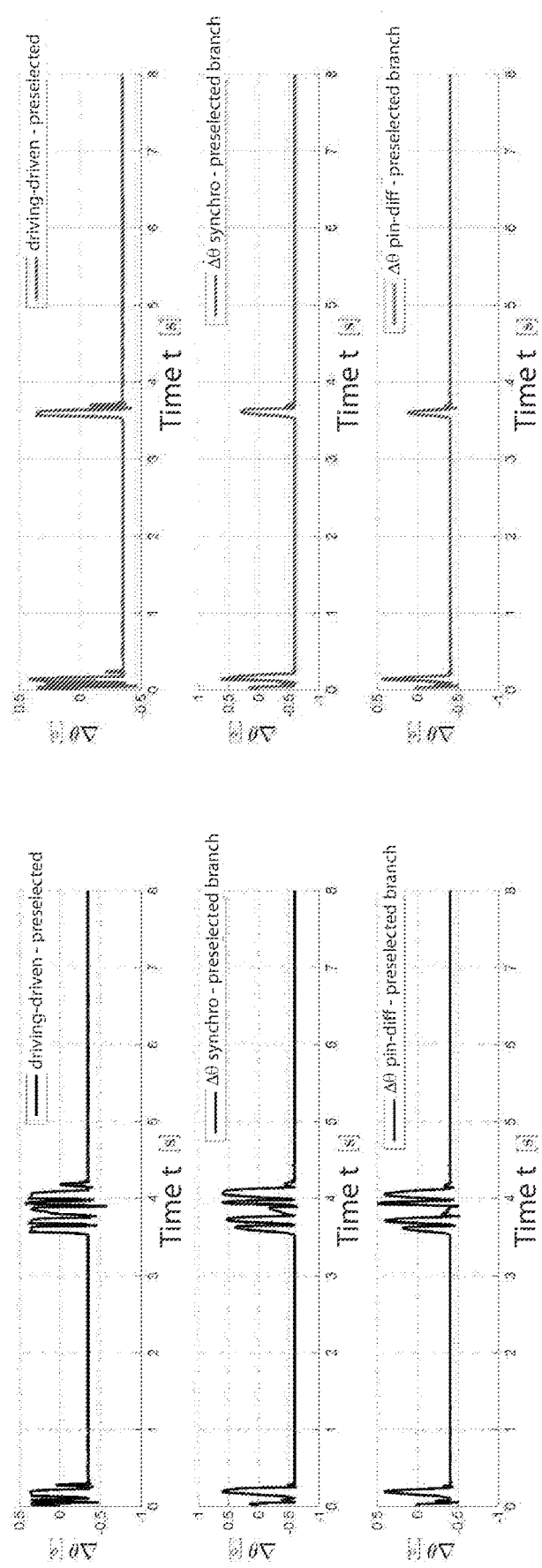

With reference now to FIGS. 5 and 6, they represent the difference of angular position of some rotating members of the driveline in the active branch (FIG. 5) and in the non-active branch (FIG. 6) of the driveline. The letters A and B once again denote the conditions of absence of the method according to the invention and of implementation of the method, respectively.

FIG. 5 represents three plots for each portion A, B, which are dedicated each to a different kinematic quantity; namely:
the first plot at the top represents the difference of angular position between the drive gear and the driven gear (notation in the figures: "Δθ gear mesh, engaged branch", or else, in the subsequent figures, "Δθ driving driven/engaged branch"), the latter referred to the axis of the drive gear, for the meshing corresponding to the first gear speed (I, engaged); the sign conventions adopted identify uniquely the resting pull and release sides, as already described; in terms of a formula:

$$\Delta \theta_I = \theta_{I,P} - \tau_I \theta_{I,S}$$

the second plot starting from the top represents, instead, the difference of angular position in the first-gear-speed synchronizer (notation in the figures: "Δθ synchro, engaged branch"); in terms of a formula:

$$\Delta \theta_{SIN\_I} = \theta_{condotta\_I} - \theta_{pin,1}$$

the third plot, at the bottom, represents, instead, the torsion of the secondary shaft engaged (notation in the figures: "Δθ engaged secondary shaft").

The first two plots of FIG. 6 illustrate the same quantities as those of FIG. 5, but all referred to engagement of the second gear speed and to the non-active branch of the driveline; namely:
the first plot at the top represents the difference of angular position between the drive gear and the driven gear, the latter referred to the axis of the drive gear, for the meshing corresponding to the second gear speed (II, pre-selected; notation in the figures "driving-driven", sometimes "driving-driven—preselected); the sign conventions adopted identify uniquely the resting pull and release sides, as already described; in terms of a formula:

$$\Delta \theta_{II} = \theta_{II,P} - \tau_{II} \theta_{II,S}$$

the second plot starting from the top represents, instead, the difference of angular position in the second-gear-speed synchronizer (notation in the figures: "Δθ synchro-preselected branch", in terms of a formula:

$$\Delta \theta_{SIN\_II} = \theta_{condotta\_II} - \theta_{pin,2}$$

the third plot, at the bottom, represents the variation between the angular position of the output pinion of the pre-selected secondary shaft (on the non-active branch of the driveline) and that of the differential crown wheel (notation in the figures "Δθ pin-diff-preselected branch", in terms of a formula:

$$\Delta \theta_{pin\text{-}diff,pres} = \theta_{S,pin,pres} - \tau_{pin\text{-}diff,pres} \theta_{diff}$$

where:
$\theta_{S,pin,pres}$ is the angular position of the output pinion of the secondary shaft of the non-active branch of the driveline;
$\theta_{diff}$ is the angular position of the differential crown wheel; and
$\tau_{pin\text{-}diff,pres}$ is the transmission ratio between the output pinion of the shaft of the non-active branch and the differential crown wheel.

From a comparison between the plots of FIG. 5A and FIG. 5B there emerges immediately the beneficial effect in terms of reduction of noise obtained by intervention of the brakes. In particular, it should be noted that in the condition of passive manoeuvre, repeated changes in the resting side occur (from the pull side to the release side, and vice versa) in the gear coupling corresponding to the first gear speed and in the synchronizer, a phenomenon that is absent, instead, with activation of the brakes. In the case of manoeuvre assisted by means of the method according to the invention, the difference of angular position never changes sign thanks to the increase in the value of torsional preload due to the offset effect on the torque introduced by intervention of the brakes themselves, and consequently no change in the resting side occur.

As regards the non-active branch, the plot of FIG. 6A and the plot of FIG. 6B mainly highlight a marked reduction of the oscillations due to propagation of the vibrations in the driveline. However, it will be noted that it is not possible to obtain results comparable to the ones that are obtained on the active branch of the driveline in so far as the non-active branch presents, as single point of contact with the driveline, the meshing between the output pinion on the secondary shaft associated to the even gears and the differential crown wheel, without being engaged by the engine, so that the direct benefit of the torque offset introduced cannot be perceived.

Figure 7:
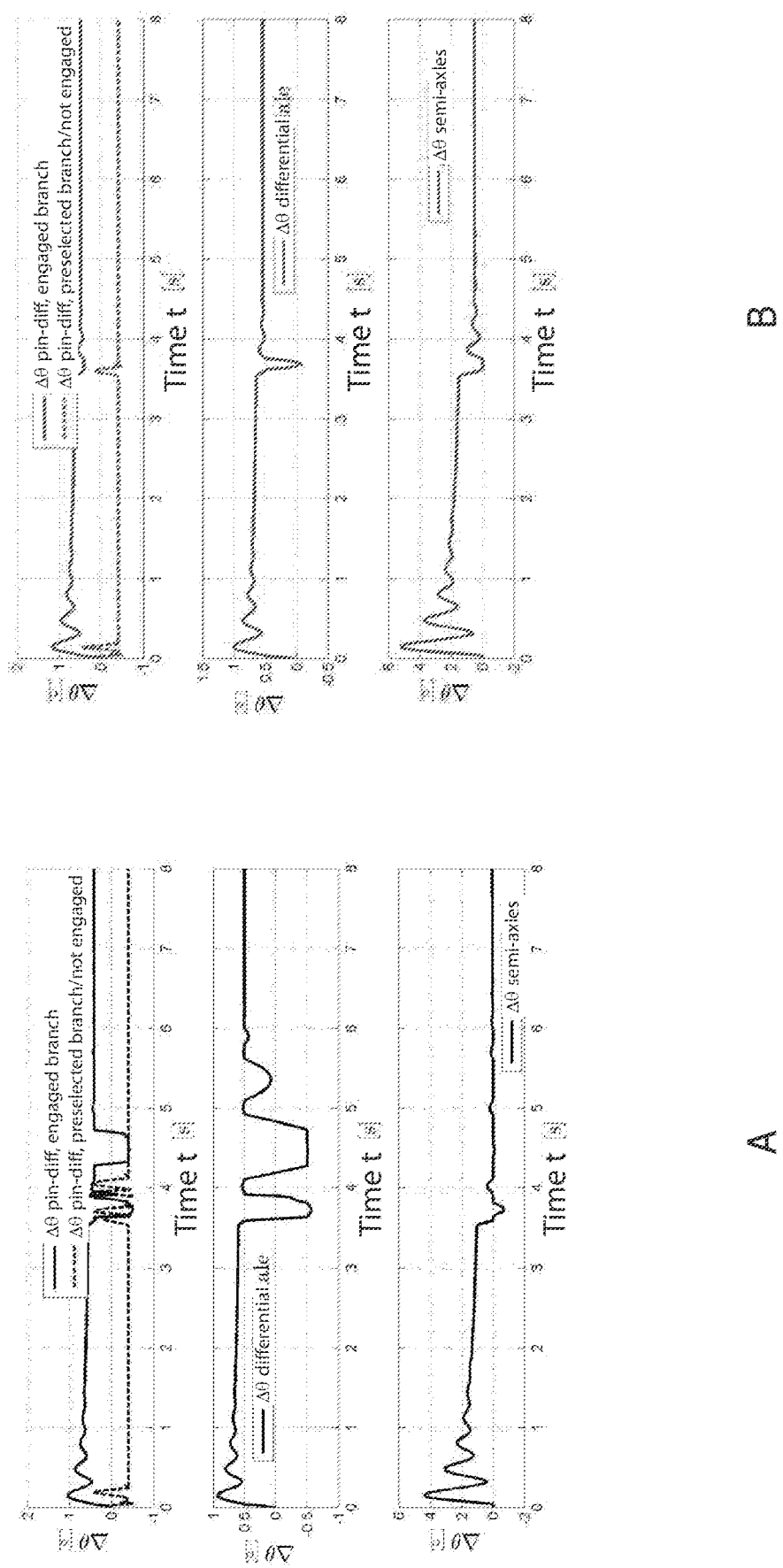

With reference to FIG. 7, the plots of each of the portions A and B illustrate, from the top down:
superimposed plots of the differences of angular position in the meshing between the output pinion and the differential crown wheel of the engaged branch and of the pre-selected/non-engaged branch (respective notation in the figures: "Δθ pin-diff-engaged branch", "Δθ pin-diff-preselected branch/not engaged"),
a plot of the difference of angular position $\Delta \theta_{DIFF,INT}$ due to internal play of the differential (notation in the figures "Δθ differential"), defined as $$\Delta \theta_{DIFF,INT} = \theta_{CORONA\_DIFF} - \theta_{SOLARI}$$

where:
$\theta_{CORONA\_DIFF}$ is the angular position of the differential crown wheel; and
$\theta_{CORONA\_DIFF} - \theta_{SOLARI}$ is the angular position of the differential sun gears;
a plot of the difference of angular position due to torsion of the axle shafts (notation in the figures: "Δθ semiaxles"), calculated as difference between the position of the two inertias (wheel and joint at output from the differential) at each side of the torsional stiffness that represents the axle shaft.

What is clearly evident in the passage from the condition of passive manoeuvre of FIG. 7A to the condition of assisted manoeuvre of FIG. 7B is a substantial reduction of the oscillation in the difference of angular position during the tip-out manoeuvre, with consequent reduction of noise and impact.

In conclusion, the presence of the braking torque on the drive axle applied in a constant way throughout the manoeuvre, with consequent increase in torque delivered by the internal-combustion engine, reduces the number of impacts between the rotating components in the driveline both on the active branch and—even though in to a lesser extent for the reasons referred to above—on the non-active branch.

With reference to FIGS. 8 to 13, there now follows a description of the same plots of FIGS. 2 to 7 with reference to a control strategy that envisages the combined intervention of the brakes on the drive axle and of the clutch of the non-active branch of the driveline.

Figure 8:
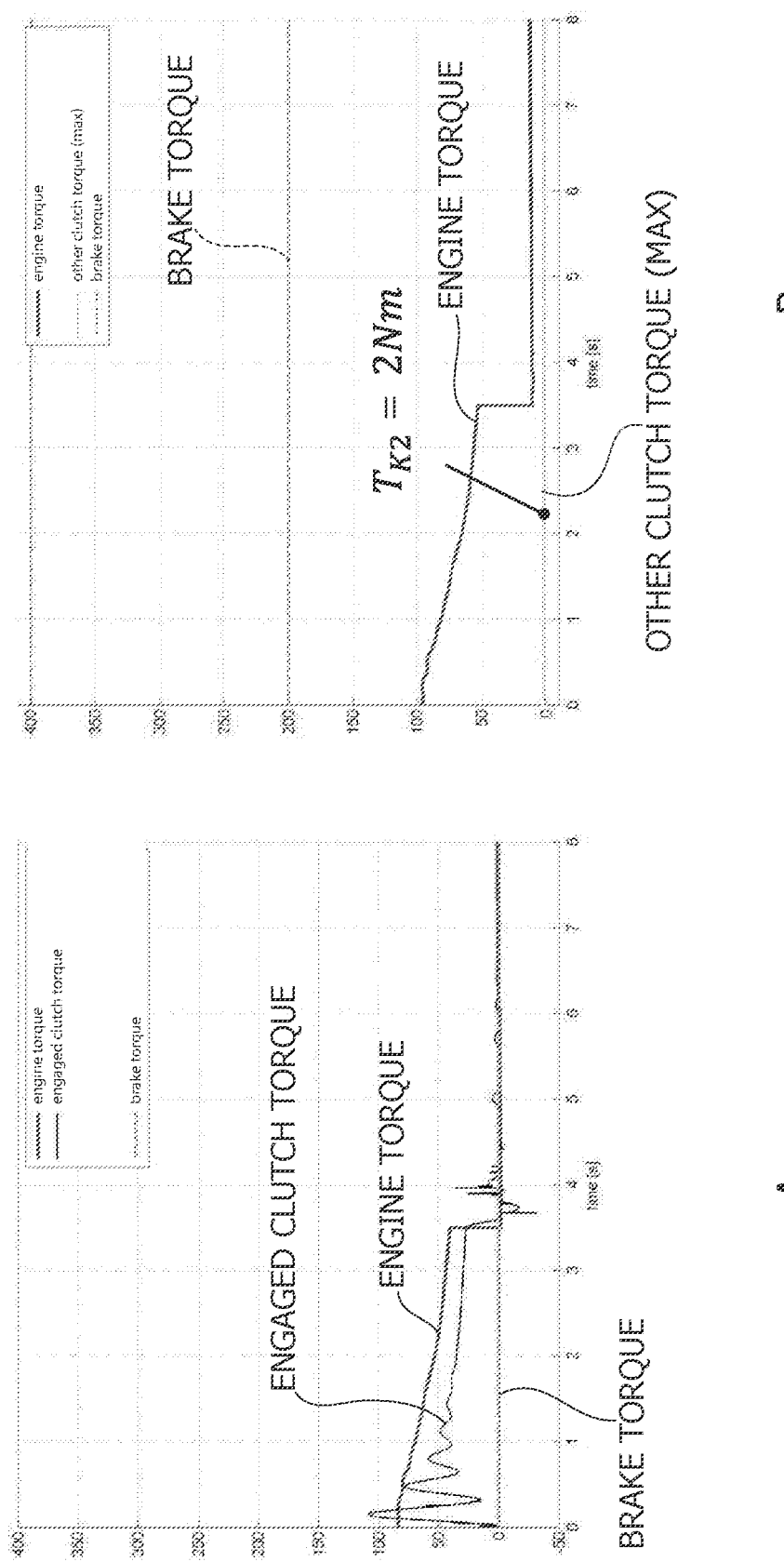
FIGS. 8 to 13 are equivalent to FIGS. 2 to 7 and include a portion marked by the letter A and a portion marked by the letter B, which have the same meaning as that described in relation to FIGS. 2 to 7, but refer to a different intervention according to the method of the invention.
Figure 9:
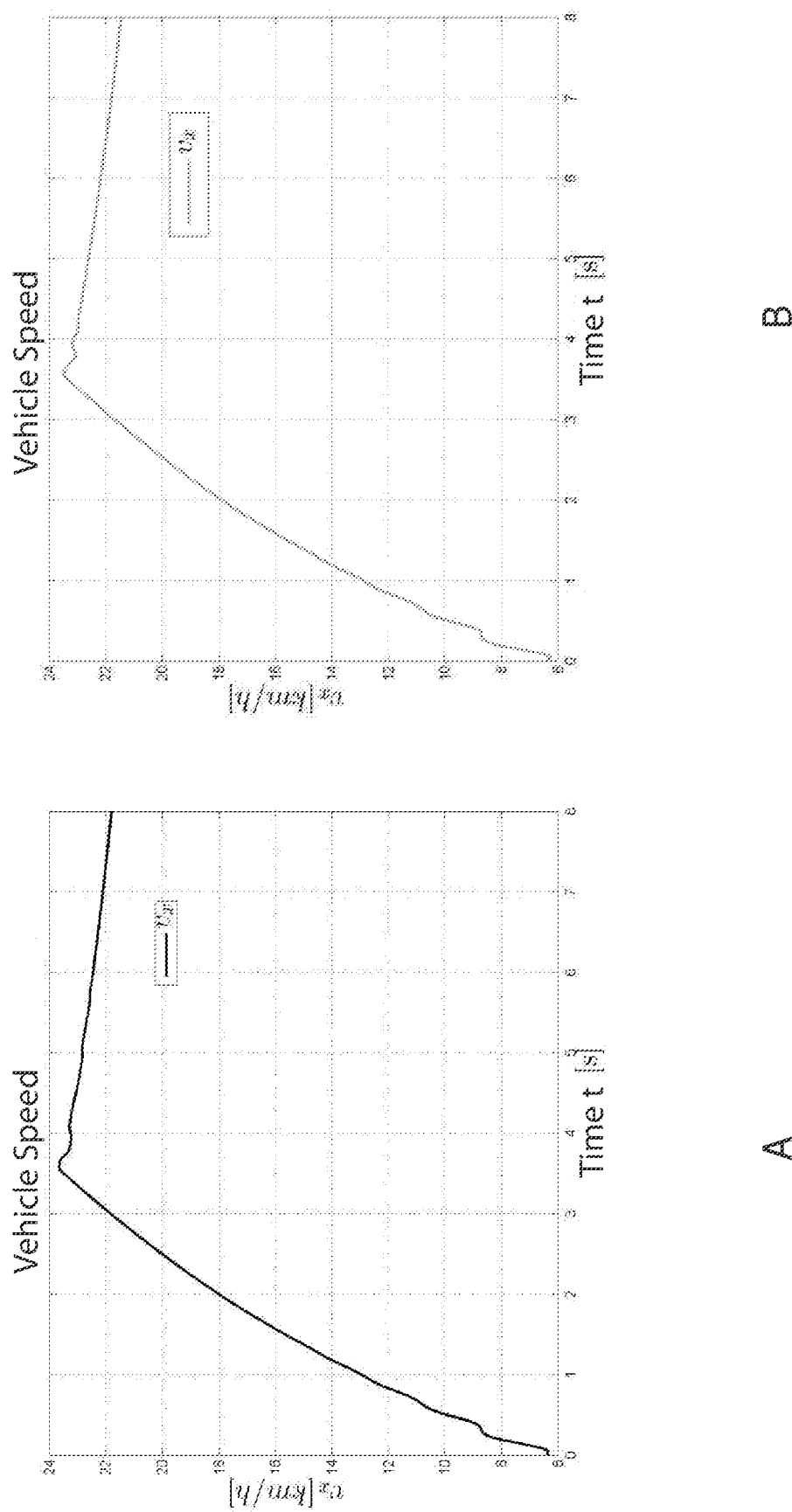
Figure 10:
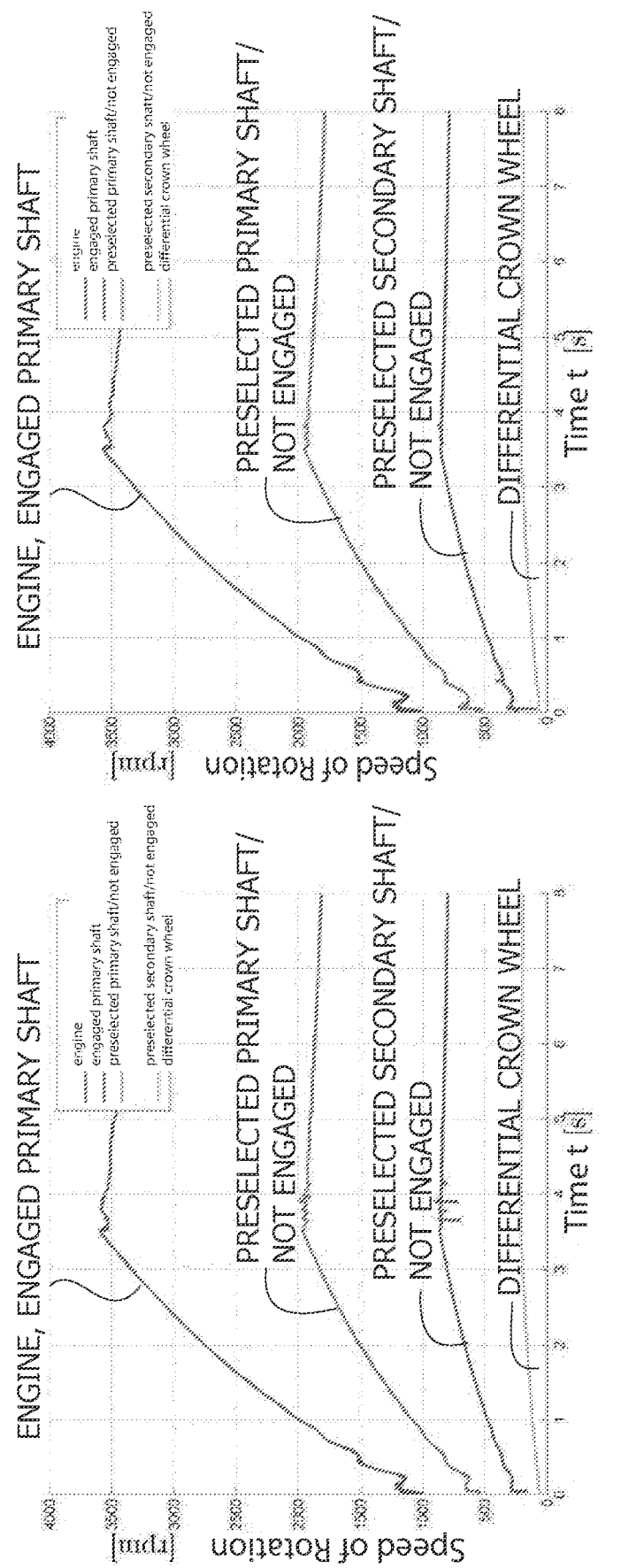

The plots of FIG. 8 correspond to the plots of FIG. 2 and use the same references. In the plot of FIG. 8B, however, also the torque applied by the clutch associated to the non-active branch of the driveline has values other than zero (in this case, a value of 2 Nm), whereas the torque applied by the brakes is again 200 Nm. In this way, the torque delivered by the engine must counter the dissipative contributions of the clutch associated to the non-active branch and of the brakes.

The speed of the vehicle (FIG. 9), as already in the previous case, is kept substantially identical in the cases of passive manoeuvre and assisted manoeuvre.

Turning now to FIGS. 10A and 10B, there may be noted, as compared to the corresponding plots of FIGS. 4A, 4B, an even more marked reduction of the oscillations in the angular velocities of the rotating members of the non-active branch of the driveline due to the combined intervention of the brake and clutch, in particular of the latter.

Figure 11:
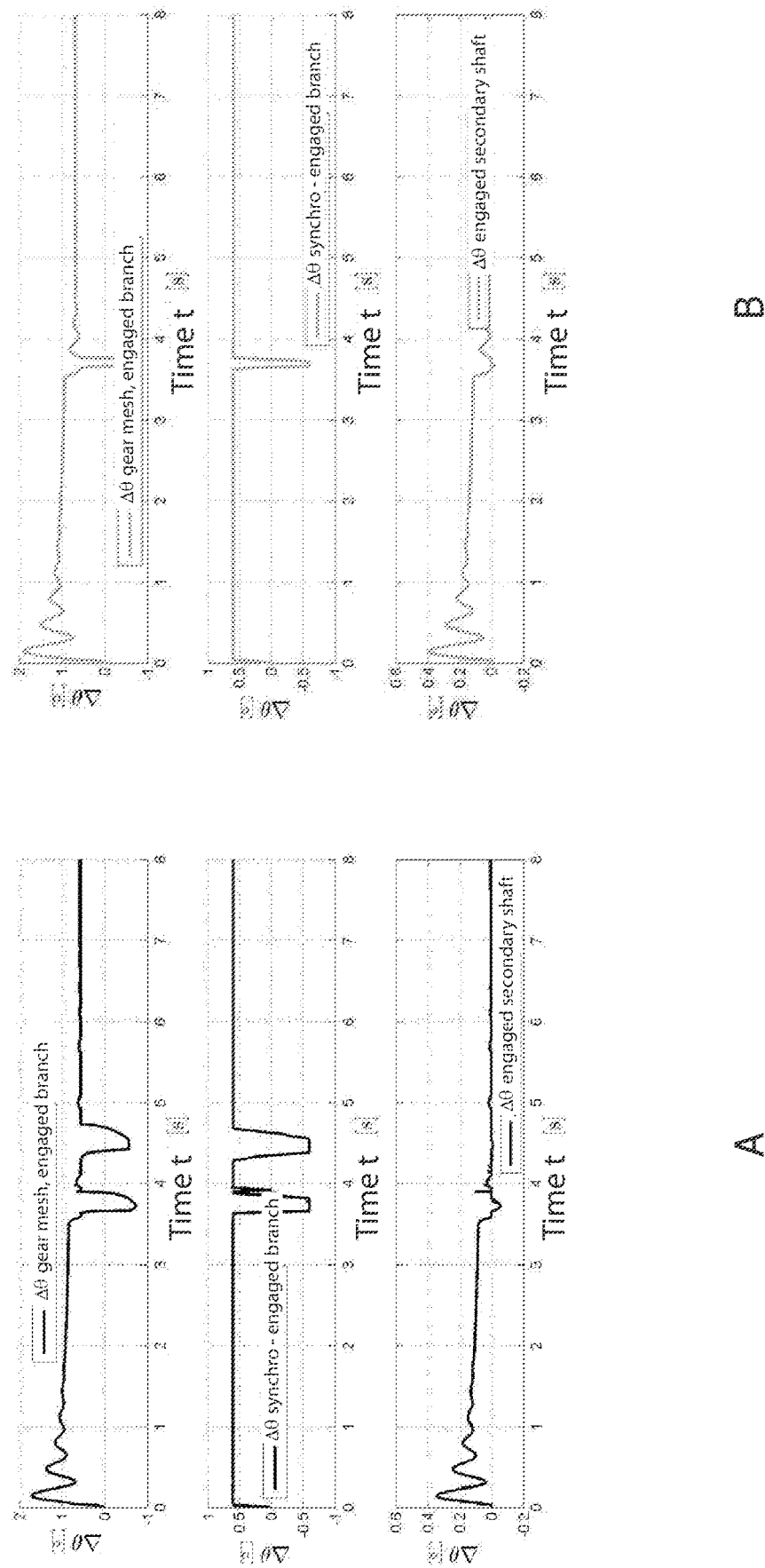
Figure 12:
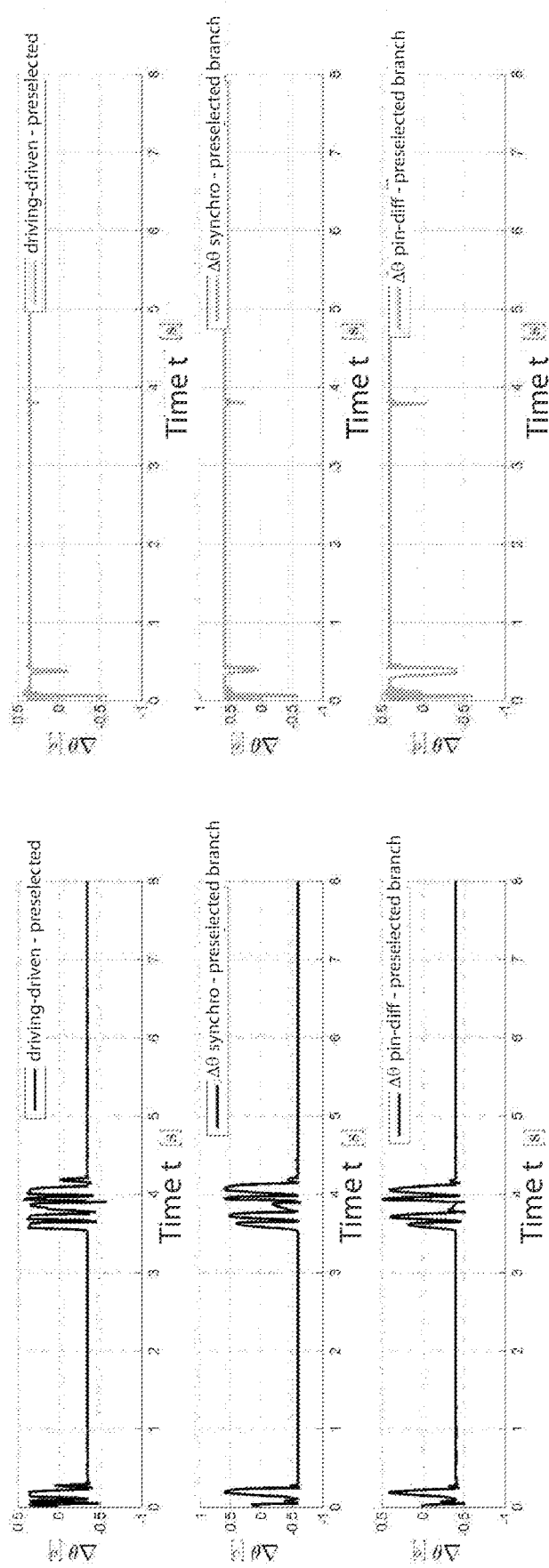

As regards FIGS. 11 and 12, which are similar to FIGS. 5 and 6, the beneficial effect on reduction of impact in the active branch of the driveline is maintained, but, with reference in particular to FIGS. 12A and 12B, the effect of intervention of the clutch of the non-active branch on reduction of impact in the non-active branch itself is extremely significant.

It should be noted in fact how all the rotating members involved in the non-active branch of the driveline are systematically kept resting on the pull side thanks to intervention of the clutch K2, which, driven by the corresponding actuator, enables setting-up of a condition of torsional preload also in a branch that in passive conditions would not be subject to any appreciable preload.

It should likewise be noted that the particular operating condition of the non-engaged branch enables working with very low values of torque transmitted by the corresponding clutch (2 Nm in the example considered) in so far as higher values could be harmful for integrity of the driveline and/or penalising as regards vehicle fuel consumption.

Figure 13:
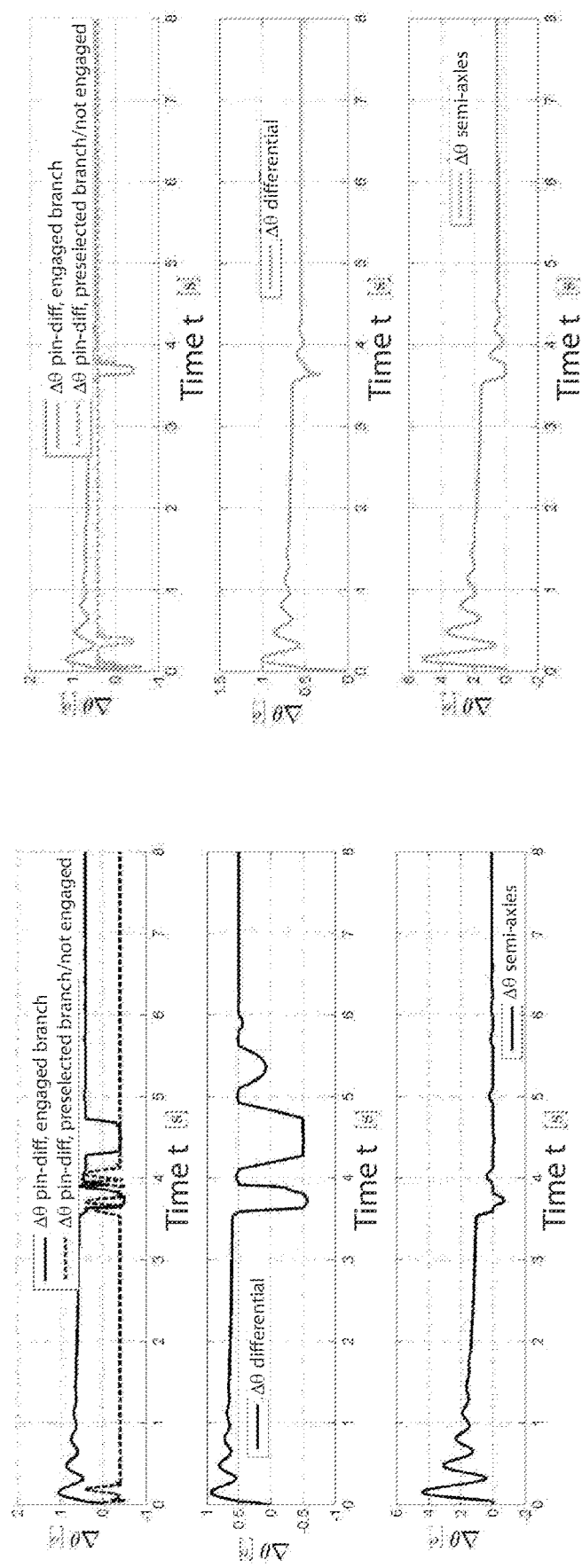

The plots of FIG. 13 highlight, consistently, how the behaviour of the non-active branch of the driveline is in effect aligned with that of the active branch thanks to intervention of the clutch K2. From the first plot at the top in FIG. 13B it should, in particular, be noted that, unlike the plot of FIG. 7B, the difference of angular position between the output pinion and the differential crown wheel in the non-active branch of the driveline is rendered substantially uniform with that of the active branch, eliminating the phenomena of change of resting side in the rotating members.

The plots of FIGS. 14 to 17 summarize the comparisons described previously: all the portions "A" of these figures represent a condition where just the brakes intervene, whereof the portions "B" represent a condition where a combined intervention of the brake and the clutch is envisaged.

Figure 14:
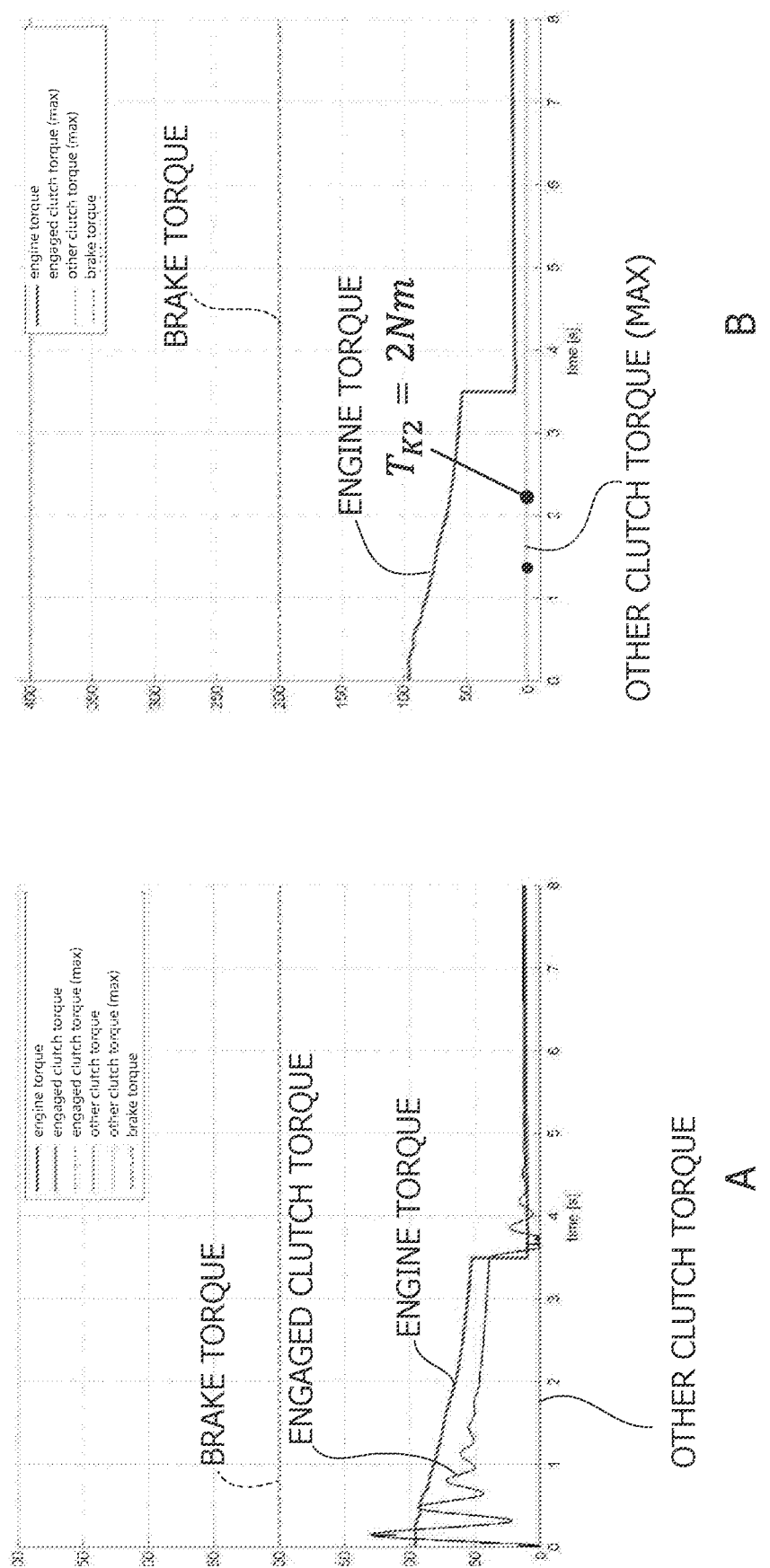
FIGS. 14 to 17 include comparative plots of dynamic and/or kinematic quantities of the vehicle in the conditions of intervention as per FIGS. 2 to 7 and in the conditions of intervention as per FIGS. 8 to 13, where the plots marked by the letter A are associated to the intervention as per FIGS. 2 to 7, whereas the plots marked by the letter B are associated to the intervention as per FIGS. 8 to 13.
Figure 15:
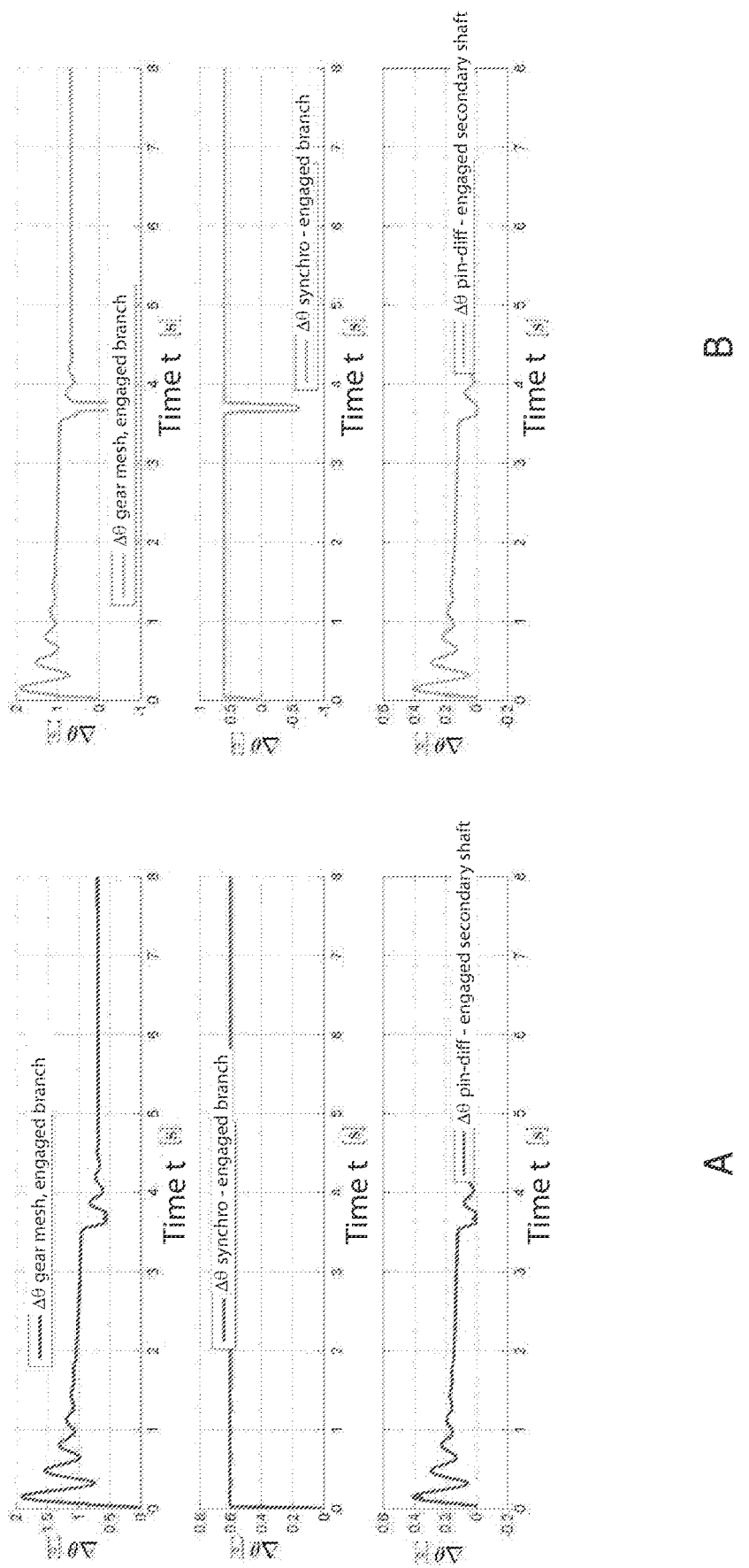
Figure 16:
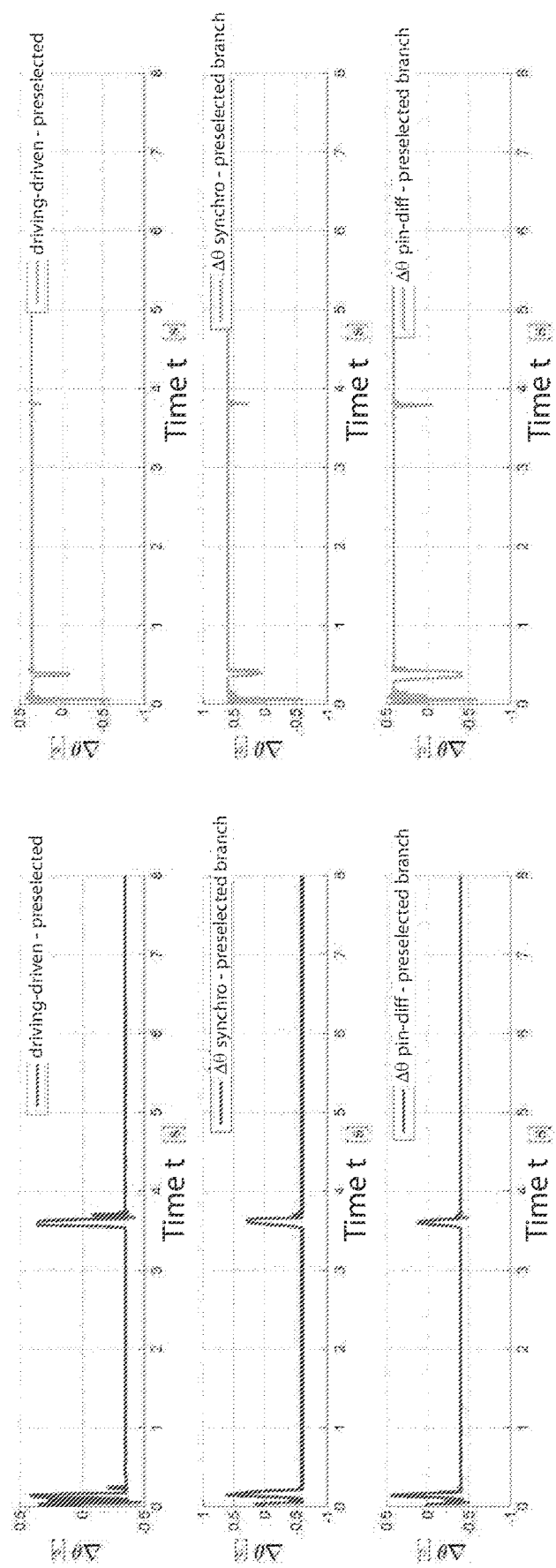
Figure 17:
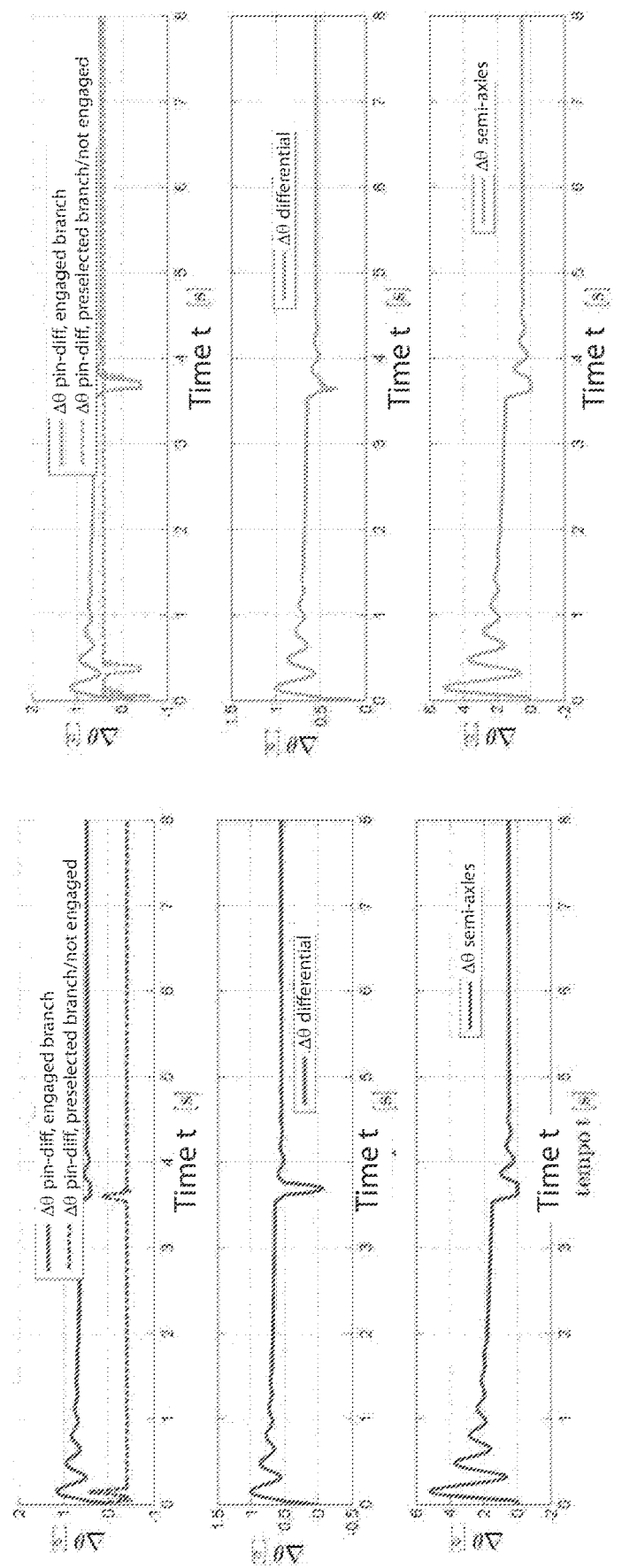
Figure 18:
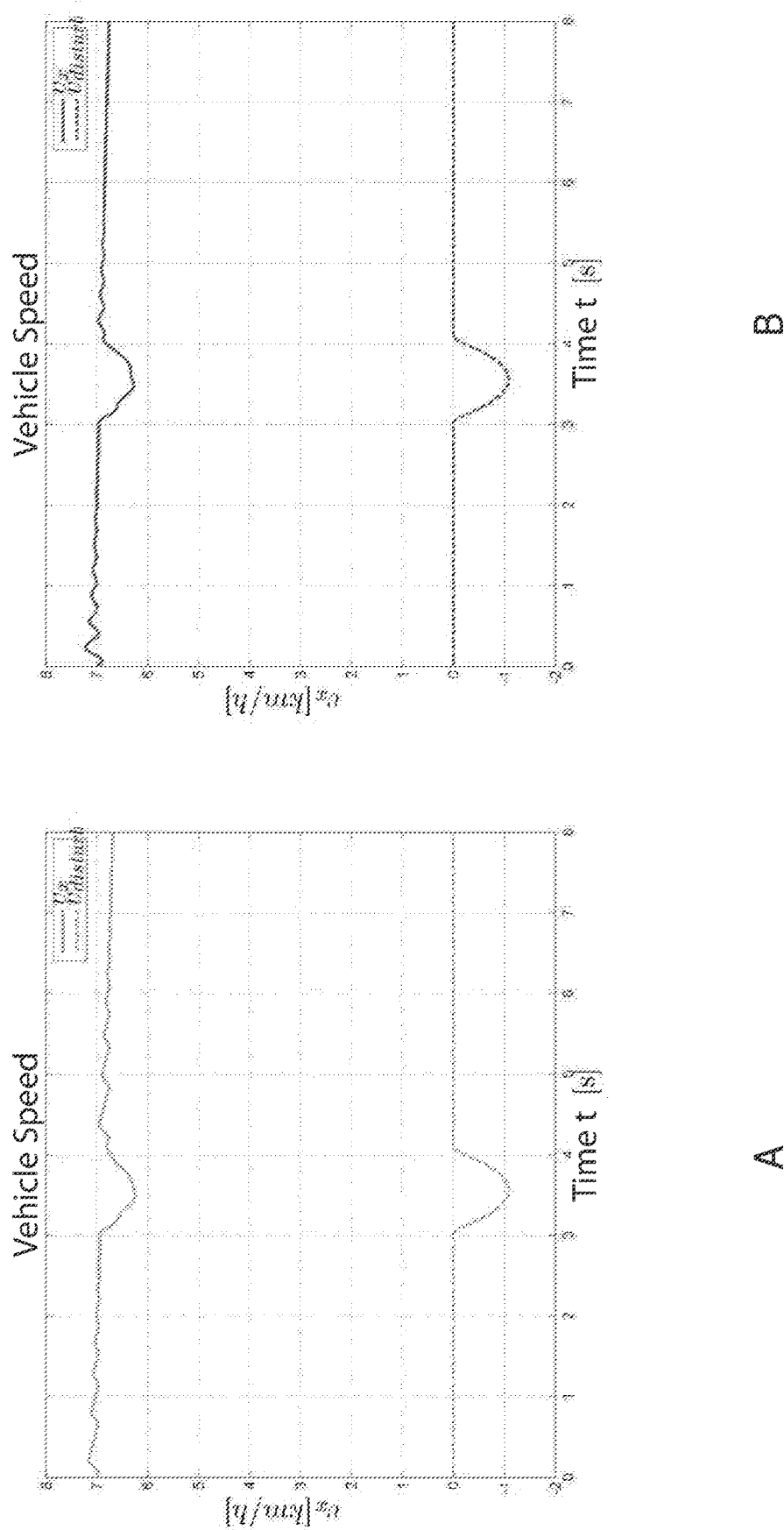
FIGS. 18 to 22 are equivalent to FIGS. 2 to 7 and refer to the same type of intervention, but regard a different manoeuvre of the vehicle.
Figure 19:
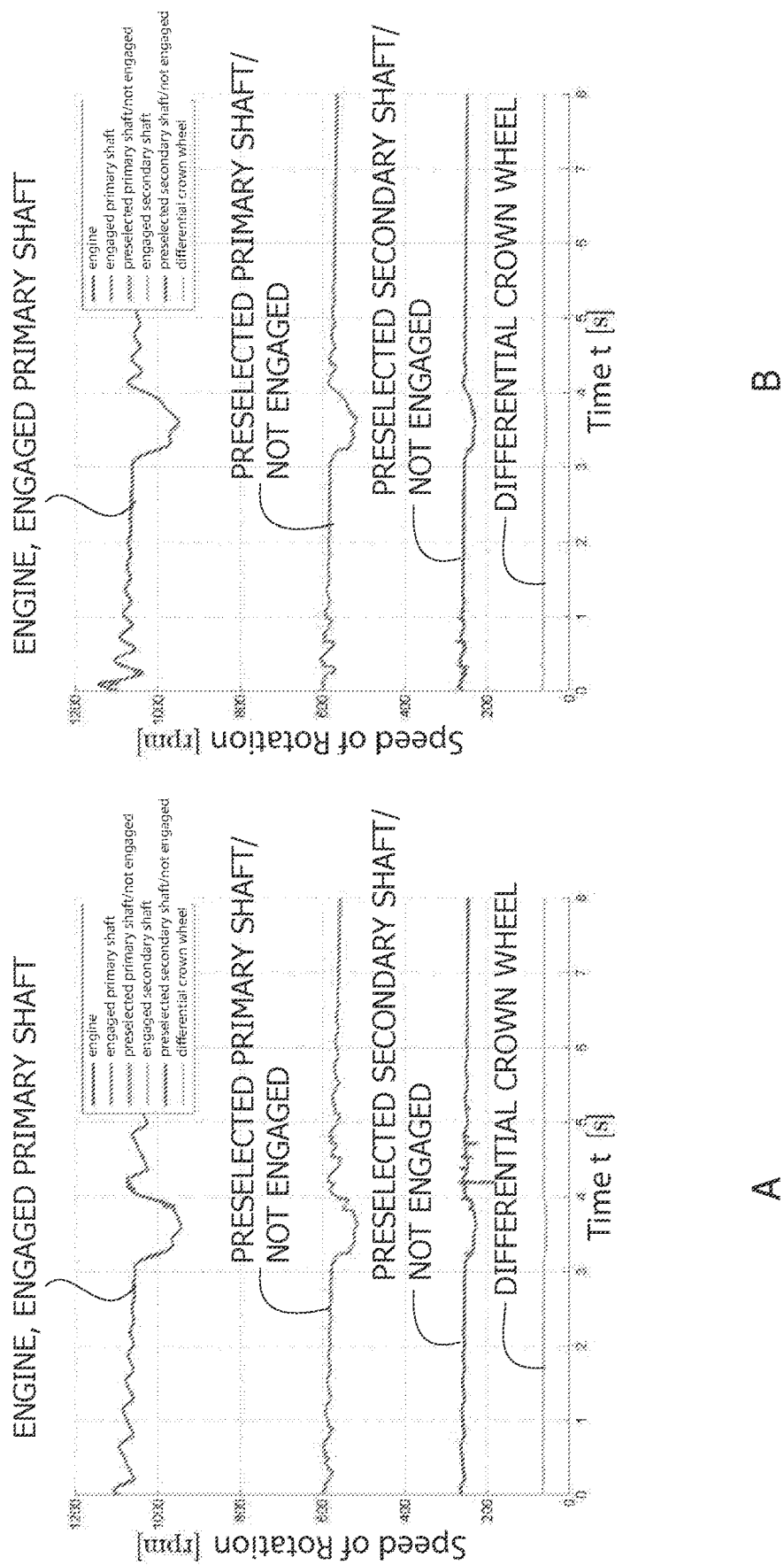

In particular, FIG. 14 reproduces, for comparison, the plots of FIGS. 2B and 8B, FIG. 15 reproduces, for comparison, the plots of FIGS. 5B and 11B, FIG. 16 reproduces, for comparison, the plots of FIGS. 6B and 12B, whereas FIG. 17 reproduces, for comparison, the plots of FIGS. 7B and 13B.

What may be noted from a comparison of the plots is that activation of the clutch with a small value of torque reduces impact on the non-active branch of the driveline but leads to a slight deterioration on the active branch as compared to the case of activation of the brake alone. For this reason, in general its activation is not necessarily the best solution, but it is in any case significant where the greatest contribution to noise is made precisely by the non-active branch of the driveline.

There now follows a description of a manoeuvre of driving over a hump at low speed according to point ii) above.

From the acceleration/speed of the vehicle imposed by the manoeuvre, it is possible to obtain the degree of perturbation (longitudinal force) acting on the vehicle as a consequence of driving over the hump:

$$F_a = m \cdot a_x \quad \text{(Eq. 1)}$$

where m is the mass of the vehicle, and $a_x$ is the longitudinal acceleration.

This additional force enters into the longitudinal dynamic budget of the vehicle as action of disturbance:

$$T_W/R + F_a - F_{coast\_down} = m \cdot a_x$$

where $T_W$ is the total torque applied to the drive wheels, R is the radius of the wheel of the vehicle, $F_{coast\_down} = F_0 + F_1 \cdot v + F_2 \cdot v^2$ is the total resistance to advance of the vehicle in stationary conditions, and v is the speed of the vehicle.

Considering the disturbance as single factor responsible for onset of an acceleration on the vehicle (see Eq. 1), the torque applied to the wheel and coming from the driveline must balance exactly the stationary resistant load of the vehicle:

$$T_W = F_{coast\_down} \cdot R$$

Since the manoeuvre of driving over a hump develops at constant average speed, the loaded branch of the driveline has to transmit through the clutch K1 a torque $T_{K1}$ necessary to overcome the stationary load of the vehicle (aerodynamic resistance, resistance to rolling) and power dissipation in the driveline (which give rise to and efficiency $\eta_{\tau 1} < 1$):

$$T_{K1} = T_W / (\tau_{f1} \cdot \tau_1 \cdot \eta_{\tau 1})$$

where $\tau_{f1}$ is the final ratio (i.e., on the axle) for the branch that transmits torque, defined as ratio between the number of teeth of the differential crown wheel ($z_{corona\_diff}$) and the number of teeth of the pinion that meshes with the differential crown wheel ($z_{pignone\_diff}$).

As regards the non-active branch of the driveline, managed by the clutch K2, its configuration (in terms of angular positions of the various degrees of freedom) depends upon torque balance within the gearbox. Of fundamental importance in this connection is the correct estimate of the friction in the sealing elements and in the bearings, i.e., in the needle roller cage bearings of the idle gears, in the bearings set between the primary and secondary shafts and between the shafts and the gearcase. Also rotation of some gears in the lubricating oil and the consequent viscous effect must be considered in the modelling process.

The plots of FIGS. 18 to 22 describe both the passive manoeuvre (portions "A") and the assisted manoeuvre (portions "B"), where only the brakes on the drive axle intervene.

FIGS. 18A and 18B illustrate the speed profile of the vehicle when passing over a hump with the front axle at the instant t=3 s. In particular, in the ascending stretch of the hump a slight decrease in speed of the vehicle is noted, which is then made up in the descending stretch of the hump. As may be noted, the speed of the vehicle does not change substantially with activation of the brakes on the drive axle thanks to reintegration of the dissipative contribution via an increase in torque delivered by the engine.

As regards FIGS. 19A and 19B, where the same notation as that appearing in the previous figures is used, a moderate effect is noted on the reduction of oscillation of the angular velocities in the rotating members of the non-active branch basically for the reasons described previously: in the absence of a connection between the non-active branch and the kinematic chain of the driveline, except for meshing between the output pinion and the differential crown wheel, it is possible, via the action of the brake alone, to reduce the oscillations in an evident way, even though not so much as would be obtained by loading the non-active branch, transmitting a non-zero torque with the respective clutch.

Figure 20:
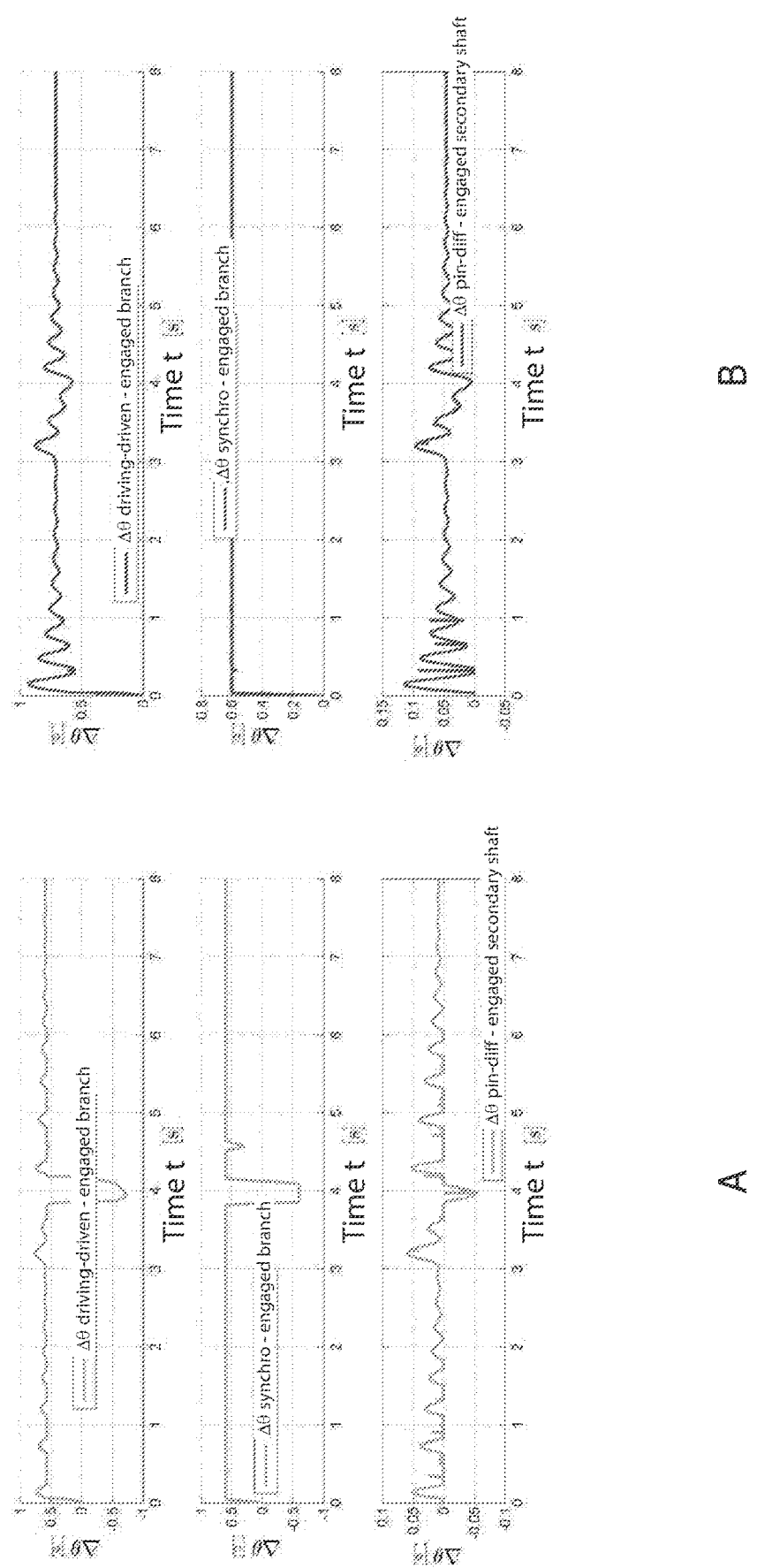

With reference to FIG. 20, in line with the previous result, intervention of the brake has decidedly beneficial effects on the rotating members of the driveline in the active branch. In particular, all the differences of angular positions are kept at positive values with intervention of the brakes, this indicating that contact between the surfaces of thrust is maintained on the pull side.

Figure 21:
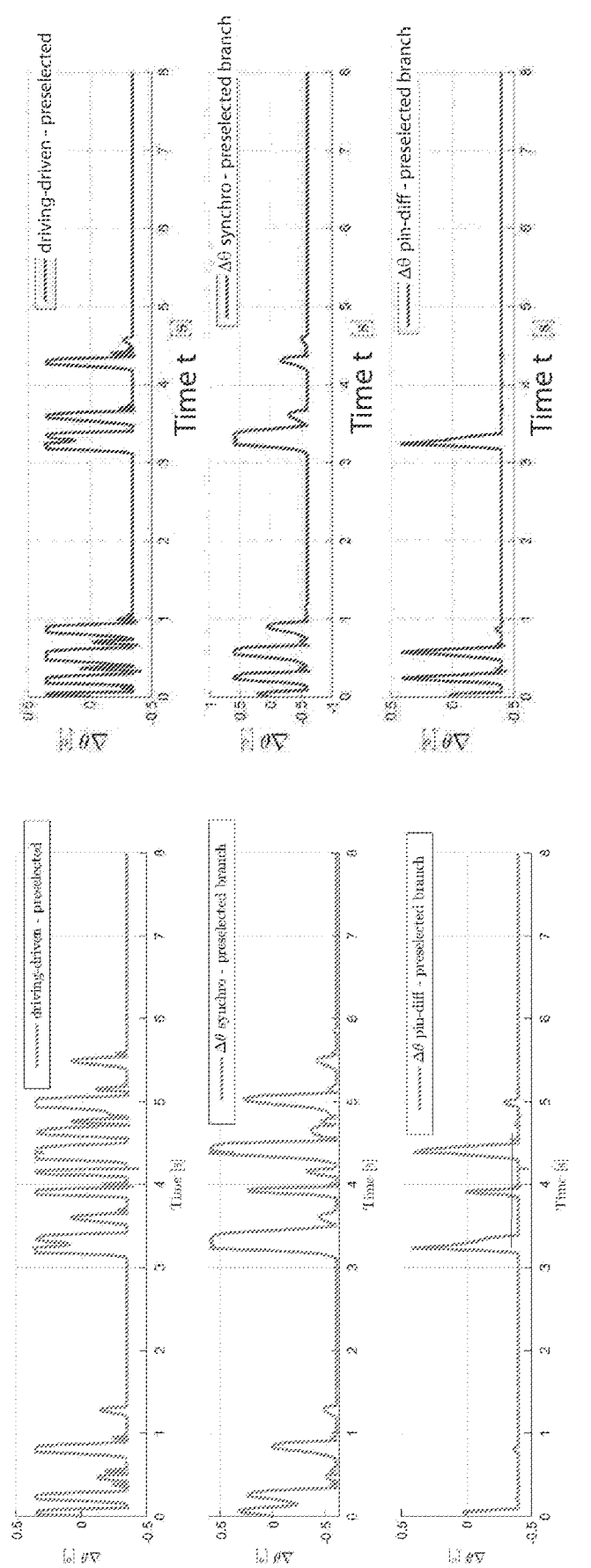

As regards FIG. 21, the impacts in the non-active branch of the driveline are reduced in number, even though in these conditions of intervention they are not altogether eliminated. Practically total elimination could be achieved with an increase in the value of torsional preload.

Figure 22:
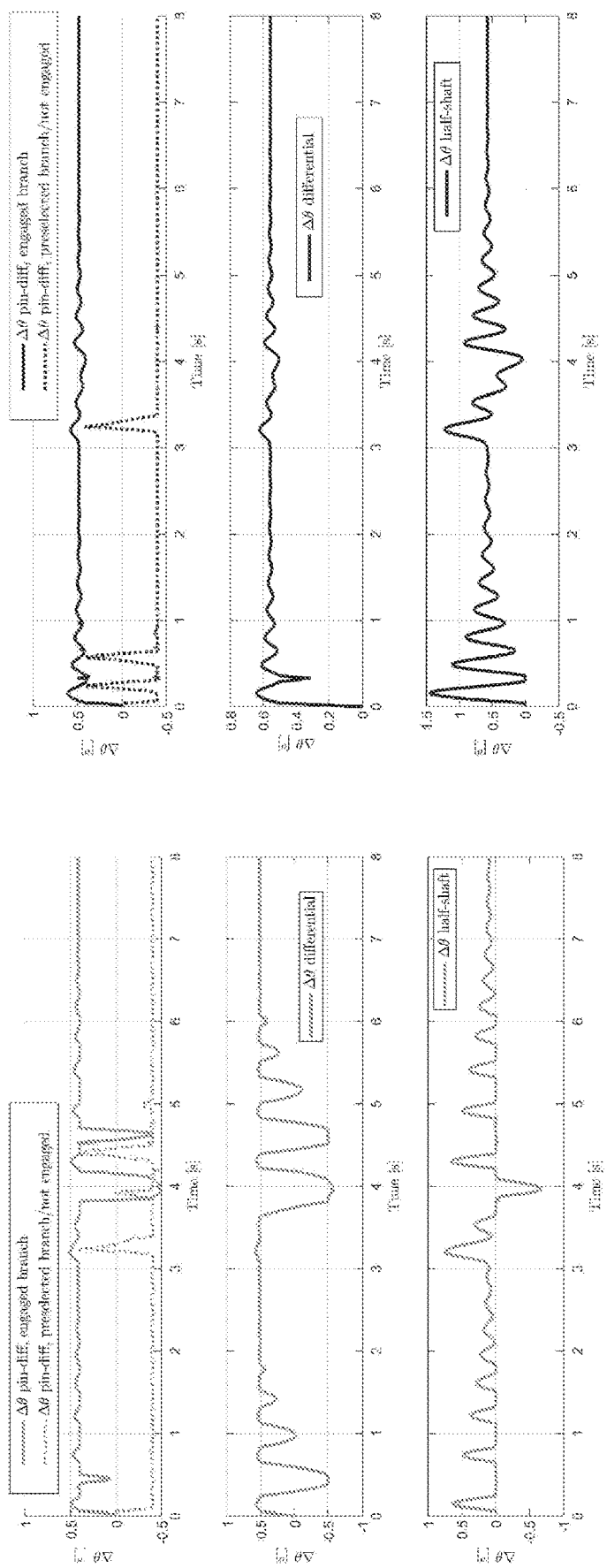

With reference to FIG. 22, it should be noted how, consistently with what has been described, the behaviour of the active and non-active branches of the driveline remain in any case divergent, in particular with the non-active branch still affected by some problems of impact noise. Significantly improved, instead, is the dynamic behaviour of the differential, which is affected to a lesser extent by impacts due to recovery of backlash inside it.

There now follows a description, with the aid of FIGS. 23 to 27, of the same manoeuvre and the effects in the case of assistance by combined intervention of the brake and the clutch K2.

Figure 23:
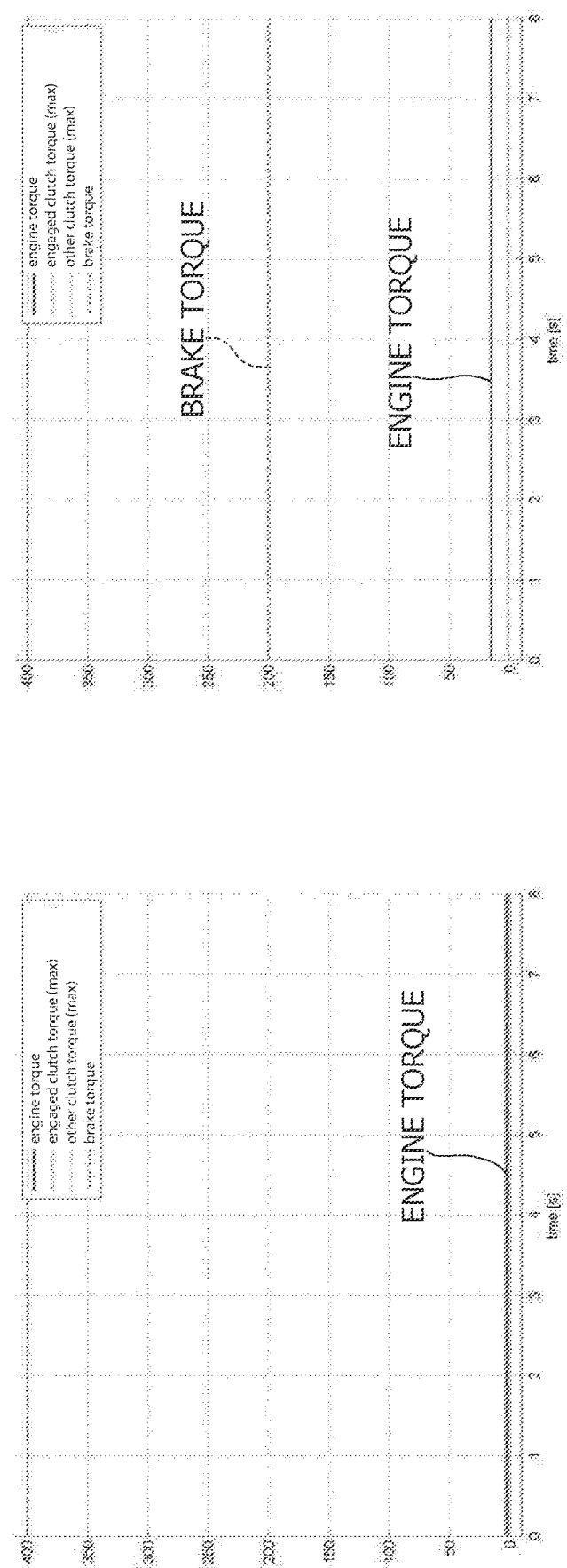

FIG. 23 presents the presents the plots of the torques already appearing in FIGS. 2A, 2B, in particular in the case of passive manoeuvre (FIG. 23A) and in the case of manoeuvre assisted by means of the method according to the invention (FIG. 23B). The difference between the two conditions lies in application of a constant braking torque of 200 Nm and a torque transmitted by the clutch associated to the non-active branch of the driveline of 2 Nm. In this way, the torque delivered by the internal-combustion engine has to be greater than the value delivered during the passive manoeuvre; in particular, it is increased by the two contributions of compensation of the clutch $\Delta T_{eng,K2}$ and of the brake $\Delta T_{eng,B}$, which are given by the following equations:

$$\Delta T_{eng,K2} = T_{K2} \cdot (1 - \tau_{K2}/\tau_{K1})$$

$$\Delta T_{eng,B} = T_B / (\tau_{f1} \cdot \tau_1 \cdot \eta_{r1})$$

It should hence be noted that also in this case the actuators that govern the brakes and the clutch are used and that, as such, they drive devices that can be connected to the driveline of the vehicle in order to impose an increase in torque delivered by the internal-combustion engine with respect to what is strictly necessary to meet the need of the manoeuvre, and consequently an increase of torsional preload in the driveline.

FIGS. 24A and 24B illustrate the plots of the speed of the vehicle, in the two conditions of passive and assisted manoeuvre; once again no appreciable differences may be appreciated.

Figure 25:
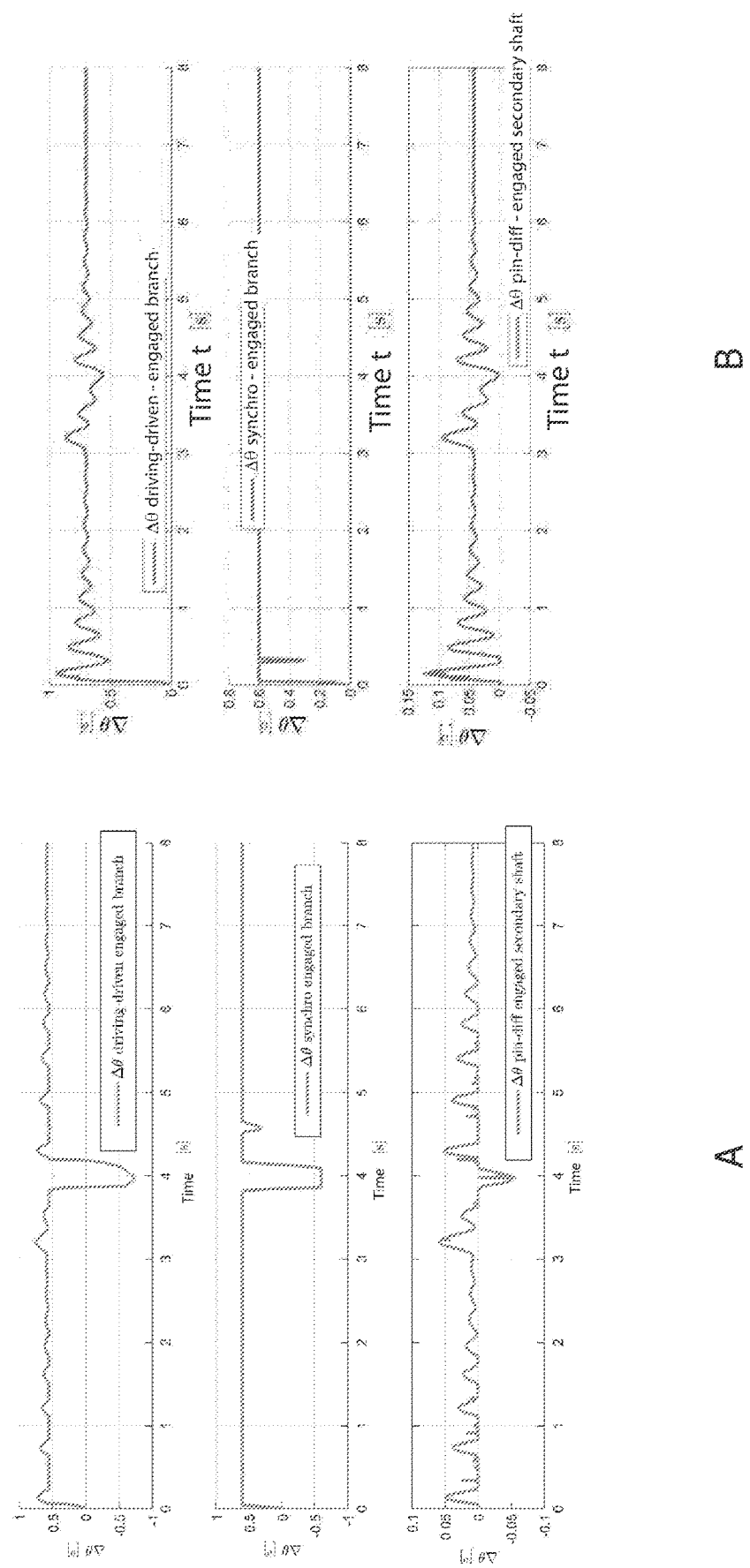
Figure 26:
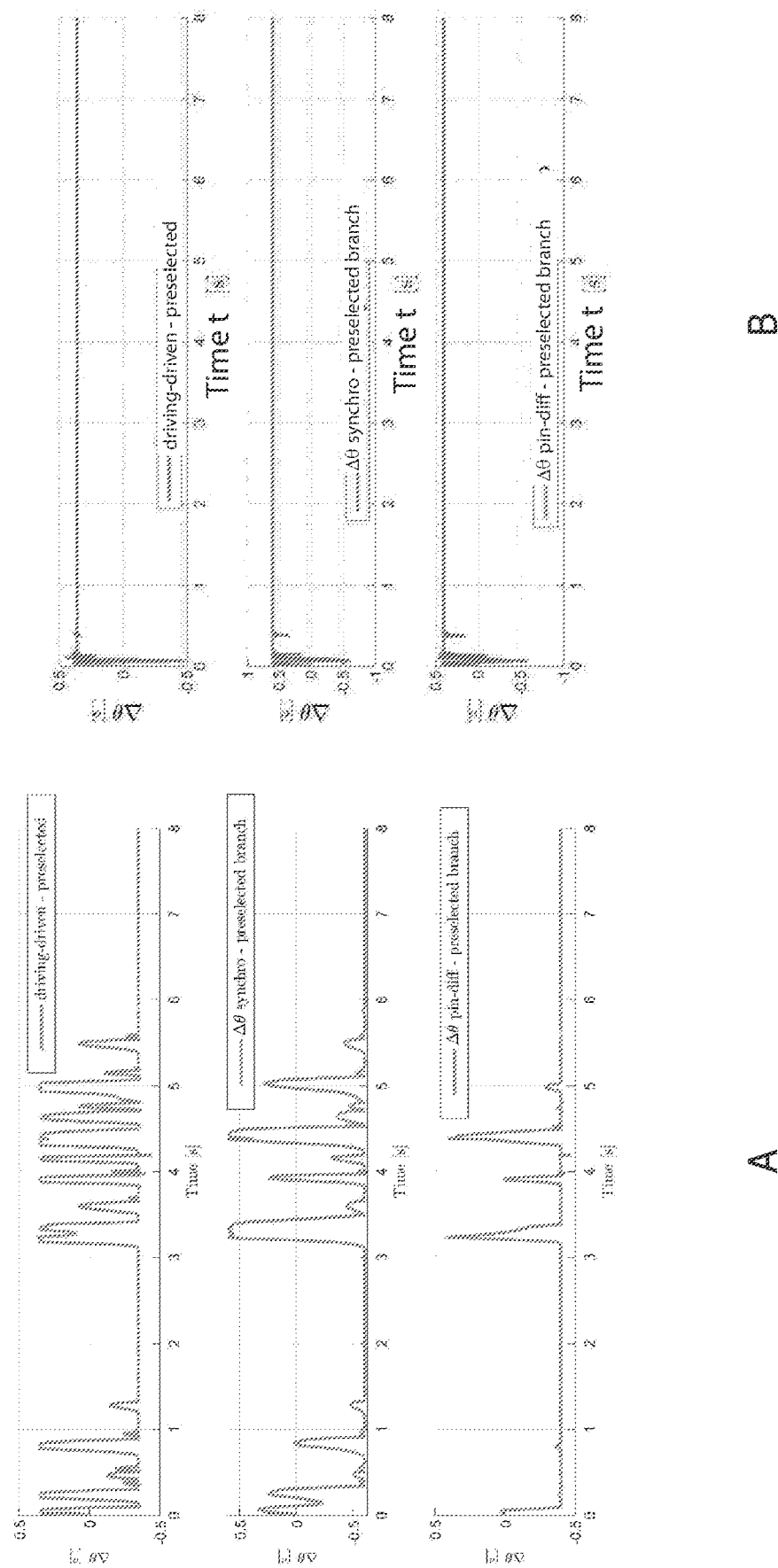
Figure 27:
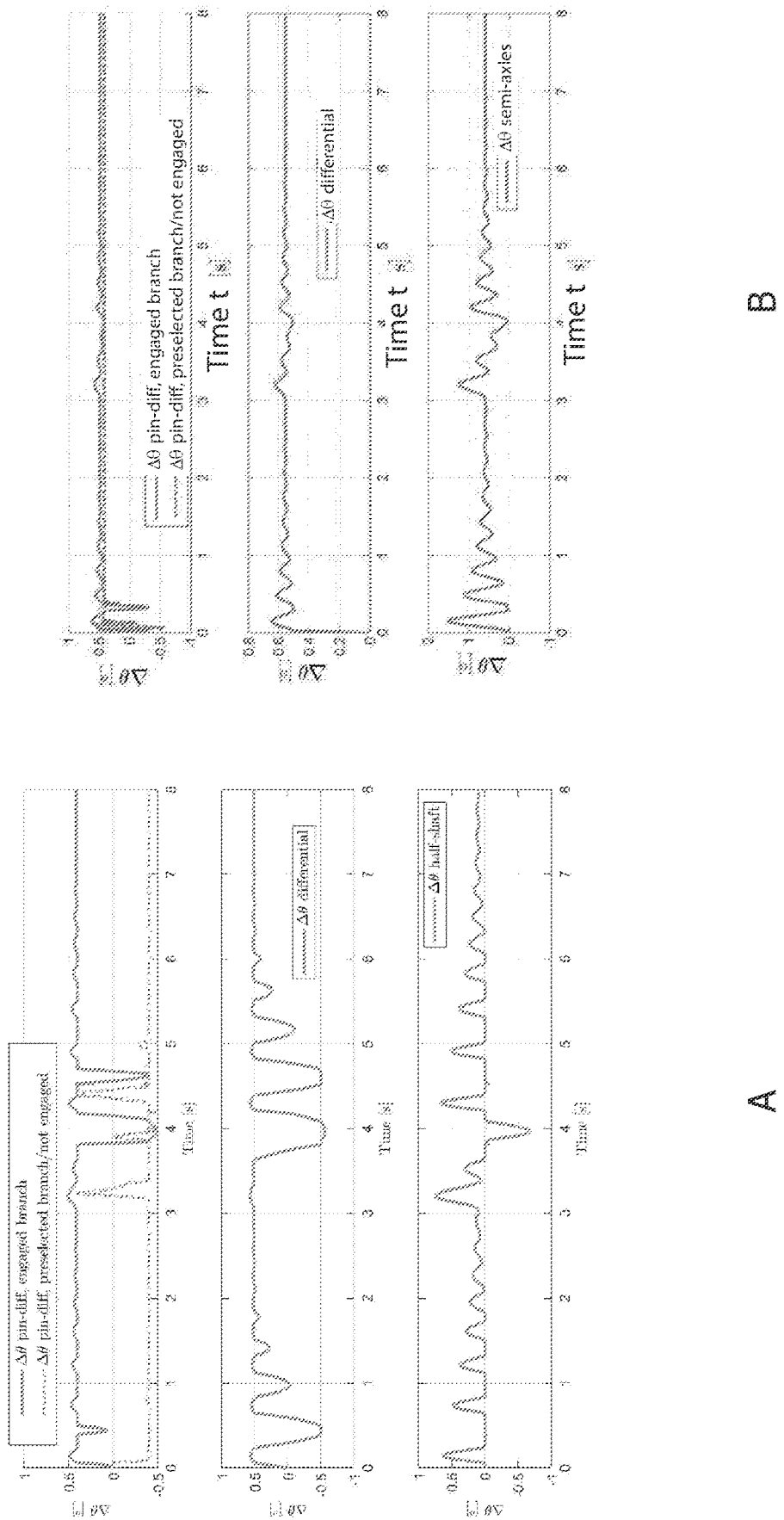

FIGS. 25 and 26 illustrate the effects of implementation of the method according to the invention on the active branch (FIG. 25) and non-active branch (FIG. 26) of the driveline.

FIG. 25B shows results substantially in line with what already emerges from FIG. 20B, basically because there is maintained the intervention of the brake that enables stabilisation of the behaviour of the active branch of the driveline reducing the noise thereof. However, as in the case of the tip-out manoeuvre, the most interesting datum is provided by FIG. 26B, which represents the absolutely important effect on the non-active branch of the driveline. As may be noted from FIG. 26B, there is practically total absence of impact upon occurrence of the perturbing phenomenon, and consequent total suppression of the noise generated thereby.

It should be noted, in fact, that all the differences of angular position remain at positive values throughout the interval of observation considered so that the resting condition remains always on the pull side.

From a comparison with FIG. 21B the benefit of the combined intervention of the brake and clutch of the non-active branch is manifest: all the oscillations in the differences of angular position that emerge from the plots of FIG. 21B are completely suppressed, and moreover the contacts that before occurred on the release side are now all shifted onto the pull side.

FIG. 27B shows, as compared to FIG. 22B, the same effect already described in relation to the tip-out manoeuvre; i.e., the behaviours of the active and non-active branches of the driveline at the interface between the output pinions and the differential are rendered substantially uniform, and the oscillations in the difference of angular position are reduced, thus bringing all the meshings to rest on the pull side.

It may hence be concluded that, for this particular manoeuvre at low speed, activation of the clutch of the non-active branch in combination with intervention of the brakes on the drive axle enables practically complete elimination of impact and recovery of the backlash within the driveline, with evident benefits in terms of suppression of noise.

Finally, with reference to FIGS. 28 to 33 and 34 to 39, there now follows a description of a manoeuvre according to point iii) above. This is, in particular, a manoeuvre similar to the manoeuvre ii), but carried out in conditions of creeping on account of the lower speed of the vehicle (5 km/h instead of 7 km/h): to prevent turning-off of the engine and/or to prevent irregularities of operation thereof, a slipping in the clutch of the active branch is tolerated in order to stabilise operation of the engine itself.

Figure 28:
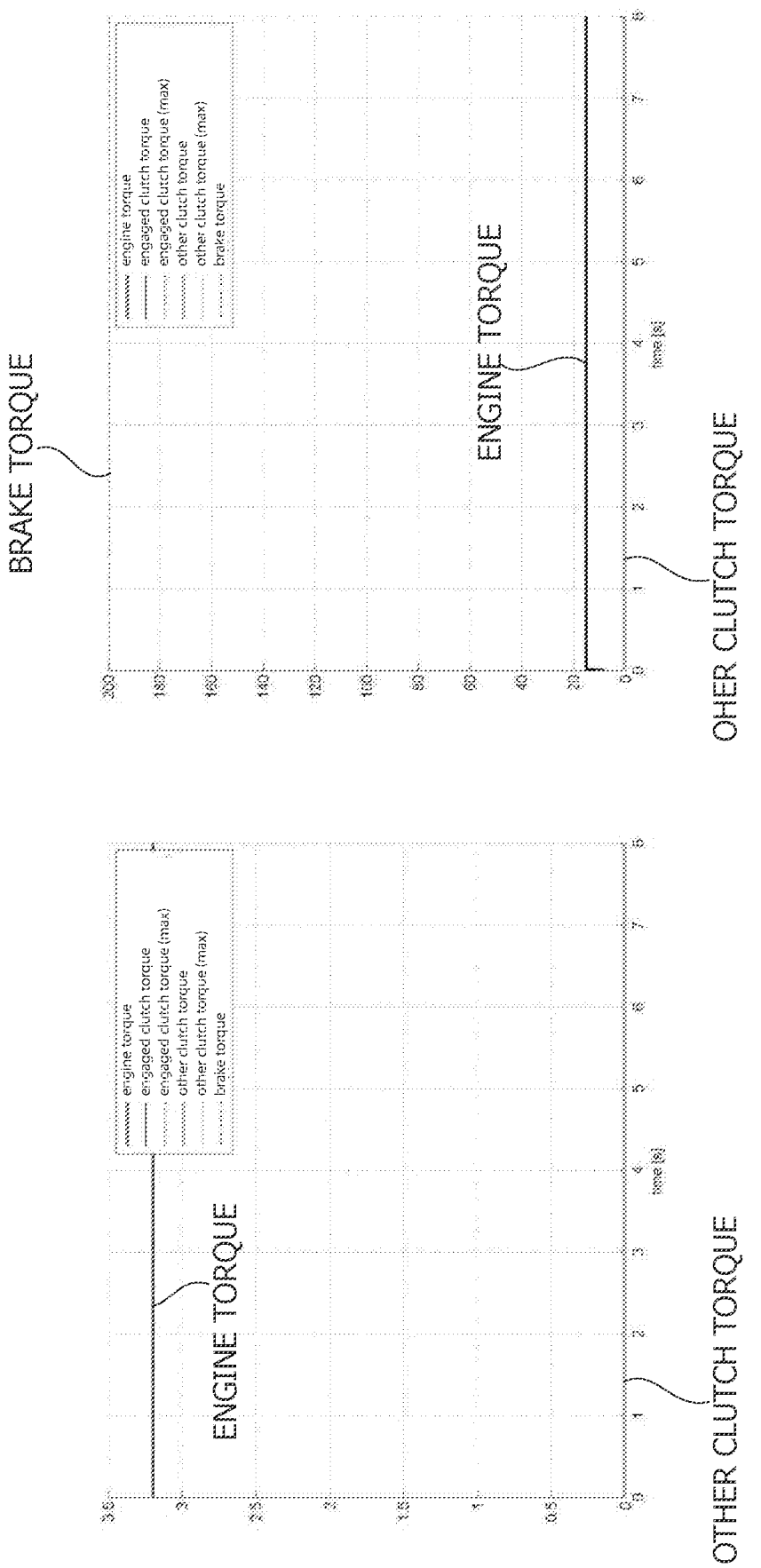
Figure 30:
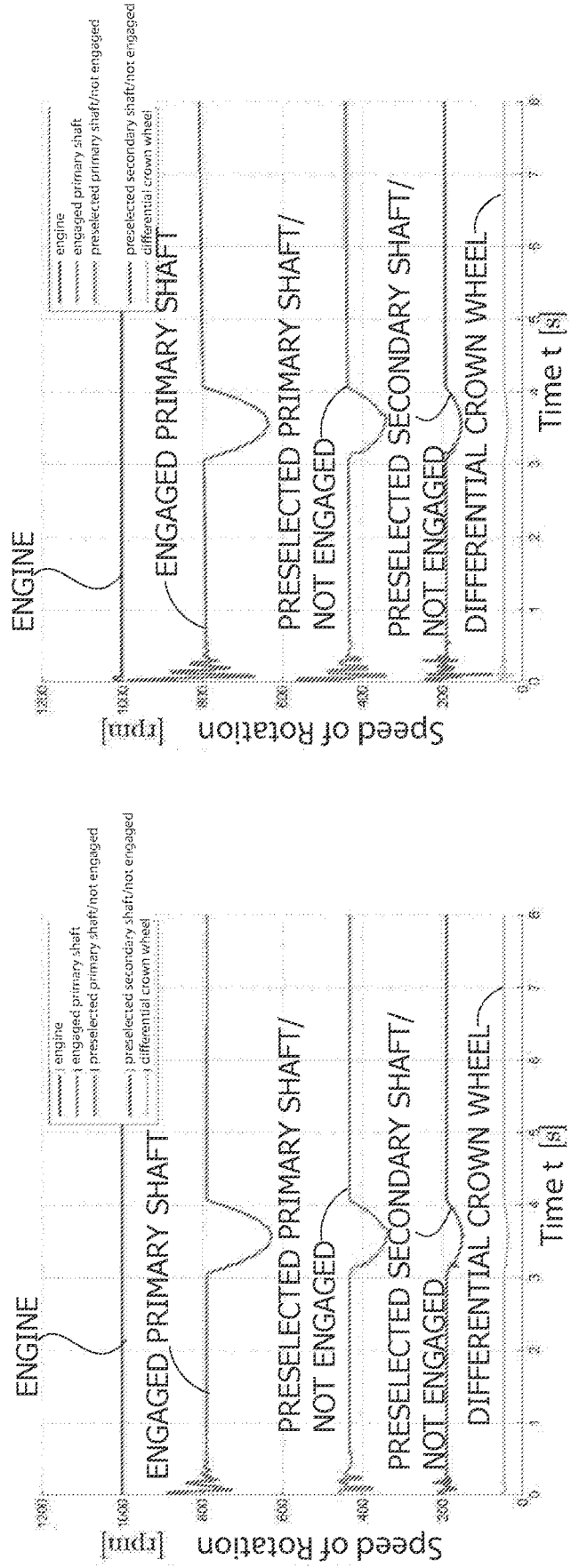
Figure 31:
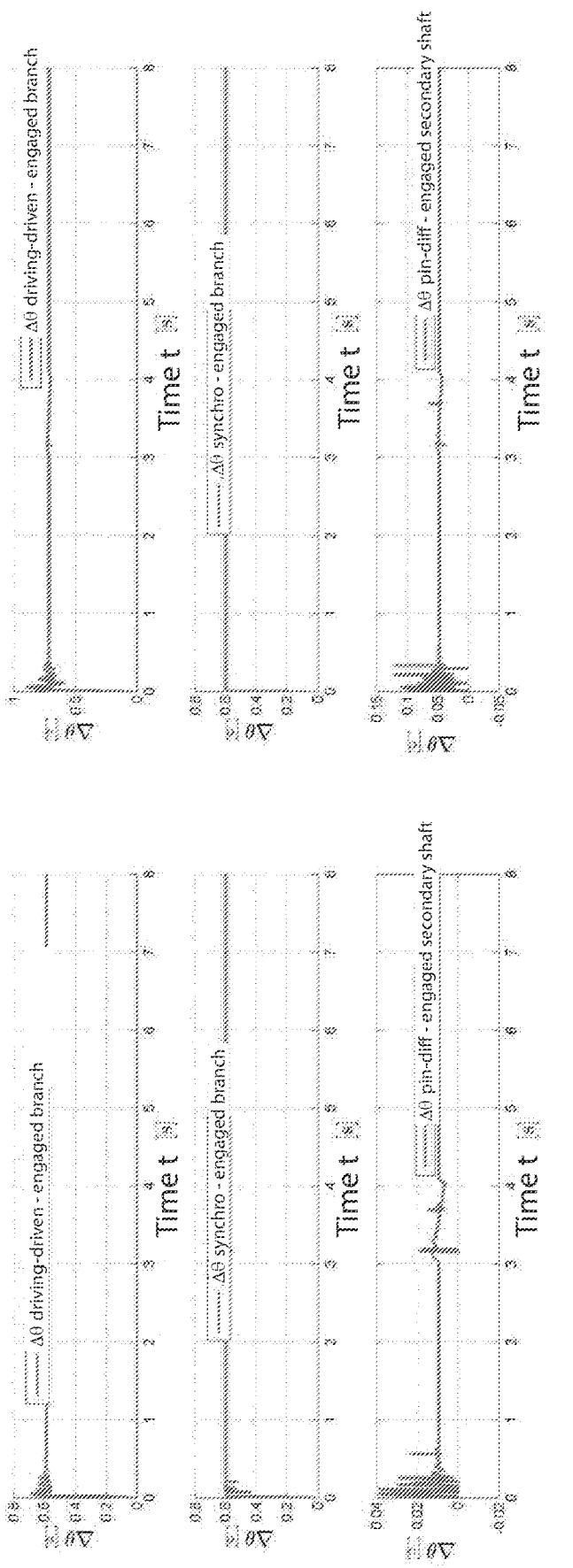

With reference to the plots of FIG. 28, from a comparison between FIG. 28A and FIG. 28B the effect of intervention of the brake is clearly visible. FIG. 28A shows how the torque delivered by the internal-combustion engine during the manoeuvre in question is very low, in the region of 3 Nm. Intervention of the brake leads the engine to reintegrate the dissipative contribution of the brake itself by raising the torque output up to approximately 15 Nm.

FIGS. 29A and 29B show how, as usual, intervention is transparent in regard to the dynamics of the vehicle, which is not altered significantly.

The plots of FIGS. 30A and 30B show how the difference in terms of angular velocity of the rotating members in the non-active branch of the driveline is practically minimal, for the reasons already described previously. In fact, intervention of the brake and of the engine is able to condition principally the active branch of the driveline, in so far as it is the one engaged with the wheels, whereas the impact on the non-active branch is less.

This result is confirmed once more by the plots of FIGS. 31A and 31B, which show how the differences in terms of oscillation in the difference of angular position between the passive manoeuvre and the manoeuvre assisted via the method according to the invention are substantially negligible.

Figure 32:
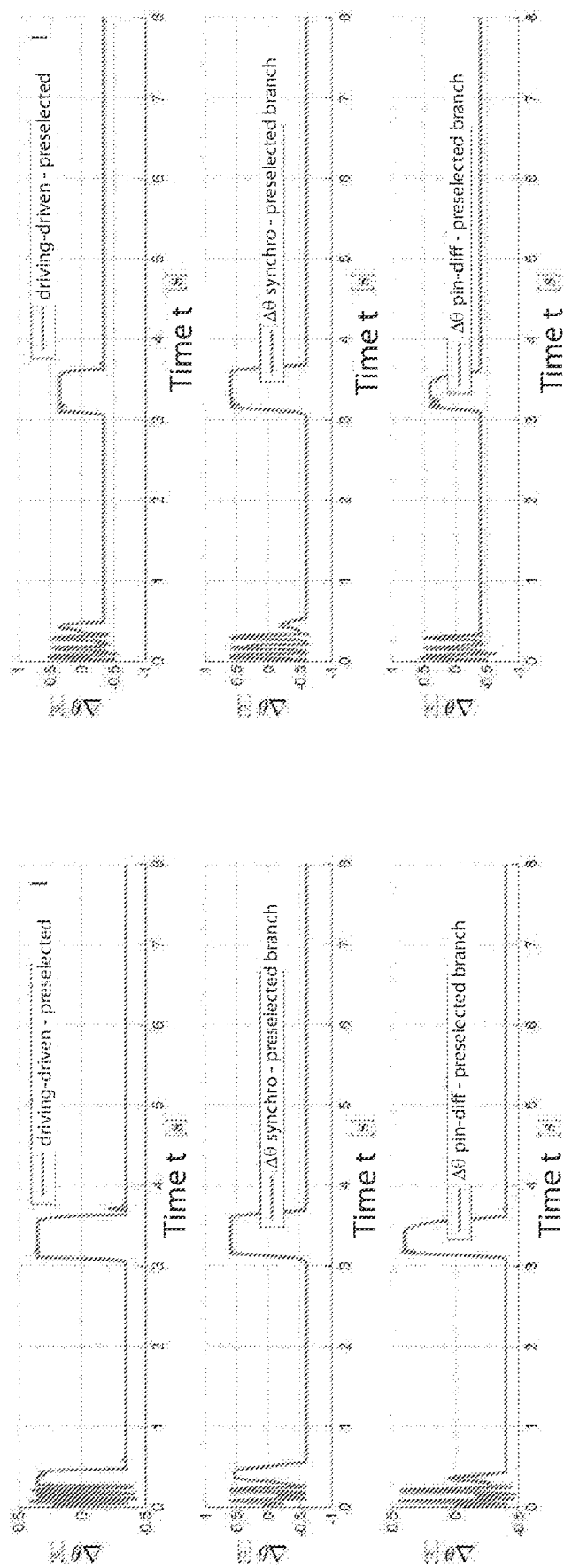

As regards FIG. 32, it should instead be noted how, in line with what has been described, the effect on the non-active branch of the driveline is likewise substantially negligible in the passage from a passive manoeuvre to a manoeuvre assisted by intervention of just the brake on the drive axle.

Figure 33:
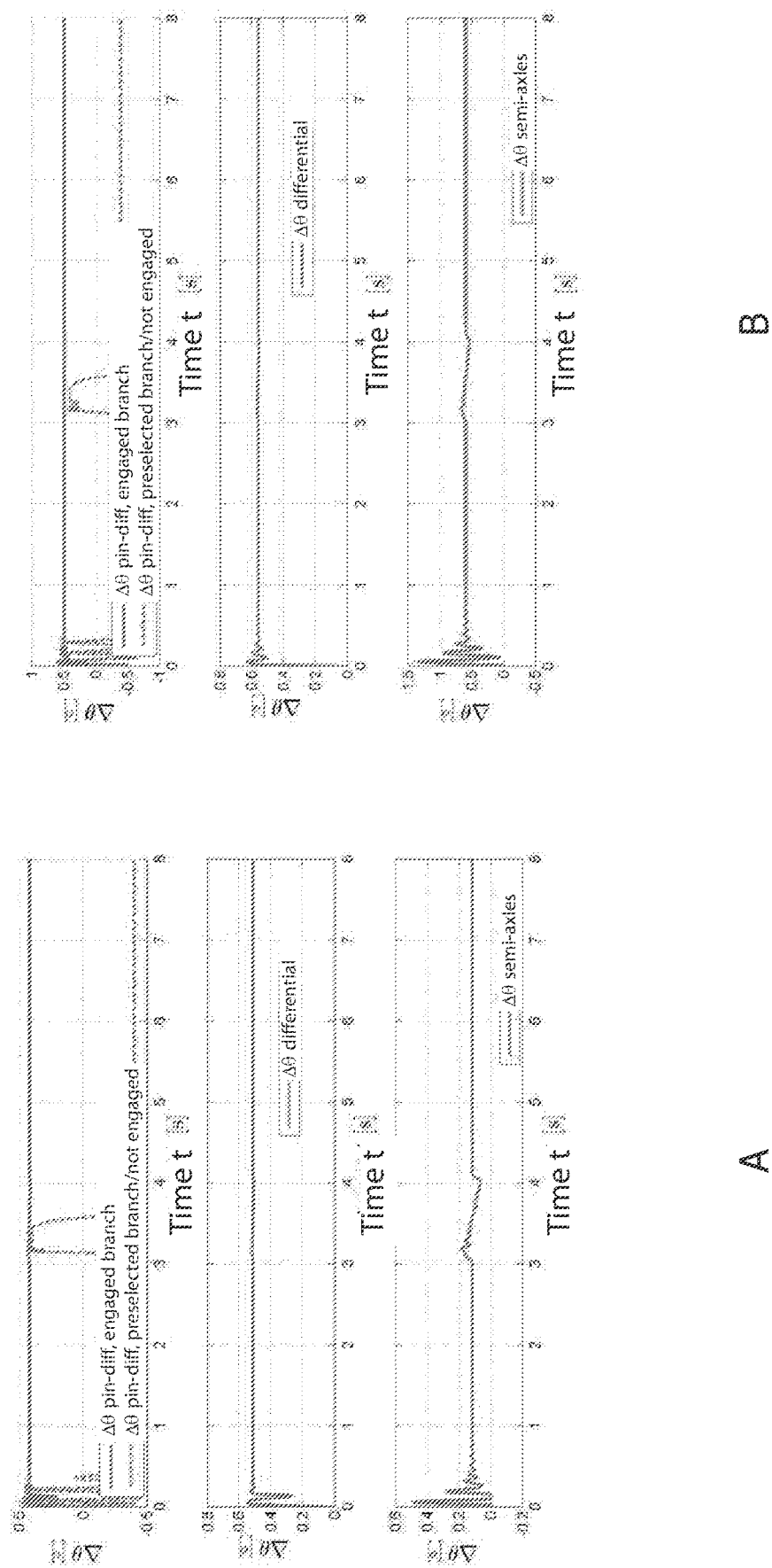
Figure 34:
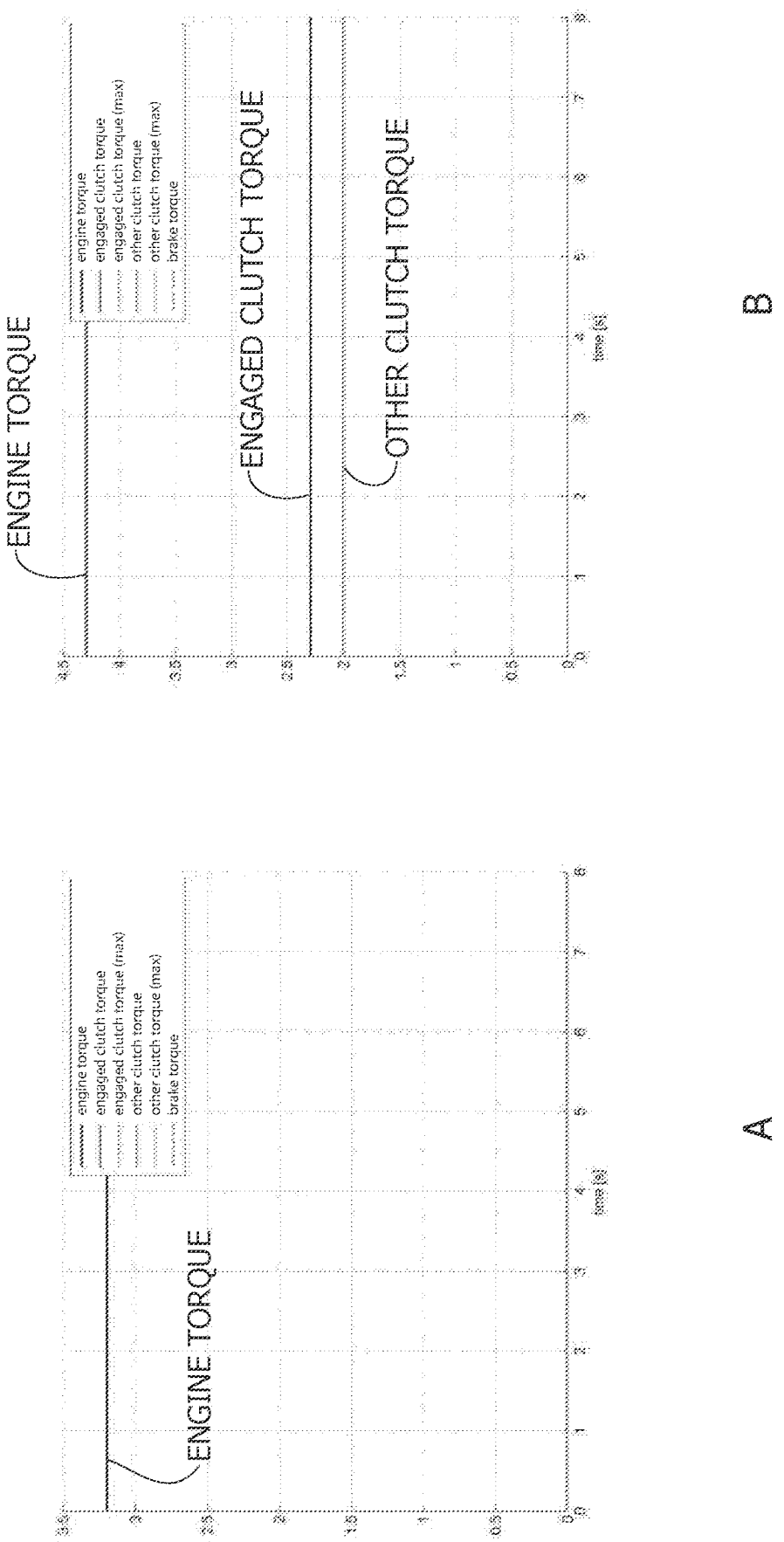

FIG. 33 clearly sums up, especially in the plots at the top in each of the portions A and B, the condition in question: the active branch of the driveline is characterized by a substantial absence of phenomena of noise resulting from impact due to recovery of backlash since it is already subject to a torsional preload that is increased with intervention of the brake. Instead, as may be seen also in the top plot of FIG. 33B, the behaviour of the non-active branch is substantially not affected by intervention of the brake, and its behaviour continues to being characterized by a higher irregularity and a larger number of impacts due to recovery of backlash.

In conclusion, for the manoeuvre in question, intervention of the brake may be deemed substantially superfluous, if not even counterproductive, in so far as the trifling benefits in terms of reduction of noise on the active branch are offset by an increase in fuel consumption.

A completely different situation arises in the case where, in the manoeuvre according to point iii), the driven actuator is not the one that governs the brakes on the drive axle but the actuator of the clutch of the non-active branch, as witnessed by the plots of FIGS. 34 to 39.

The plots of FIGS. 34A and 34B highlight how the intervention of the clutch associated to the non-active branch of the driveline envisages enabling the transmission, through the clutch, of a torque of approximately 2 Nm, whereas the clutch associated to the active branch of the driveline transmits a torque that is a little higher (being it in creeping conditions). Globally, the torque delivered by the engine is just 1 Nm higher than the one delivered in the case of passive manoeuvre, with consequent minimization of the additional fuel consumption as compared to the case of intervention of the brake.

As usual, the plots of FIG. 35A and FIG. 35B show the substantial invariability of the speed of the vehicle upon activation of the method according to the invention.

Figure 36:
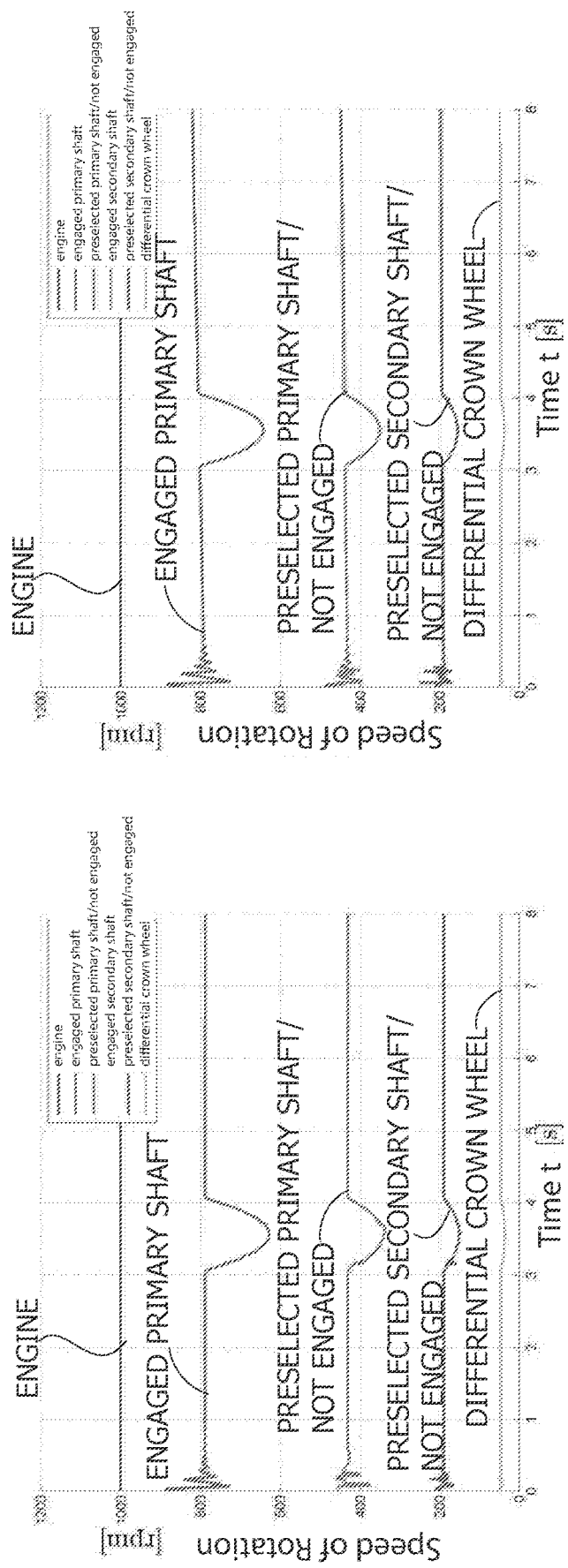

A first interesting datum emerges, instead, from the plot of FIG. 36. In particular, the comparison between FIG. 36A and FIG. 36B shows how the rotating members of the non-active branch of the driveline operate according to a profile of angular velocity that is much more regular than in the case of the passive manoeuvre, which is, instead, afflicted by oscillations that arise precisely when driving over the hump.

Figure 37:
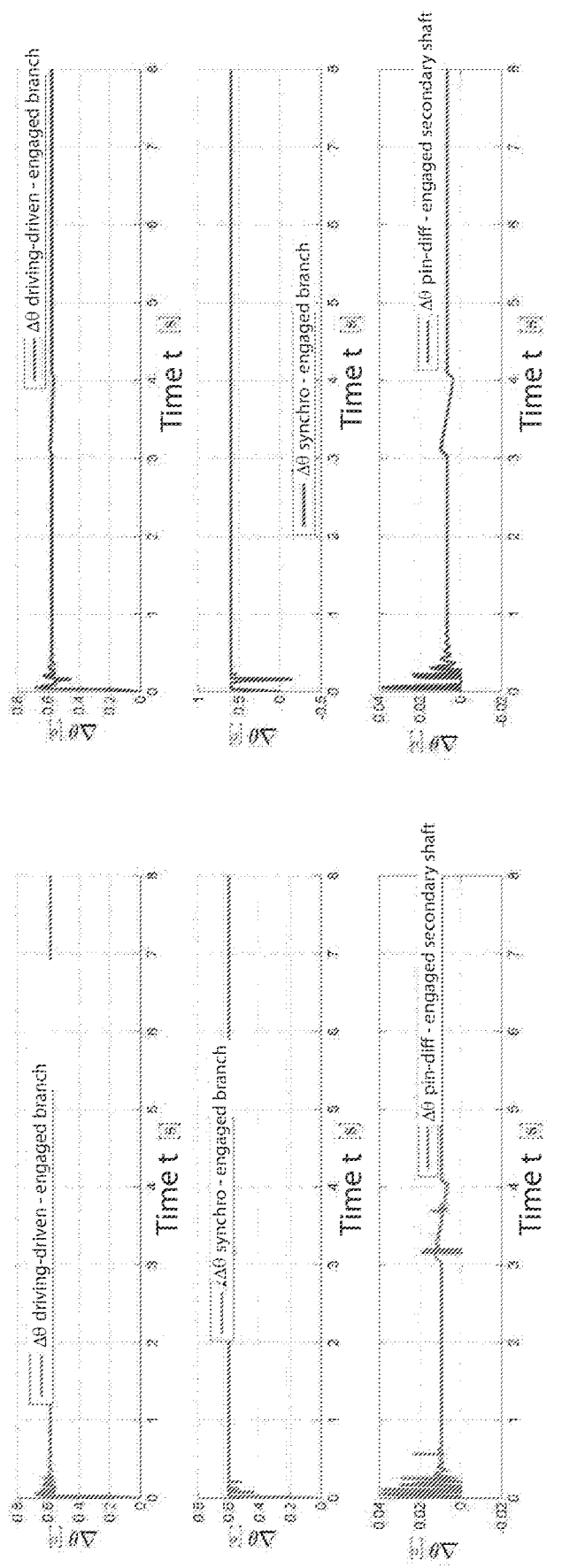
Figure 38:
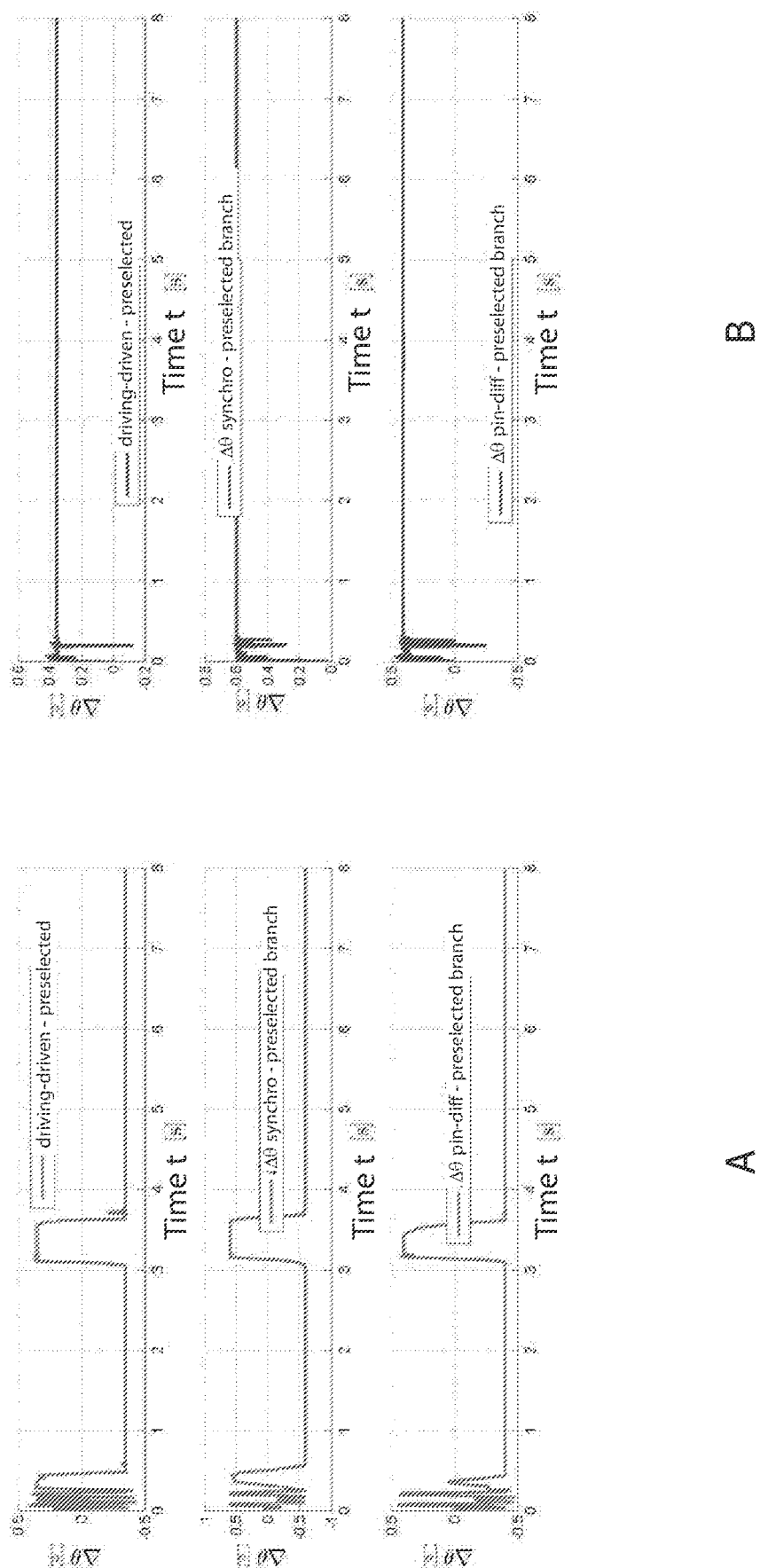

The plot of FIG. 37 confirms how, even in the absence of intervention of the brake, the active branch of the driveline remains substantially resting always on the pull side, without significant problems of noise resulting from impact due to recovery of backlash. Of absolute importance is, instead, the datum that emerges from FIG. 38, and in particular from FIG. 38B, where it may be noted very clearly how intervention of the clutch of the non-active branch brings the rotating members thereof involved in the manoeuvre to rest on the pull side, thus eliminating the impact due to recovery of backlash.

Figure 39:
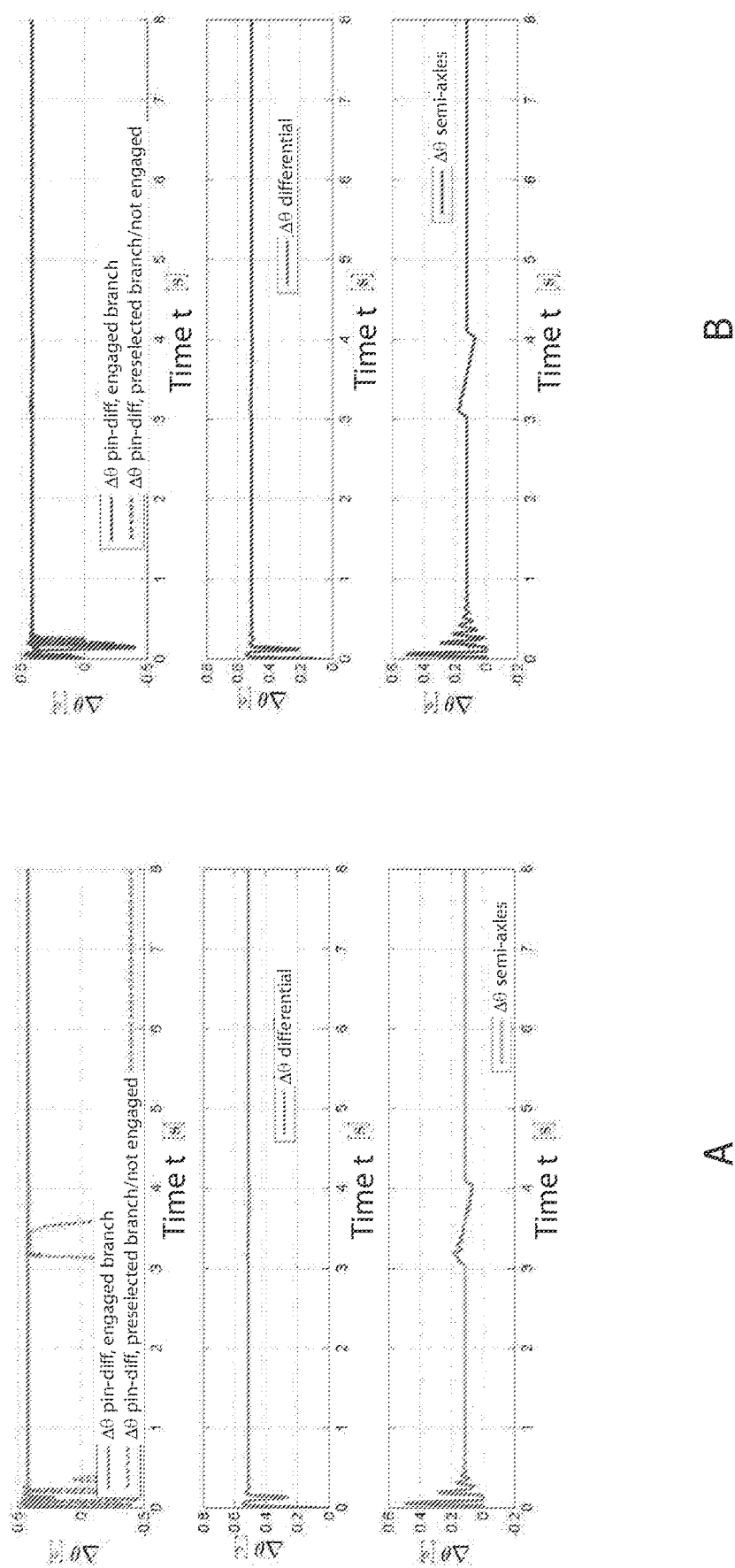

An evidence of this may also be appreciated from the plot of FIG. 39, both by comparing it with the plot of FIG. 33B and by comparing it with the plot of FIG. 39A: the behaviour of the two, active and non-active, branches of the driveline in terms of difference of angular position between output pinions and differential is rendered substantially uniform, and the contact for both of them is maintained on (or brought onto, in the case of the non-active branch) the pull side, with elimination of noise in the non-active branch.

It may hence be concluded that for this particular manoeuvre, intervention of the clutch associated to the non-active branch is absolutely to be preferred over intervention of the brake in so far as it leads to appreciable benefits in the face of a contained increase in fuel consumption.

Figure 40:
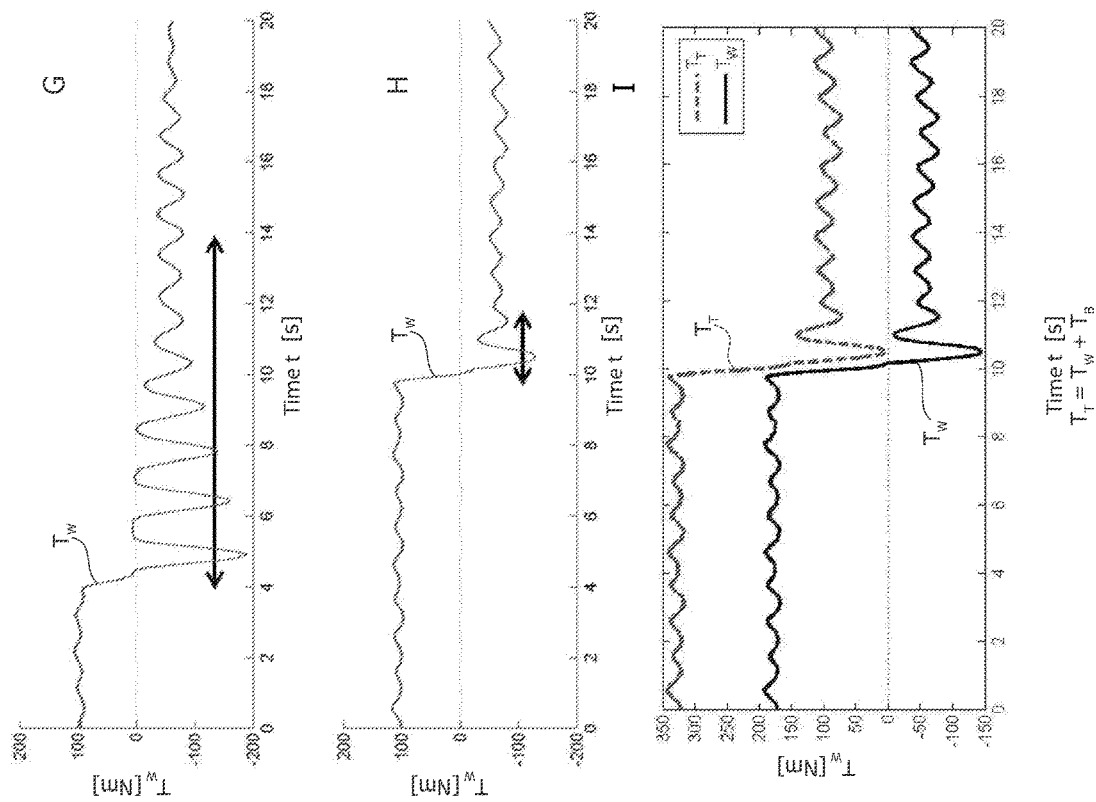
FIGS. 40A-40F show the time plots of kinematic reference quantities as the pressure in a braking system of the motor vehicle varies.
FIGS. 40G-40I show the time plots of some reference torques of the system as the pressure in a braking system of the motor vehicle varies.

Finally, with reference to the plots of FIGS. 40A-40F, the effectiveness of intervention of the brakes in the manoeuvre ii) has been verified experimentally by means of a test bench on which a sensored dual-clutch driveline was installed so as to detect the angular positions of some gears of the gearbox and thus evaluate the differences $\Delta\theta_i$. FIGS. 40A-40F present the results of three experimental tests corresponding to driving over a hump, where preload of the active branch of the driveline is obtained by increasing the torque delivered by the engine, while the brakes are used for dissipating the consequent power surplus before this reaches the drive wheels. The effect is shown in terms of recovery of the backlash in the synchronizer of the gear engaged (the first gear) and of the pre-engaged gear (the second gear), which can be evaluated to a first approximation (it is not a measurement of just the play in the synchronizer, but a contribution of torsion of the secondary of the gearbox involved is also present) by means of the following quantities deriving from the measurements of angular position:

$$\Delta\theta_{SIN\_I} = \theta_{condotta\_I} - \theta_{pignone\_diff1}e$$

$$\Delta\theta_{SIN\_II} = \theta_{condotta\_II} - \theta_{pignone\_diff2}$$

which are represented in the plots of FIGS. 40A-40F, where:

FIGS. 40A, 40C, and 40E show the time plots of the relative angular position $\Delta\theta_{SIN\_I}$ in the (engaged) synchronizer of the first gear with a pressure in the braking system of 0 bar, 8 bar, and 16 bar, respectively; and FIGS. 40B, 40D, and 40F show the time plots of the relative angular position $\Delta\theta_{SIN\_II}$ in the (pre-engaged) synchronizer of the second gear with a pressure in the braking system of 0 bar, 8 bar, and 16 bar, respectively.

As may be noted from FIGS. 40A-40F, in the absence of control, the presence of an external disturbance causes a series of oscillations of the relative angular position with several changes in the sides of contact of the teeth and consequent impact that causes noise. The numerous changes of sign of the differences of angular position may in particular be noted.

The increase in pressure in the braking system first to 8 bar and then to 16 bar leads to a progressive reduction of the number of impacts between the toothings of the synchronizer that are necessary to bring the system into a new stable operating condition.

FIGS. 40G-40I refer, instead, to an experimental test on the same test bench, where, starting from a stationary condition with the vehicle travelling at a constant speed of 7 km/h, a fast reduction and change in sign of the torque was imposed, thus triggering vibrations in the driveline.

In these figures:

FIG. 40G shows the time plot of the torque on the wheels in the absence of action on the brakes and in the presence of disturbance from outside (steplike variation of the torque);

FIG. 40H shows the time plot of the torque on the drive wheels with actuation of the brakes and in the presence of disturbance from outside; and FIG. 40I is similar to FIG. 40H, but also shows the time plot (dashed line) of the torque at output from the driveline and transmitted to the axle shafts.

In conditions of absence of control, the torque oscillates considerably, crossing a number of times the zero value with consequent change in sign of the torque transmitted and onset of impact between the sides of the gear teeth. With application of an action on the brakes of the drive axle (FIG. 40H), the number of zero crossings of the torque at output from the driveline vanishes, causing reduction in number and amplitude of the oscillations of the torque signal at the wheels.

The noise in the driveline likewise drops drastically in so far as (FIG. 40I), as already explained, application of a braking torque $T_B$ confines the values of torque acting on the driveline ($T_T$ in FIG. 7I) to just the positive values. In fact, the torque acting on the wheels is $$T_W = T_T - T_B$$

whence $T_T = T_W + T_B$

The braking torque thus makes a contribution to the dynamic balance of the driveline that shifts the values of torque acting thereon (which is otherwise equal to the torque on the wheels $T_W$) confining them within a single interval with respect to the zero value.

Lastly, FIGS. 41A-41D show schematically, considering for simplicity only one pair of teeth meshing for the active branch of the driveline, the effect of the braking torque in terms of suppression of noise when given manoeuvres are carried out.

Figure 41A:
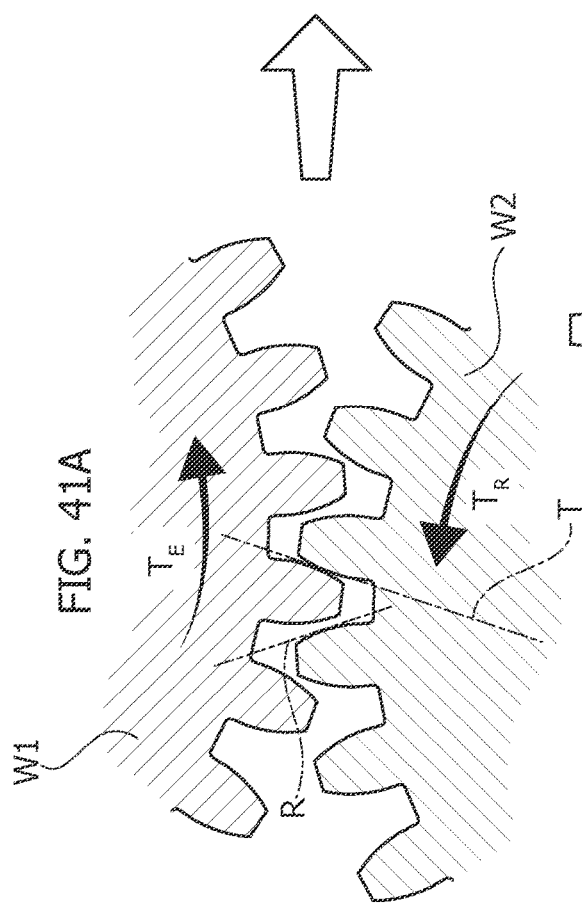
FIGS. 41A-41D are schematic illustrations of the effect of the method according to the invention in different operating conditions.

FIG. 41A represents an initial condition of motion at constant speed. $T_E$ is the torque, equal to the torque delivered by the engine of the vehicle multiplied by the transmission ratio and by the efficiency, $T_R$ is the torque due to the resistant load acting on the vehicle, W1 and W2 are respectively a drive gear (for example, an output pinion of the gearbox) and a driven gear (for example, the differential crown wheel). T and R are, respectively, the pull side and the release side.

This being said, the scheme of FIG. 41A shows the coupling between two teeth of the gears W1 and W2 on the pull side, as may be logically expected.

Figure 41B:
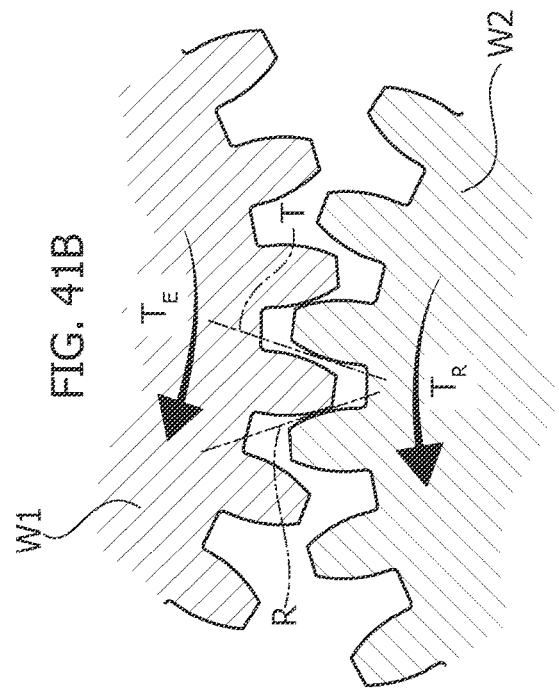

The condition of FIG. 41B represents a first perturbing phenomenon corresponding to a tip-out manoeuvre: in steady-state conditions, the contact between the teeth of the gears W1 and W2 shifts, as may be expected, onto the release side, whereas the torque applied by the engine reverses its direction, since the load represented, at low speeds, prevalently by the inertia of the vehicle becomes a pulling load.

Figure 41C:
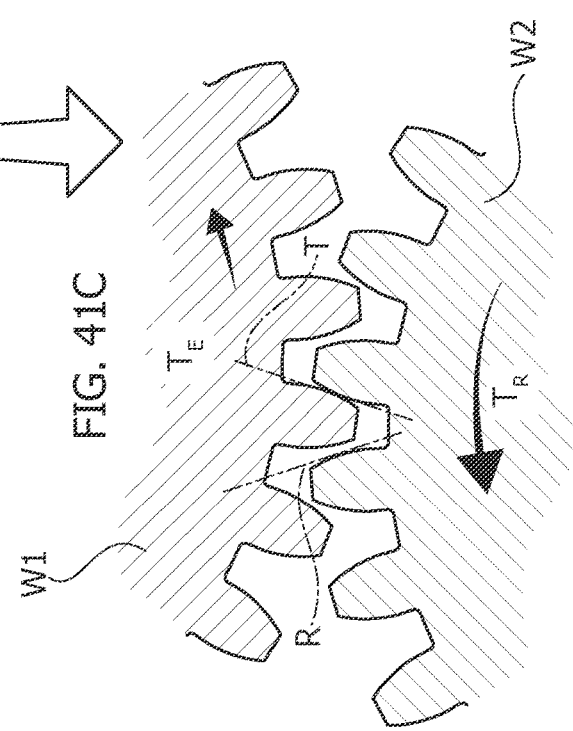

The condition of FIG. 41C corresponds, instead, to the stationary configuration of the gears during a creeping manoeuvre when driving over a hump, before reaching the hump or else at the end of the transient consequent upon arrival at the hump. In the case where this occurs, there is not an immediate change of the side of contact (from the pull side to the release side). The ascending phase during passage over the hump increases the resistant load produced by the vehicle on the driveline and stabilises the contact on the pull side, but meshing is in a condition of slight pull. The torque delivered by the engine is still a driving torque, but the descending stretch of the hump creates a condition of incipient detachment between the sides of contact since it tends to accelerate the gear W2, which is closest to the wheels of the vehicle, by more than the gear W1 accelerates as a result of the torque $T_E$, thus bringing the vehicle transiently into conditions such as to constitute a pulling load.

Figure 41D:
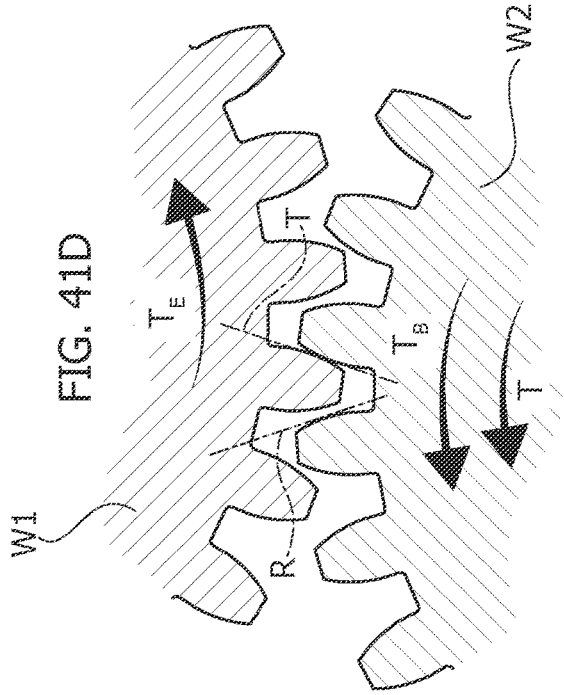

In either case, application of a braking torque $T_B$ has the effect of tightening the contact on the pull side (FIG. 41D). However, starting from the condition of FIG. 41B it is necessary to envisage a simultaneous control of the torque output $T_E$, with increase thereof in order to balance the action of the brakes and tighten the contact on the pull side (a fact that otherwise would not necessarily occur).

In summary, the engine torque would be sufficient to tighten the contacts between the rotating members, but to restore the conditions required of the wheels (constancy of dynamics of the vehicle) it is then necessary "to drain off" the excess torque output with the brakes.

Of course, the details of construction and the embodiments may vary widely with respect to what has been described and illustrated herein, without thereby departing from the scope of the present invention, as defined by the annexed claims.

In particular, even though the present description has been developed with reference to a driveline with dual-clutch gearbox, the method according to the invention may be applied to any single-clutch driveline, whether automatic or manual.

The invention claimed is:

1. A method for reducing noise in a driveline of a motor vehicle, the method comprising the steps of:
   detecting a condition initiating a noise event of the driveline using one or more sensors on board the motor vehicle,
   controlling, as a function of the detected condition and of a signal of said one or more sensors, actuation of an internal combustion engine of the motor vehicle to apply torque to the driveline to generate a torsional pre-load condition in the driveline itself, and
   controlling, as a function of the torque applied to the driveline to generate the torsional pre-load condition and/or of one or more signals of said one or more sensors, an actuation of one or more actuators that govern corresponding devices that are configured to be connected to the driveline to mitigate the torque applied to the driveline by the engine so that a resulting torque applied to wheels of the motor vehicle from the driveline remains unchanged by the torque applied to generate the torsional pre-load condition in the driveline,
   wherein said one or more actuators include:
      an actuator of a front left brake of the motor vehicle,
      an actuator of a front right brake of the motor vehicle,
      an actuator of a rear left brake of the motor vehicle, and
      an actuator of a rear right brake of the motor vehicle.

2. The method according to claim 1, wherein said step of detecting the condition initiating the noise event of the driveline includes detecting at least one of:
- a concentrated unevenness of a terrain,
- a sudden variation of torque transmitted by the driveline,
- a torque value output by the engine of the motor vehicle lower than a first threshold value, and
- a torque value output by a gearbox of the motor vehicle to a differential of the motor vehicle lower than a second threshold value.

3. The method according to claim 1, wherein said driveline includes a dual clutch gearbox.

4. The method according to claim 1, wherein said one or more sensors include at least one of:
- a stereoscopic camera configured for performing a terrain scan and for detecting variation in a profile of the terrain itself, and
- a terrain laser scanning device.

\* \* \* \* \*